(12) United States Patent
Nortman

(10) Patent No.: US 10,277,477 B2
(45) Date of Patent: Apr. 30, 2019

(54) LOAD RESPONSE PERFORMANCE COUNTERS

(71) Applicant: VMware, Inc., Palo Alto, CA (US)

(72) Inventor: William Nortman, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 407 days.

(21) Appl. No.: 14/865,611

(22) Filed: Sep. 25, 2015

(65) Prior Publication Data

US 2017/0093669 A1    Mar. 30, 2017

(51) Int. Cl.
*G06F 15/173* (2006.01)
*H04L 12/24* (2006.01)
*H04L 12/26* (2006.01)

(52) U.S. Cl.
CPC ........ *H04L 41/5035* (2013.01); *H04L 43/067* (2013.01); *H04L 43/0817* (2013.01); *H04L 43/14* (2013.01); *H04L 41/5083* (2013.01); *H04L 41/5096* (2013.01)

(58) Field of Classification Search
USPC ........................................ 709/224
See application file for complete search history.

(56) References Cited

U.S. PATENT DOCUMENTS

| 6,684,252 | B1 * | 1/2004 | Chow | H04L 67/22 709/224 |
| 7,787,383 | B2 * | 8/2010 | Bali | H04L 43/0811 370/216 |
| 9,697,136 | B2 * | 7/2017 | Saidi | G06F 12/1027 |
| 2003/0070117 | A1 * | 4/2003 | Matsuki | G06F 11/261 714/25 |
| 2015/0234669 | A1 * | 8/2015 | Ben-Yehuda | G06F 3/0604 718/1 |

* cited by examiner

*Primary Examiner* — Alicia Baturay

(57) ABSTRACT

The current document is directed to a new class of performance-monitoring tools referred as load response performance counters ("LRPCs"). Load response performance counters are implemented to periodically run a task within a computer system in order to apply a specific load to a particular subsystem or component of the computer system and to measure, at intervals, a response time for completing the task. By monitoring the response times, various types of problems, anomalies, and bottlenecks associated with the subsystem or component can be identified and characterized. The design and implementation of particular LRPCs can be precisely tailored to particular components and subsystems at any of many different hierarchical levels, granularities, and temporal ranges in order to monitor system operation and function.

20 Claims, 51 Drawing Sheets

1202 — DATA_START = AFF864
1204 — DATA_END = AFF866
1206 — TIME = 1B7740 ——— 1212
DATA_INCREMENT = 8
_Allocate_Default_Error_Vectors
_Allocate_Default_Interrupt_Vectors
_Set_Clock_Interrupt_Vector (CLKINT, __Clk_Interrupt_Status)

```
START:   CLR R0
         CLR R1
         MOV # TIME, R2
         MOV # DATA_INCREMENT, R5
         MOV # DATA_END, R4
OUTLOOP: MOV # DATA_START, R3
INLOOP:  CMP R1, R2
         BGT EXIT          ⎫
         ADD (R3), R0      ⎬ 1214
         ADD R5, R3        ⎪
         CMP R3, R4        ⎭
         BLE INLOOP
         JMP OUTLOOP
EXIT:    HALT
CLKINT:  INC R1
         RTI
```

⎧ 1210 ⎫ (bracket around program)

FIG. 12

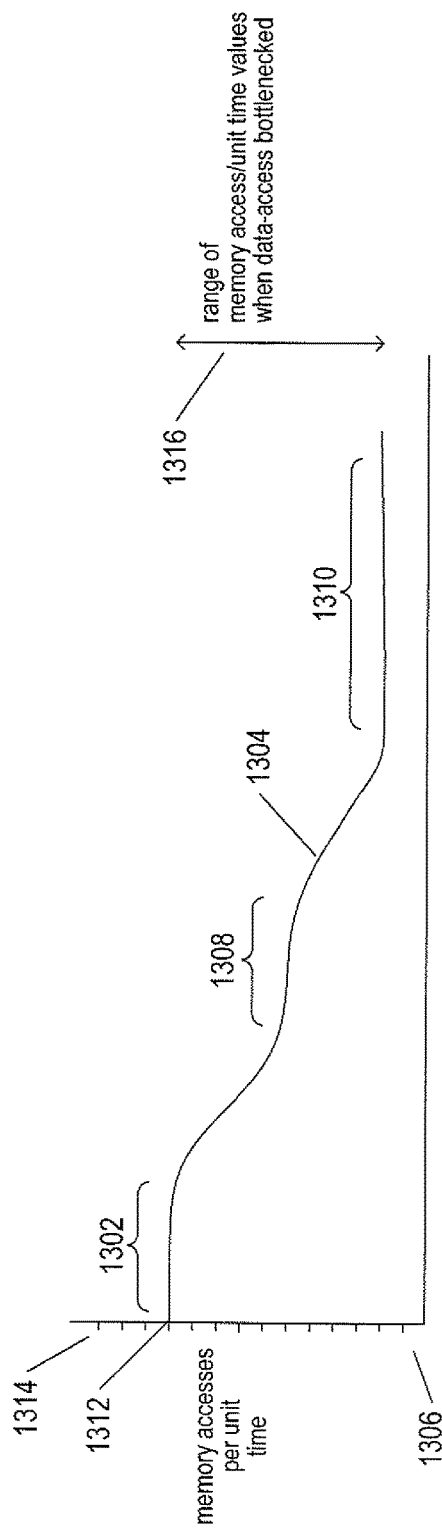
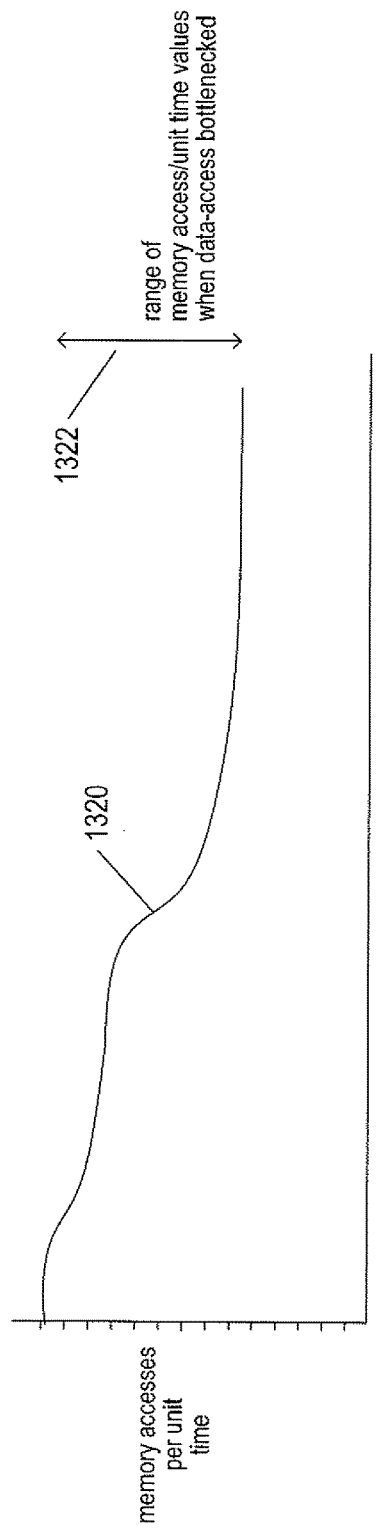

```
private void MemCalc()
{
    // Initialize
    KeepRunning = true;
    Random r = new Random();
    Stopwatch sw = new Stopwatch();

const int memsize = 25000;
    int[] arrayStorage = new int[memsize];

// Set up initial workload
    for (int i = 0; i < memsize; i++) {
        ArrayStorage[i] = r.Next(120000);
    } while(KeepRunning) {                                    // 2614
        Thread.Sleep(500);
        sw.Restart();                                       // 2608
        for (int i = 0; i < memsize - 1; i++){
            int x = arrayStorage[i] + arrayStorage[r.Next(memsize)];
            if (x > 100000) x = r.Next(10000);              // 2612
            arrayStorage[i] = x;
        }
        Int64 elapsedTicks = sw.ElapsedTicks;               // 2610
        lock (lockThis) { memTestTime = elapsedTicks; } // Send to main thread
    }
}
```

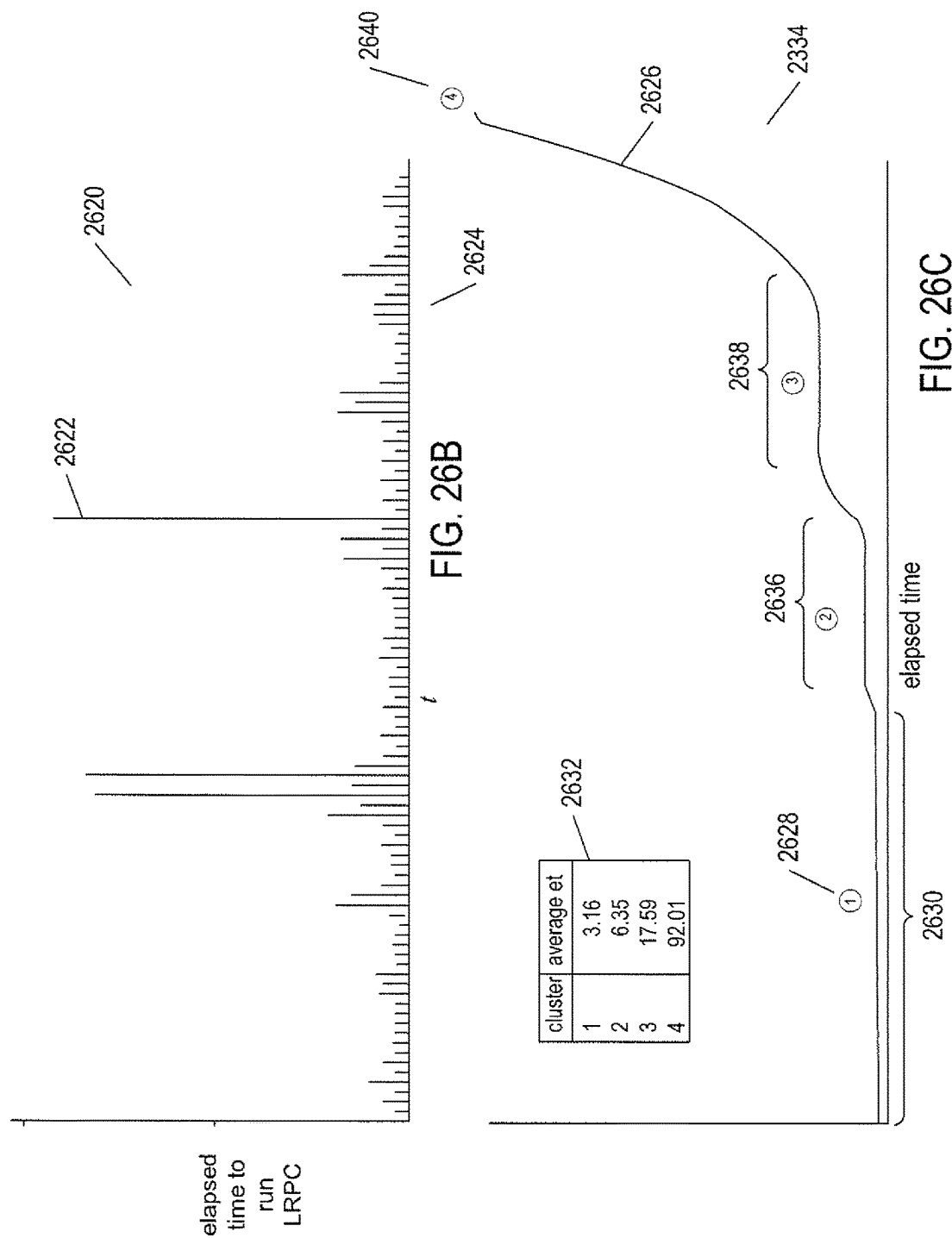

```
private void DiskCalc()
{
        const int blockSize = 100;
        const int blockCount = 100000;
        byte[] buff = new byte[blockSize];
        Stopwatch sw = new Stopwatch();
        Random rnd = new Random(DateTime.Now.Millisecond);

//Initialize File
        FileStream fs =
           new FileStream("C:\\tmp\\BlockReadWriteTest.tmp", FileMode.OpenOrCreate);
        for (int i = 0; i < blockCount; i++)
        {
                rnd.NextBytes(buff);
                fs.Write(buff, 0, blockSize);
        }
        fs.Close();

fs = new FileStream("C:\\tmp\\BlockReadWriteTest.tmp", FileMode.Open);
        while (KeepRunning)
        {
                Thread.Sleep(500);
                sw.Restart();
                int offset = rnd.Next(blockCount);

for (int x = 0; x < 2; x++)
                {
                        int nextoff;
                        do { nextoff = rnd.Next(blockCount);
                           } while (Math.Abs((offset - nextoff)) > (blockCount/5));

fs.Seek(offset*blockSize, SeekOrigin.Begin);
                        fs.Read(buff, 0, blockSize);
                        rnd.NextBytes(buff);
                        offset = rnd.Next(blockCount);
                        fs.Seek(offset*blockSize, SeekOrigin.Begin);
                        fs.Write(buff, 0, blockSize);
                }
                Int64 ticks = sw.ElapsedTicks;
                lock (lockThis) { diskTestTime = ticks; }
        }
        fs.Close();
}
```

(2702 labels the inner `for` block)

FIG. 27

```
private void NetCalc()
{
    Stopwatch sw = new Stopwatch();
    while (KeepRunning)
    {
        Thread.Sleep(500);
        sw.Restart();
        string sURL;
        sURL = "http://127.0.0.1";
        // sURL = "http://i.ytimg.com/vi/JYPV0Co7STc/maxresdefault.jpg";
        WebRequest wrGETURL;
        wrGETURL = WebRequest.Create(sURL);

Stream objStream;
        objStream = wrGETURL.GetResponse().GetResponseStream();

StreamReader objReader = new StreamReader(objStream);

string sLine = "";
        int i = 0;

while (sLine != null)
        {
            i++;
            sLine = objReader.ReadLine();
        }
        Int64 ticks = sw.ElapsedTicks;
        lock (lockThis)
        {
            NetTestTime = ticks;
        }
    }
}
```

FIG. 28

LOAD RESPONSE PERFORMANCE COUNTERS

TECHNICAL FIELD

The current document is directed to performance monitoring and, in particular, to load response performance counters ("LRPCs") that are implemented to measure the performance of components and subsystems within complex computer systems.

BACKGROUND

Performance monitoring is an integral aspect of computational-system development. Modern computational systems are extremely complex electro-optico-mechanical systems with thousands of individual components, many including integrated circuits that may each include millions of submicroscale active and passive electronic subcomponents. To manage this complexity, modern computational systems feature many layers of hierarchical control and organization, from low-level hardware controllers and control circuits all the way up to complex control components and subsystems, including firmware controllers and computer-instruction-implemented subsystems, including virtualization layers, operating systems, and application programs, often comprising millions, tens of millions, or more computer instructions compiled from complex computer programs. In general, there are an essentially limitless different number of ways in which these control subsystems can be implemented and deployed to provide any number of different sets of features and operational behaviors. In many cases, even small changes in the sequence of computer-instruction execution can lead to large changes in the computational efficiency, accuracy and robustness, and latencies associated with the complex computational systems.

While careful design and implementation of the many different layers of control systems and organizations of components within complex computational systems can lead to reasonable levels of performance, it is often not possible, because of the complexity of the hierarchical levels of control and organization, and the unpredictable nature of workloads, to anticipate the various problems and pitfalls that arise when the hierarchical levels of control and organization are deployed in a physical system. As a result, many thousands, hundreds of thousands, or more man hours of tuning, partial redesign, and optimization are often needed to achieve desired performance levels. These activities are all based on various types of performance-monitoring efforts that are used to monitor and evaluate operation of the complex computational systems. Performance monitoring is also generally hierarchically structured, from high-level benchmark tests that measure the efficiency and throughput of the computational systems as they execute high-level tests to targeted testing of smaller subassemblies of components and individual routines within complex control programs. In the past decades, computer processors have been enhanced with performance-monitoring units ("PMUs") that allow various types of events and operational activities that occur during processor operation to be counted over defined time intervals. The performance-monitoring units generally comprise register-and-instruction interfaces to underlying event-monitoring hardware features. The type of low-level performance monitoring provided by PMUs can often reveal inefficiencies and deficiencies in the design and operation of higher-level control systems, including virtualization layers and operating systems. Unfortunately, the PMUs are generally implemented to count the occurrences of specific processor events, such as memory accesses, cache misses, and other such low-level processor events. In many cases, there is no straightforward connection between the counts of particular events and higher-level system problems and anomalies, including bottlenecks. By contrast, higher level benchmark testing and software programs devised to test computer systems may often fail to capture data at sufficient granularity and frequency to reveal underlying causes of system problems and anomalies, including bottlenecks. As a result, system analysts, designers, and administrators may currently be unable to acquire and access, through system testing and monitoring, much potentially valuable information that would allow for the identification and diagnosis of many types of system problems and anomalies.

SUMMARY

The current document is directed to a new class of performance-monitoring tools referred as load response performance counters ("LRPCs"). Load response performance counters are implemented to periodically run a task within a computer system in order to apply a specific load to a particular subsystem or component of the computer system and to measure, at intervals, a response time for completing the task. By monitoring the response times, various types of problems, anomalies, and bottlenecks associated with the subsystem or component can be identified and characterized. The design and implementation of particular LRPCs can be precisely tailored to particular components and subsystems at any of many different hierarchical levels, granularities, and temporal ranges in order to monitor system operation and function.

BRIEF DESCRIPTION OF THE DRAWINGS

FIG. 12 shows a small test routine that accesses memory.

FIGS. 13A-B show hypothetical plots of the memory-accesses-per-unit-time values obtained through the memory-accesses hardware performance counter while running the routine shown in FIG. 12 with different values for the symbolic constant DATA_INCREMENT and with different lengths of the memory block traversed by the routine, DATA_END–DATA_START.

FIGS. 26A-28 provide examples of LRPC-code implementations.

DETAILED DESCRIPTION OF EMBODIMENTS

Figure 1:
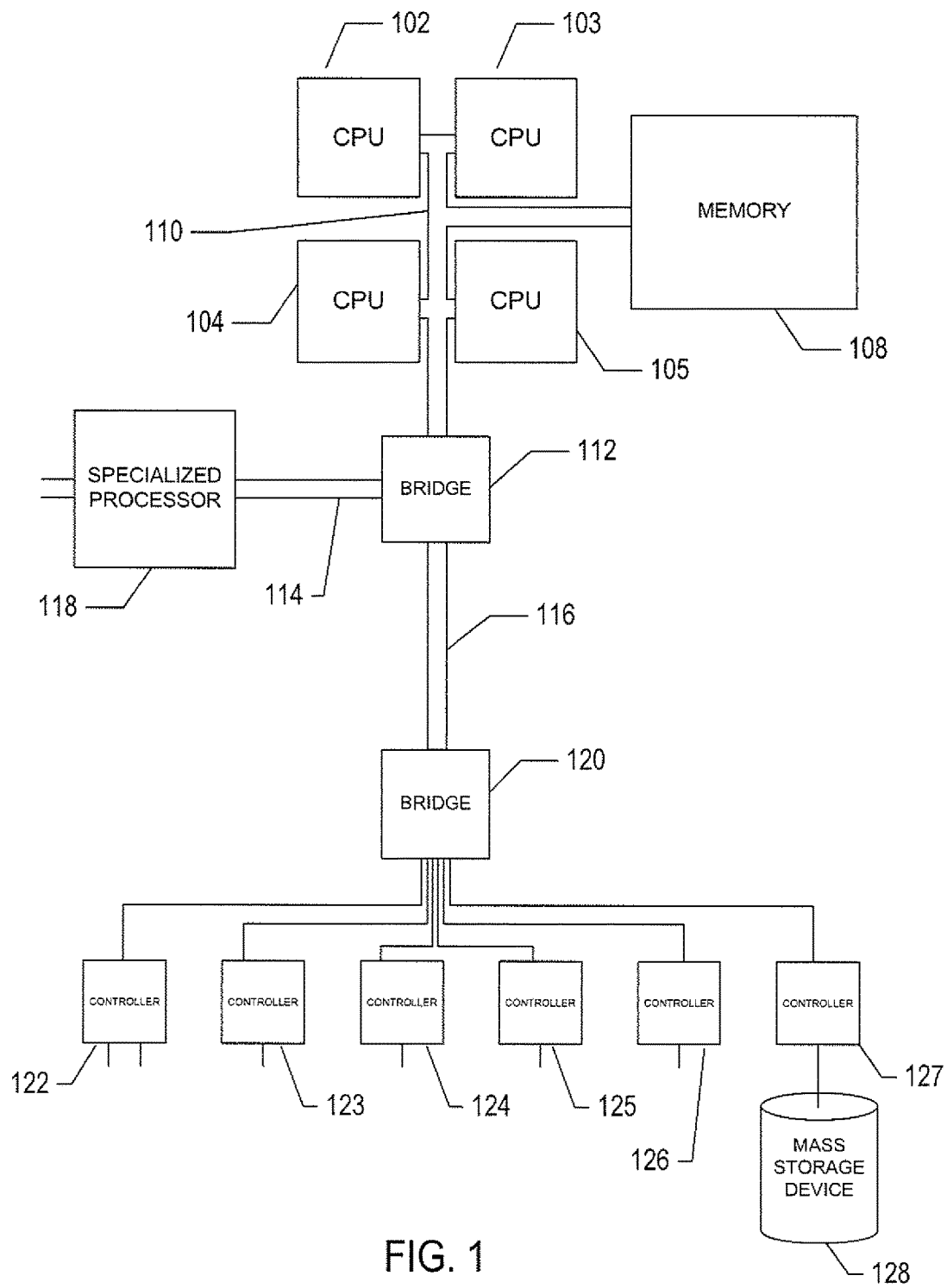
FIG. 1 provides a general architectural diagram for various types of computers.

The current document is directed to load response performance counters ("LRPCs"), a new type of system monitoring tool that can be implemented and designed to fall within a particular region of a parametric space, described below, in order to precisely and specifically monitor performance and operational characteristics of particular subsystems and components of a complex computer system. In a first subsection, below, a detailed description of computer hardware, complex computational systems, and virtualization is provided with reference to FIGS. 1-10. In a second subsection, performance counters and problems associated with performance counters are discussed with reference to FIGS. 11A-23D. In a third subsection, implementations of the currently disclosed load response performance counters are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
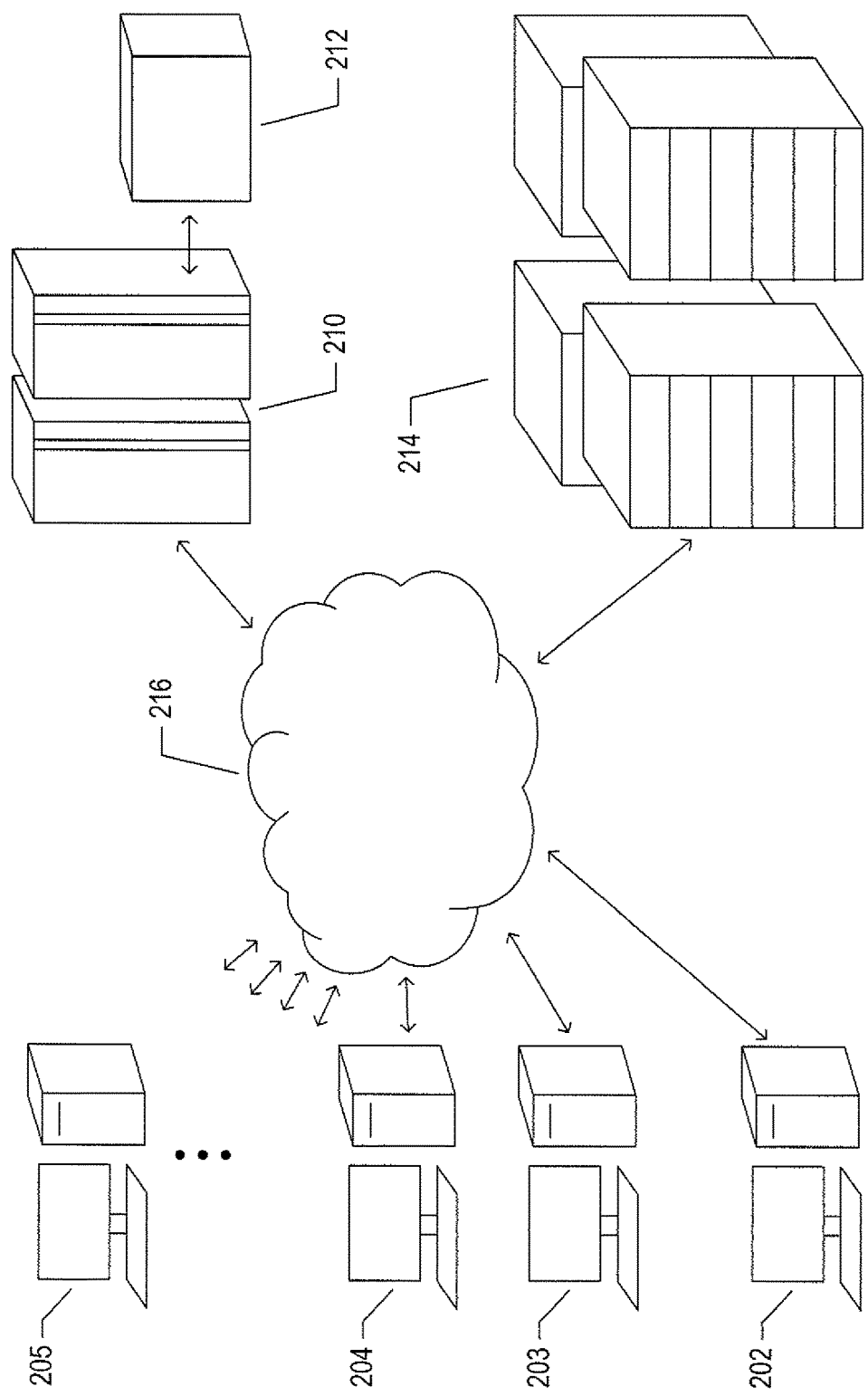
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
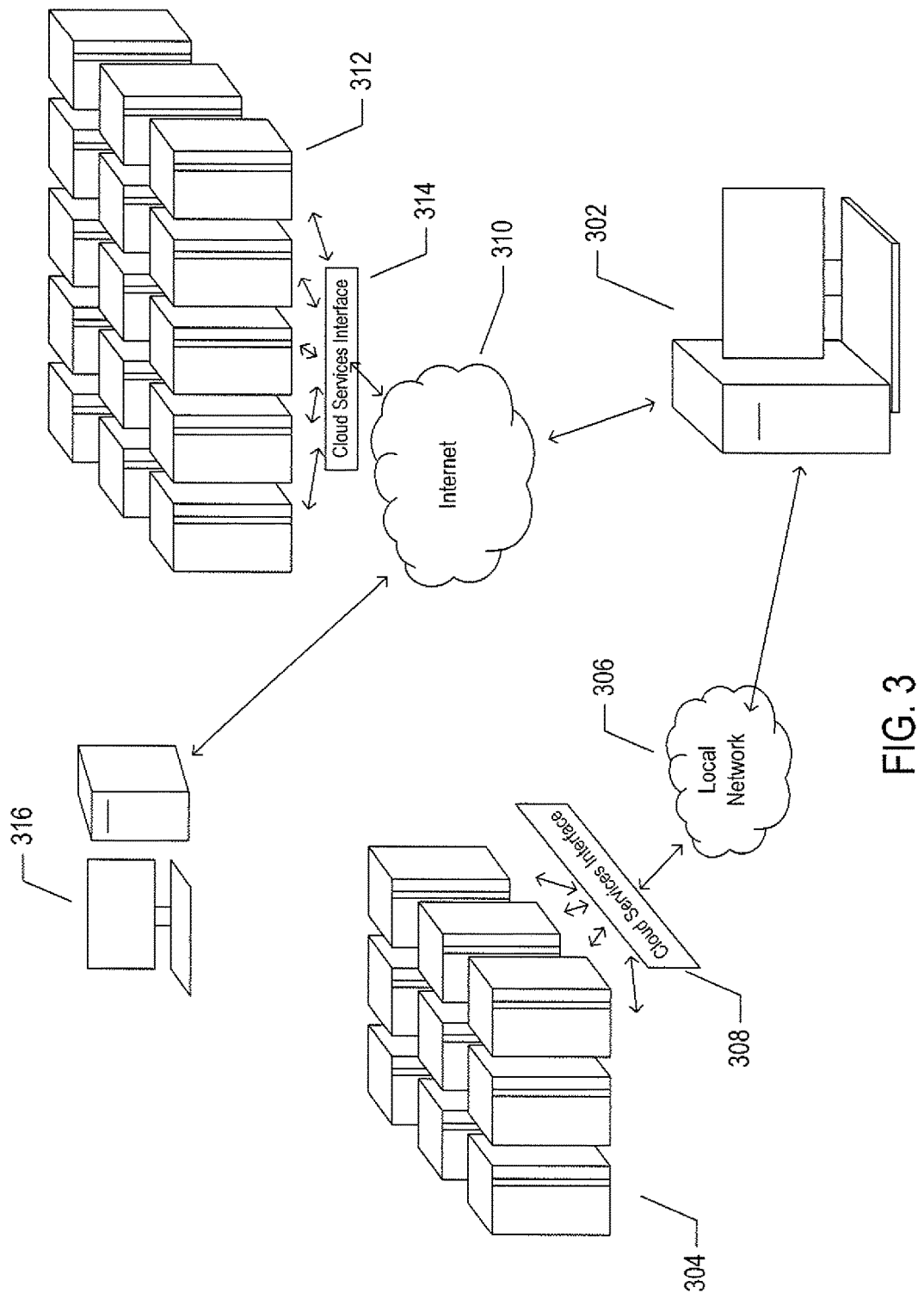
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
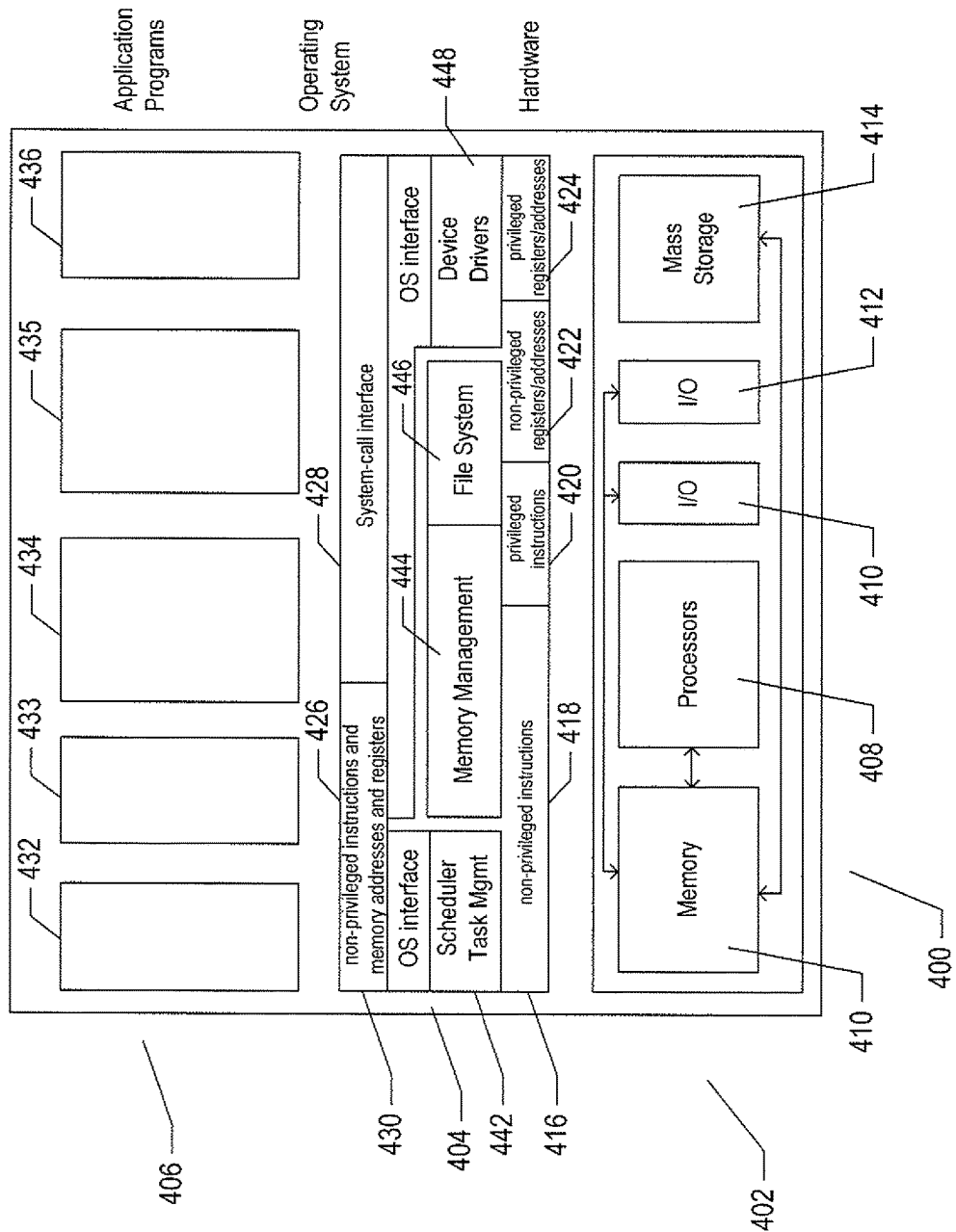
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
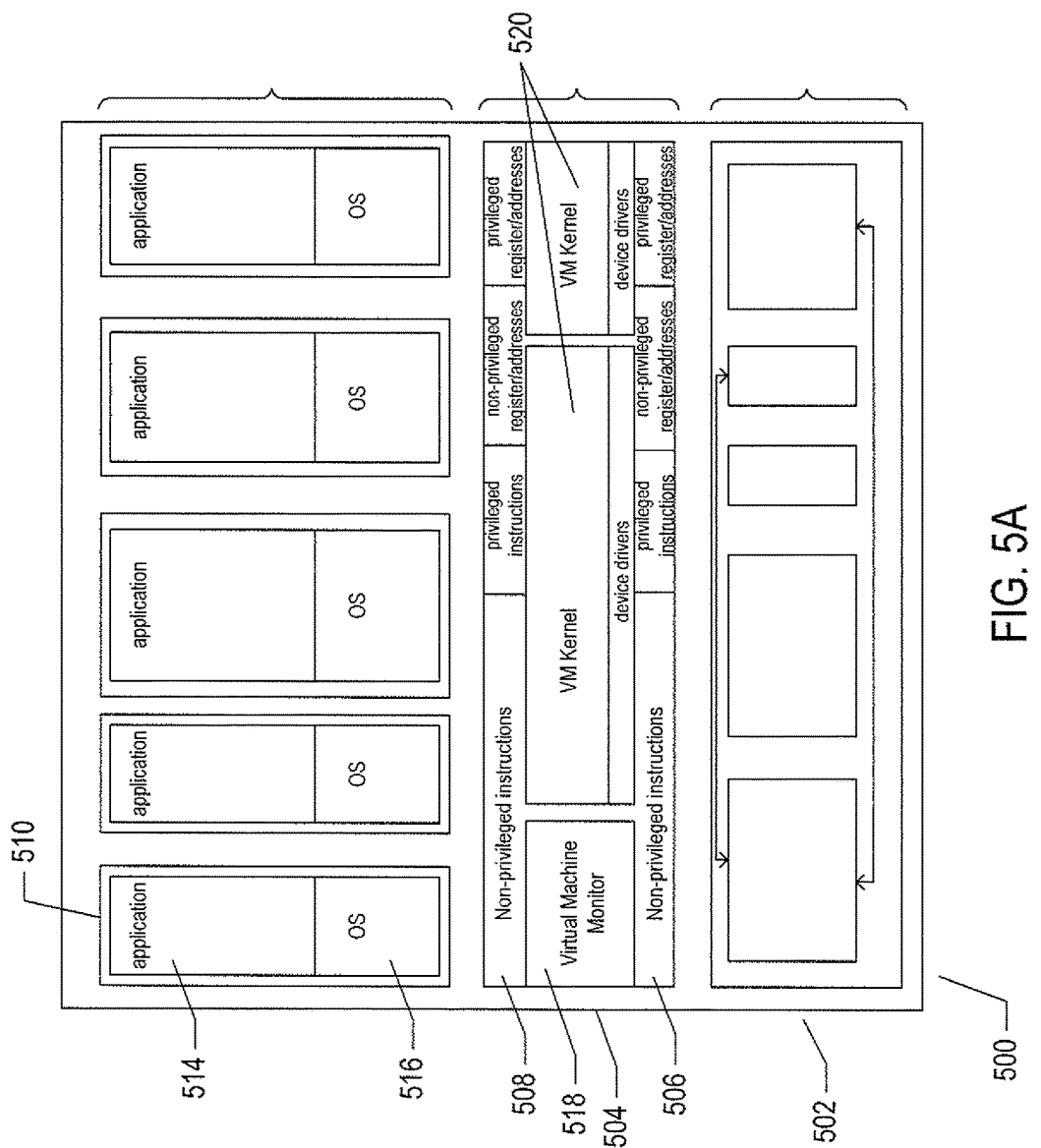
FIGS. 5A-B illustrate two types of virtual machine and virtual-machine execution environments.
Figure 5B:
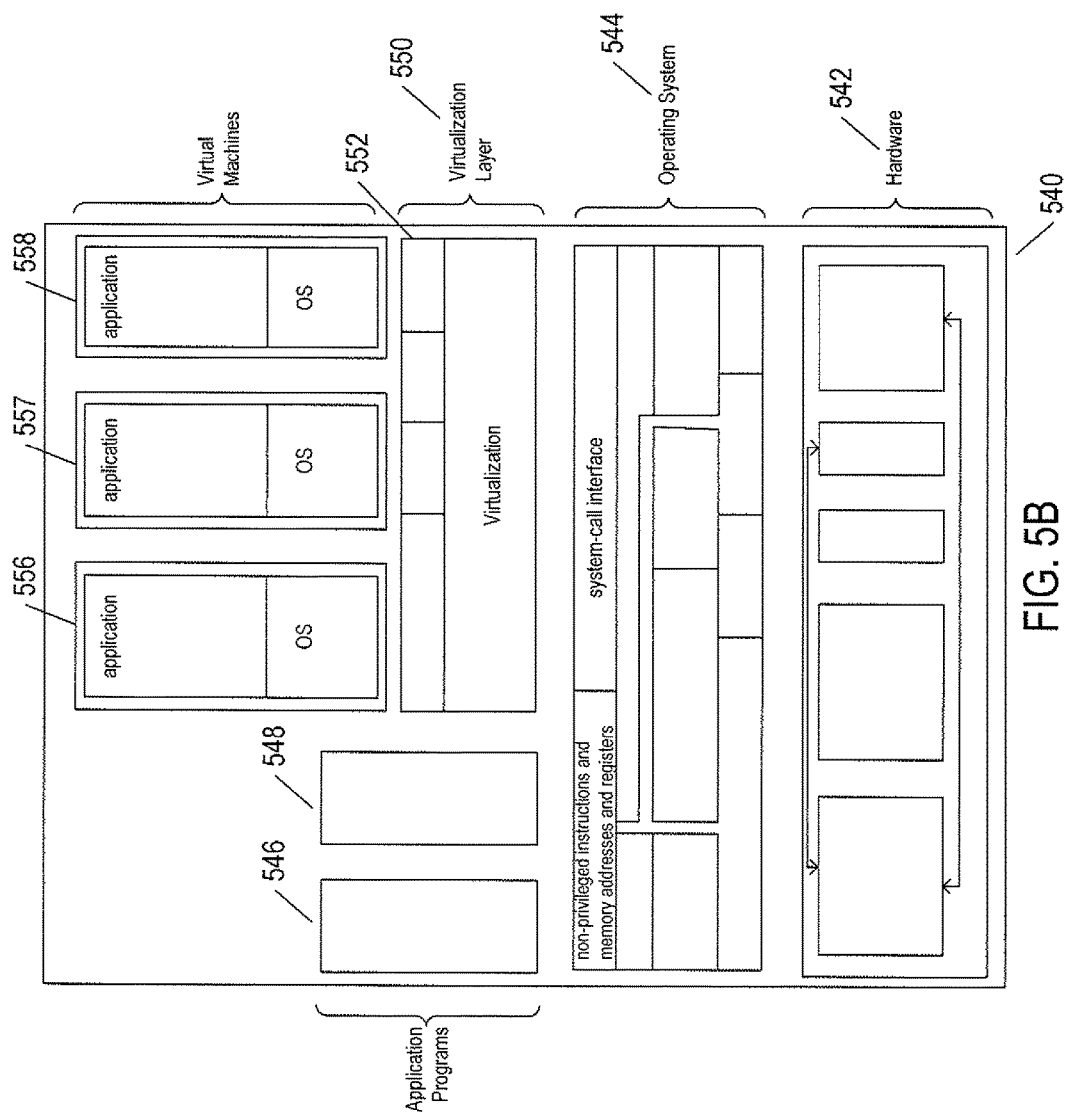

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
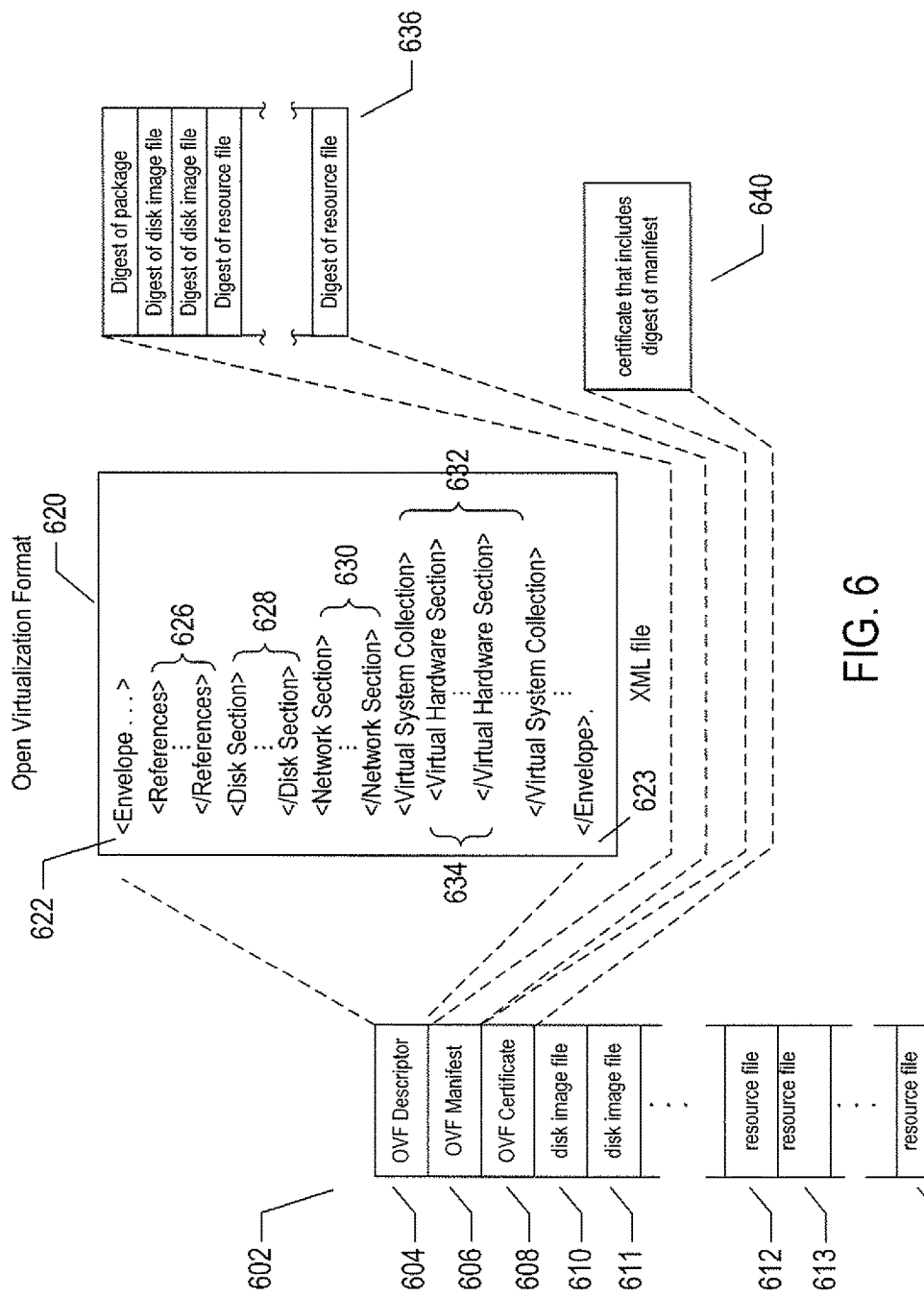
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
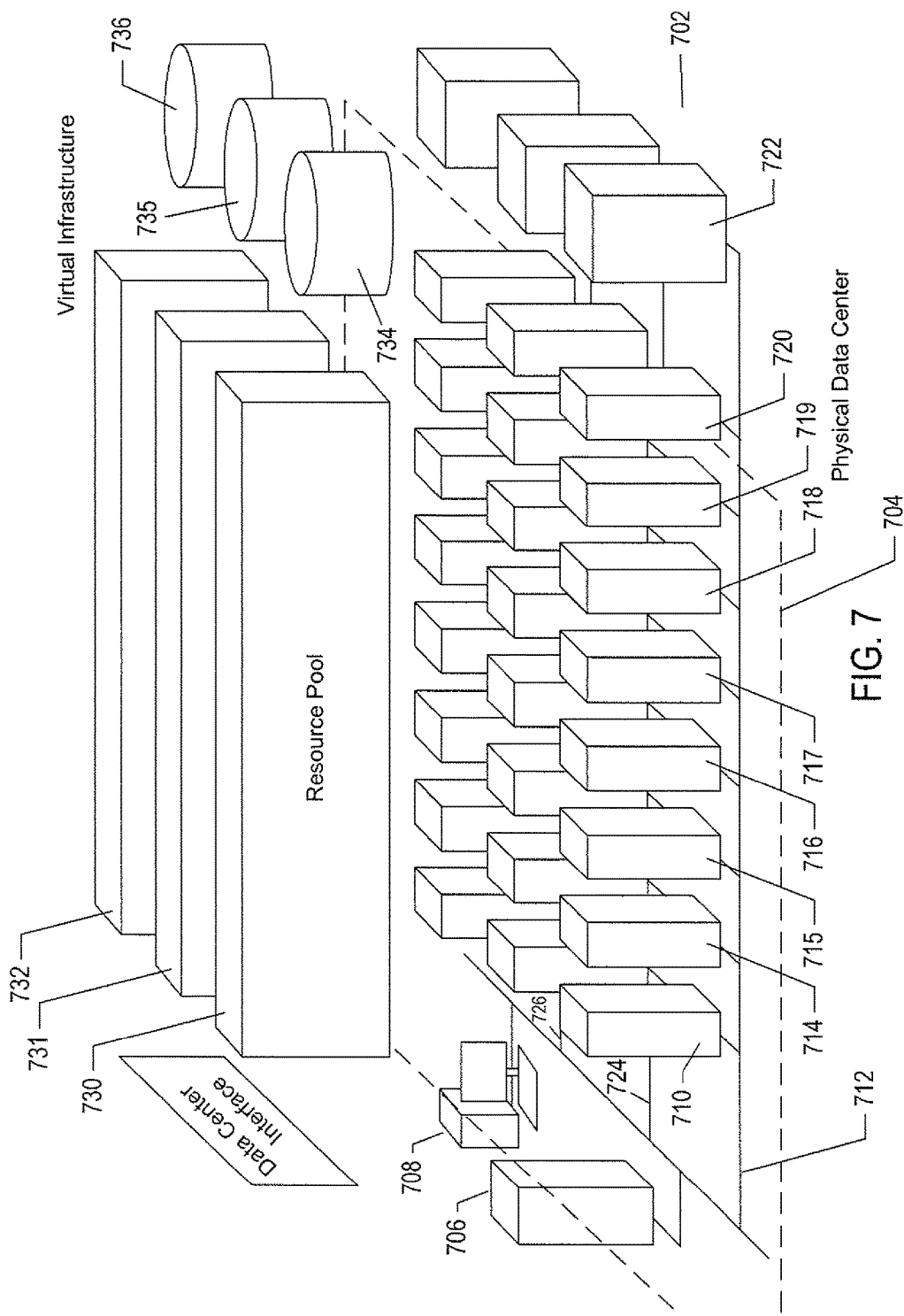
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
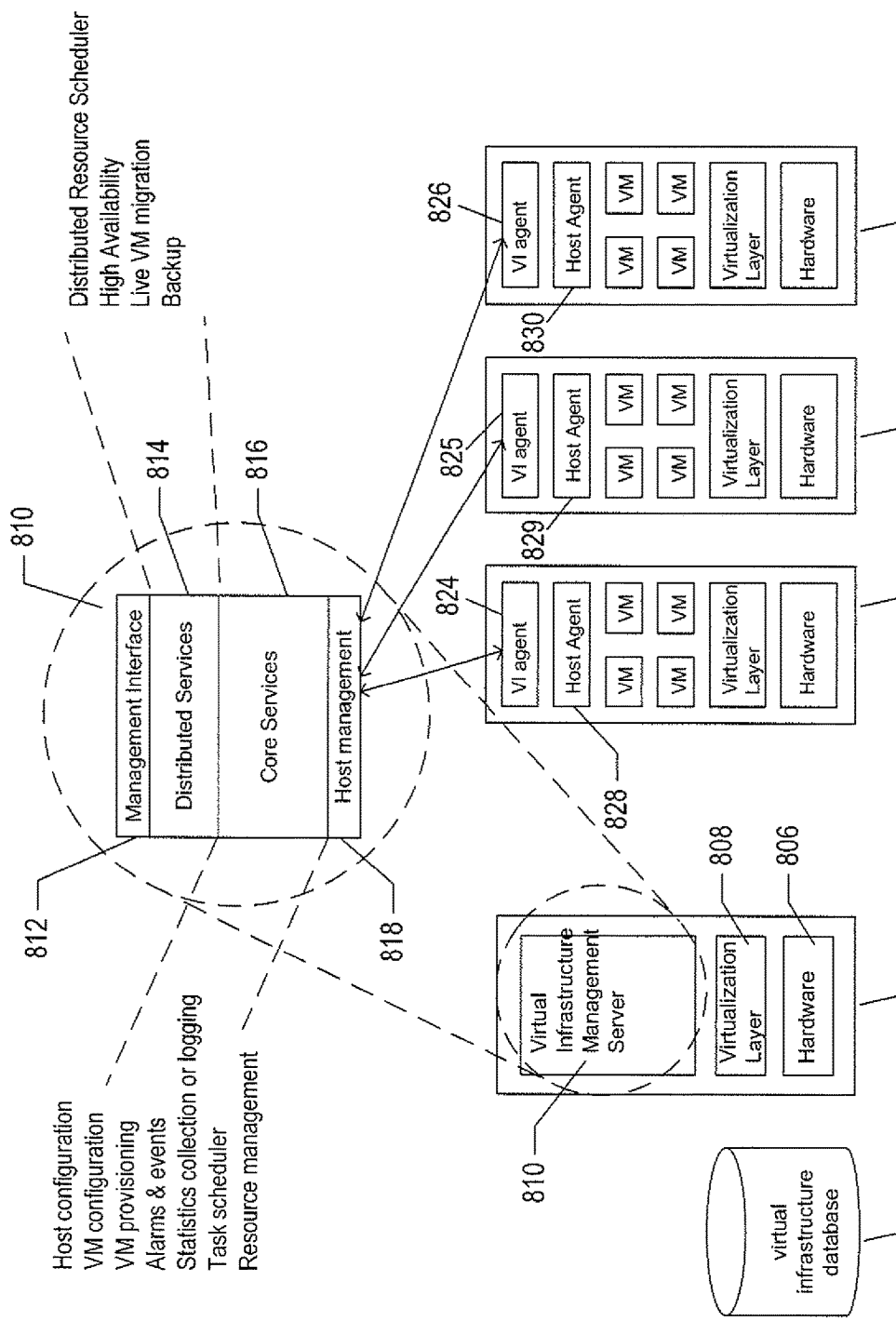
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
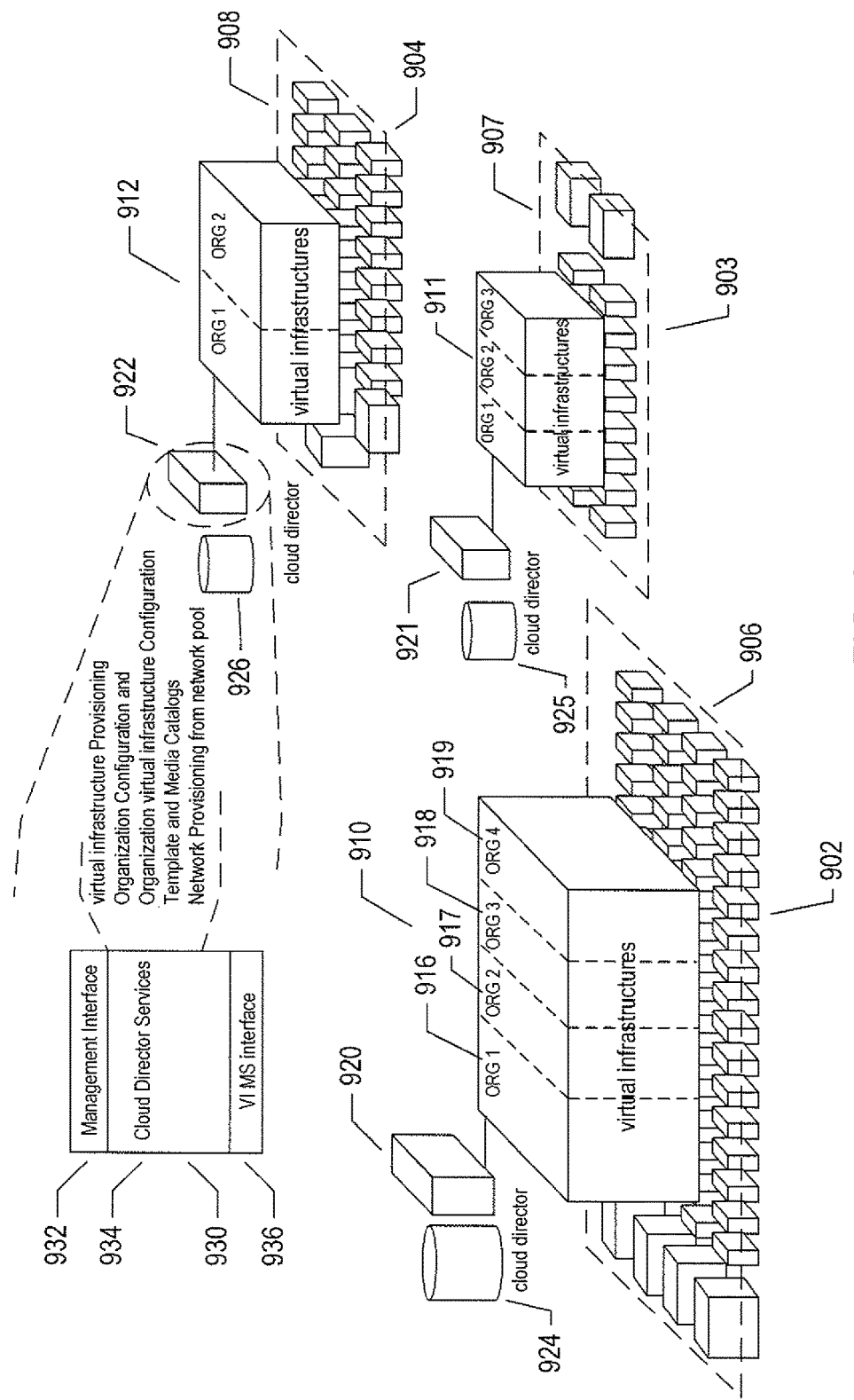
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
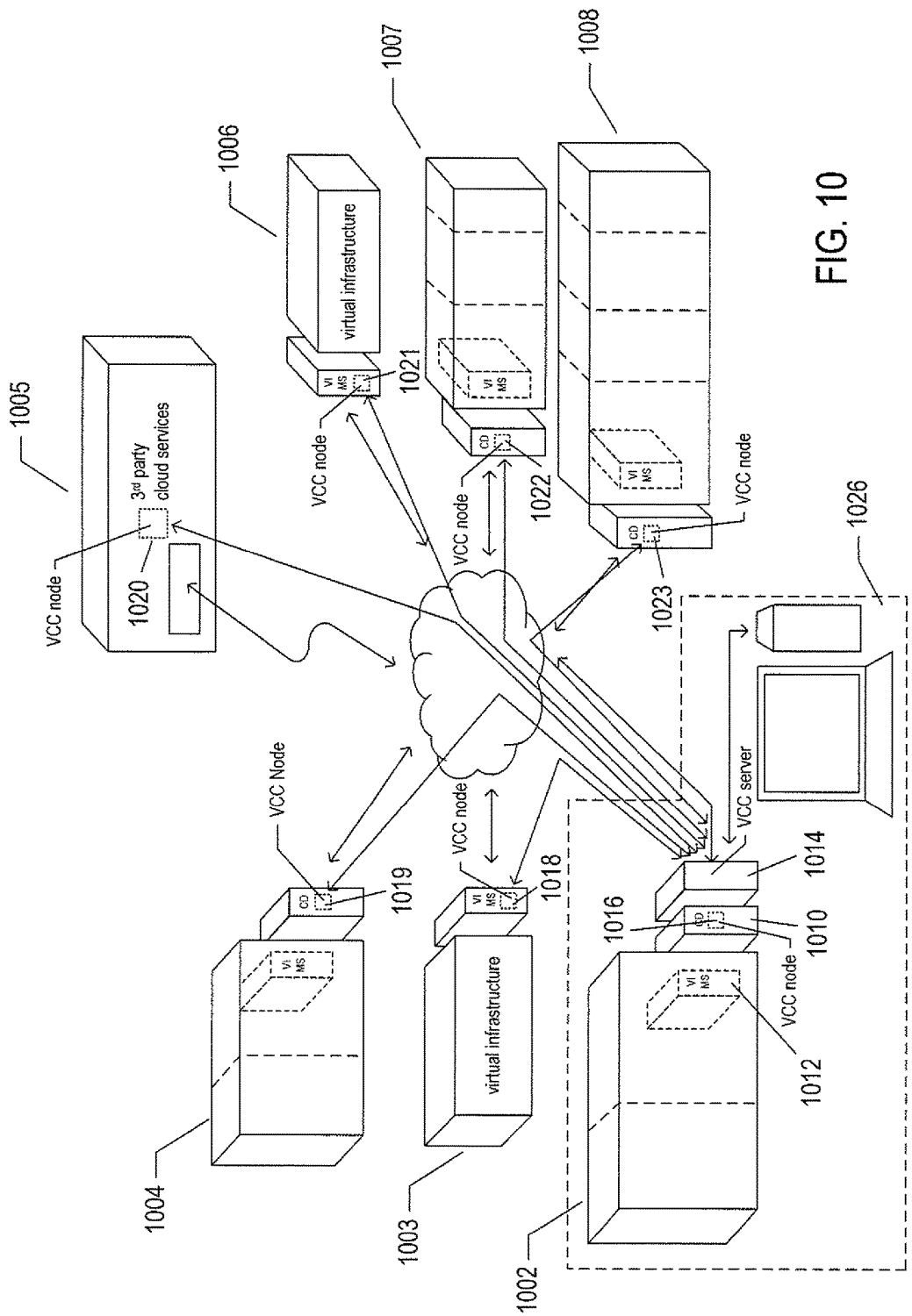
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Performance Counters and Problems Associated with Performance Counters

Figure 11A:
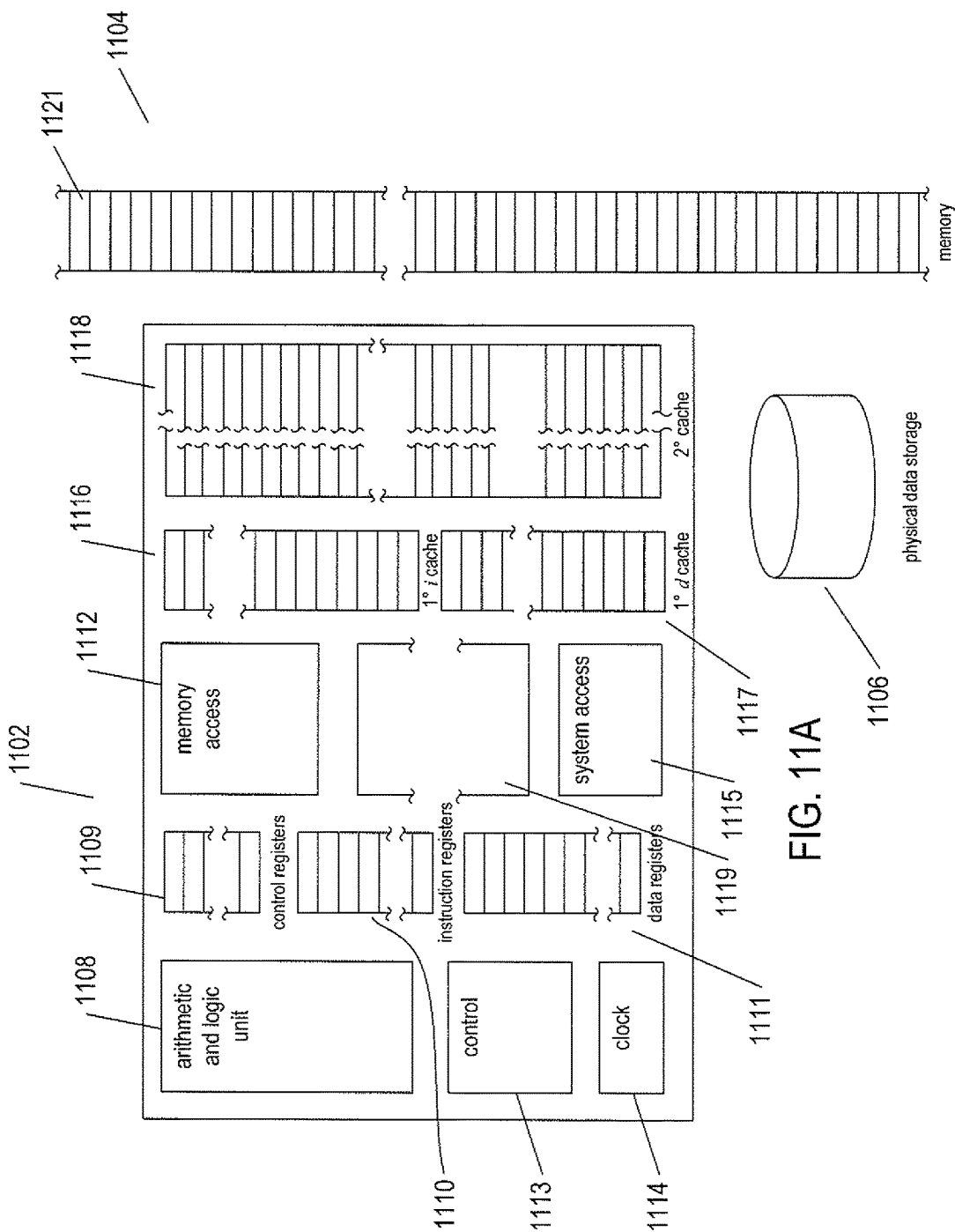
FIGS. 11A-C illustrate a hypothetical computer system that is used, in the following discussion, to illustrate deficiencies of traditional hardware performance counters.
Figure 11B:
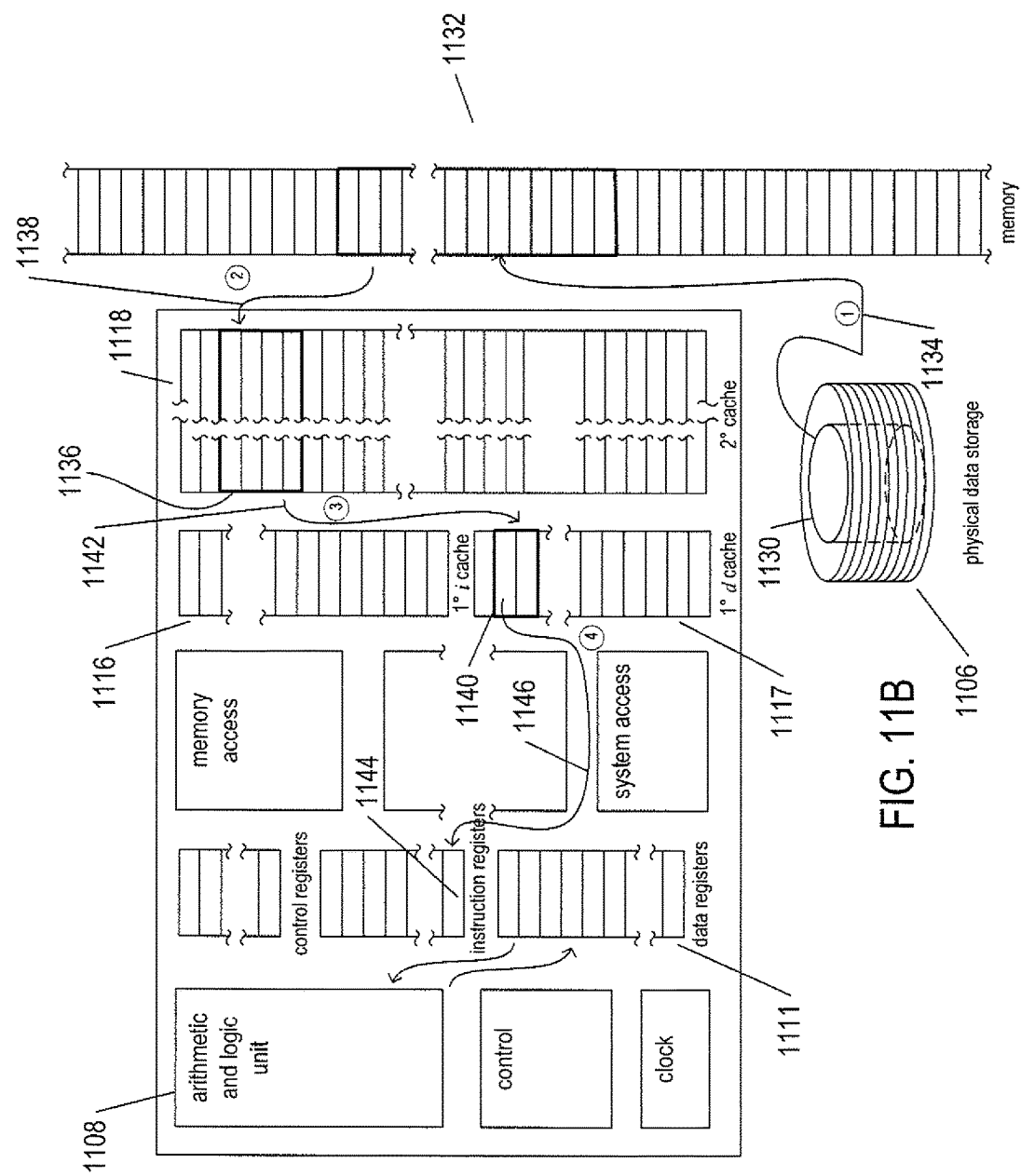
Figure 11C:
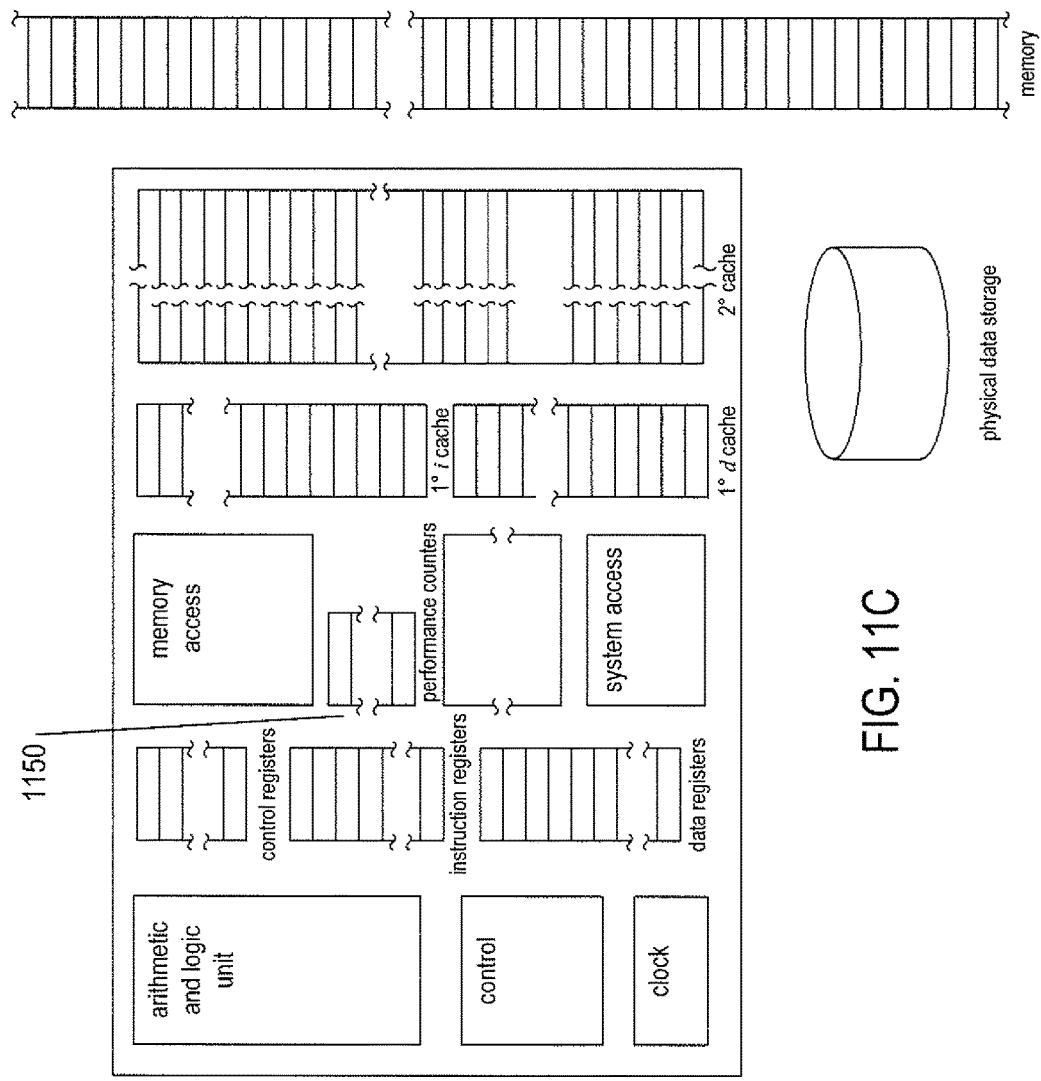

FIGS. 11A-C illustrate a hypothetical computer system that is used, in the following discussion, to illustrate deficiencies of traditional hardware performance counters, also referred to below as performance-monitoring units ("PMUs"). The hypothetical system includes a processor 1102, a memory 1104, and a physical data-storage device 1106. The processor includes an arithmetic and logic unit 1108, control registers 1109, instruction registers 1110, data registers 1111, a memory-access controller 1112, a control unit 1113 that coordinates operation and interoperation of the various processor components, a hardware clock 1114, a system-access controller 1115, a primary instruction cache 1116, a primary data cache 1117, a secondary combined data and instruction cache 1118, and other components represented by the rectangle of indeterminate size 1119 included in the block diagram of the processor 1102. The memory 1104 is represented as a linear address space, with each cell or element, such as cell 1121, representing a unit of memory storage, such as a 64-bit word.

FIG. 11B illustrates using the examples system shown in FIG. 11A, how data and instructions migrate from the physical data-storage device through memory into processor caches and registers in order to be executed and operated on, respectively, by the processor. In general, both data and instructions are stored in the non-volatile physical data-storage device 1106. Data blocks and sectors, represented in FIG. 11B by a thin cylinder 1130 comprising tracks read together by a multi-read disk head from multiple disk platters, is transferred under processor control to one or more blocks or pages of memory 1132. The data blocks contain computer instructions and data. The movement of instructions and data from the physical data-storage device to memory is represented by a first curved arrow 1134 in FIG. 11B. In order for instructions to be executed and data to be operated on, the instructions and data are moved from memory to the processor. First, assuming the memory block or page 1132 contains instructions, the block of instructions is moved to the secondary cache 1136, as represented by curved arrow 1138. A portion of the instructions is moved from the secondary cache to the primary instruction cache 1140, as represented by curved arrow 1142. A particular instruction is executed by moving the instruction from the primary cache to an instruction register 1144, as represented by arrow 1146. The instruction is then fetched from the instruction register by the arithmetic and logic unit 1108 and executed. Instructions that produce data values result in storage of computed data values in data registers. Similarly, data migrates from the physical data-storage device to memory, from memory to the secondary cache, from the secondary cache to the primary data cache 1117, and from the primary data cache to the data registers 1111. The processor operates on the data registers, as controlled by instructions fetched and executed from the instruction registers.

The instruction and data registers represent the most expensive and most quickly accessed data-storage units within the computer system. The next most expensive and next most quickly accessed storage components are the primary instruction cache 1116 and the primary data cache 1117. The secondary cache 1118 is somewhat less expensive and more slowly accessed. The memory 1132 is much less expensive and much less quickly accessed by the processor, and the physical data-storage device 1106 is the least expensive data-storage component, on a per-instruction or per-data-unit basis, and is much more slowly accessed by the computer system. The processor caches and registers are organized so that instructions that are repetitively executed within a short span of time, such as instructions within a tight loop of a routine, may reside in the instruction registers or the instruction registers combined with the primary instruction cache, in order to facilitate rapid iterative execution of the loop. Similarly, instructions of a longer, but repetitively executed routine tend to reside in the primary instruction cache or in a combination of the primary instruction cache and the secondary cache, in order to avoid the need to repetitively access instructions of the routine from memory. In similar fashion, the instructions of a large program or software component may reside, over long periods of time, within memory 1132, rather than being repetitively read into memory from the physical data-storage device. In modern computer systems, the address space corresponding to memory is virtual, having a much larger virtual length than the actual length of the physical address space represented by physical memory components, with data transferred back and forth from the physical data-storage device and memory, under processor control, in order to support the illusion of a much larger virtual address space than can be contained, at any particular point in time, in the smaller physical memory.

Any particular component or subsystem of the simple computer system may, over any given period of time, represent a computational bottleneck that limits the throughput of the computer system. For example, were the computer system to execute a tiny routine that can be completely stored within the instruction registers and that operates on only a few data items that can be stored in the data registers, the computational throughput would likely be limited by the speed of the arithmetic and logic unit and various internal communication pathways within the processor. By contrast, were the computing system executing a modestly sized program that could be stored within the secondary cache 1118 and that operated on data that could be stored in either the primary data cache or a combination of the primary data cache and the secondary cache, the computational throughput of the computer system may be limited by the processor control components and internal busses or signal paths through which data is transferred back and forth between the caches and registers. When the computer system runs a multi-tasking operating system that, in turn, runs multiple routines on behalf of multiple users, requiring instructions and data to be constantly moved between memory and processor caches, the throughput of the computer system may well be constrained and governed by the speed of a memory bus through which instructions and data pass between the memory and the processor and the processor and memory. In certain cases, when very large amount of data are read in and modified from the physical data-storage device, the throughput of the computer system may be constrained by the speed of access to data within the physical data-storage device. In certain cases, the computational throughput may be limited by complex interactions between components while in other cases, computational throughput of the system may be limited by a single component or subsystem that represents a bottleneck within the computer system with respect to the tasks being carried out by the computer system. In large virtual data centers, many different components, subsystems, collections of discrete systems, networking infrastructure, and other subsystems and subcomponents may represent bottlenecks, under particular loads at particular times, within the complex, distributed virtual data centers.

It is often the case that designers, developers, administrators, and users of computer systems apply great efforts and time in analyzing operation of a computer system in order to attempt to tune and optimize operation of the computer system in order to obtain a maximum possible computational throughput for particular tasks, sets of tasks, or more complexly defined computational loads and environments. A variety of different methods may be employed in order to analyze the operation and throughput of a computer system in order to identify throughput-constraining subsystem and components, including bottlenecks that limit or constrain the computational throughput. Examples include benchmark testing, ad hoc test programs and computational loads, and use of code instrumentation, software performance counters, and hardware performance counters. Quite often, an entire suite of different methodologies is employed, along with analytical programs and methodologies to interpret copious amounts data produced by these methodologies during system analysis and monitoring.

FIG. 11C illustrates hardware performance counters that may be included in a processor in order to facilitate performance analysis and monitoring. As shown in FIG. 11C, the performance counters 1150 generate a small set of hardware registers that can be initialized, under software control, to count particular types of hardware events. As one example, a hardware performance counter may be initialized to count the number of memory accesses carried out by the processor. A monitoring routine can accumulate a count of the memory accesses over a period of time and divide the number of memory accesses by the number of time units in the period of time in order to obtain a memory-access-per-time value that indicates the rate at which data instructions are being transferred from memory to the processor. It might be naively expected that the memory-access rate could be monitored to determine a maximum memory-access rate for the system. Then, during those portions of system operation at which the memory-access rate is maximum, one might naively infer that the memory represents a bottleneck or constraint on computational throughput. However, this is not the case.

FIG. 12 shows a small test routine that accesses memory. The routine shown in FIG. 12 is written in a hypothetical assembly language. The routine fetches data from memory starting with a first address 1202, symbolically represented as "DATA_START," and ending with the memory address 1204 symbolically represented by "DATA_END." After each memory access, the routine skips to a next point in the range of memory from DATA_START to DATA_END to fetch a next memory value, with the skip, or interval, controlled by a value 1206 symbolically represented as "DATA_INCREMENT." In an outer loop 1210, the routine iteratively traverses the memory block defined by DATA_START and DATA_END until the routine has executed for a specified amount of time symbolically represented by "TIME" 1212. In an inner loop 1214, the routine carries out one traversal of the data block, accessing memory values at the interval specified by DATA_INCREMENT. As the routine executes, the memory-access hardware performance counter is employed to count the number of memory accesses. The number of memory accesses is divided by the number of time units that elapse during execution of the routine to produce a value corresponding to the number of memory accesses per unit time.

FIGS. 13A-B show hypothetical plots of the memory-accesses-per-unit-time value obtained through the memory-accesses hardware performance counter while running the routine shown in FIG. 12 with respect to the value of the symbolic constant DATA_INCREMENT and with respect to the length of the memory block traversed by the routine, DATA_END–DATA_START. It is assumed that the computer system runs only the routine shown in FIG. 12. First considering of the plot shown in FIG. 13A, as the data increment is increased, assuming that the size of the memory block is sufficient to accommodate a traversal of the block using the increasing DATA_INCREMENT values, the likelihood that the data accessed by the routine is stored in the instruction registers or caches decreases. This is because, in the hypothetical system, a given data value stored in an instruction register must also occur in both the primary data cache and the secondary data cache. Because of the cache-replacement policies, as the value of the constant DATA_INCREMENT increases, and as the memory accesses are separated by ever-increasing intervals in the linear address space, each successive access to memory may involve reading blocks of data from the secondary cache to the primary cache and, with greater increases in the value of the constant DATA_INCREMENT, reading blocks of data from memory to the secondary cache. Initially, as shown in a first relatively horizontal portion 1302 of the curve 1304 shown in FIG. 13A, the DATA_INCREMENT value is sufficient small that most memory accesses involve either directly accessing data registers or moving data from the primary cache to the data registers prior to accessing the data registers. However, as the value of the constant DATA_INCREMENT increases, and as the program skips larger and larger amount of linear address space between memory accesses, many memory accesses involve moving data from the secondary cache to the primary data cache, and thus the number of memory accesses per unit time falls to a second, lower level represented by a second horizontal portion 1308 of the curve 1304. As the value of constant DATA_INCREMENT increases even further, many memory accesses involve moving data from memory to the secondary cache, and therefore the number of memory accesses per unit time falls to a third, lower level represented by a third horizontal section of the curve 1310.

Interestingly, at every point along the curve other than the point 1312 at which the curve 1304 intersects the vertical axis 1314, the system is constrained or bottlenecked by the rate at which data is accessed by the processor from the memory subsystem comprising the caches, memory, and the physical data-storage device along with internal and external memory busses and the memory-access unit. However, the number of memory accesses per unit time clearly varies significantly over a relatively large range 1316. Similarly, as shown in FIG. 13B, as the size of the block of memory repetitively accessed by the routine increases, memory accesses increasingly involve moving memory from the secondary cache to the primary cache and from memory to the secondary cache, slowing the rate of memory accessed by the processor. Again, even though the system is constrained or bottlenecked by the memory subsystem over almost the entire curve 1320 shown in the plot of FIG. 13B, the rate of memory accesses per unit time computed based on the hardware performance counter ranges over a relatively wide range of values 1322. Thus, the naive assumption that it can be determined when memory represents a throughput constraint, or bottleneck, based on a computed rate of memory accesses per unit time using a hardware performance counter is incorrect. The simple example of FIGS. 11A-13B is but one of many possible examples of how accumulated counts of processor events or higher-level transactions within a computer system does not provide sufficient information for reliably identifying bottlenecking subsystems and components within a complex computer system. This is because, in most cases, the nature of the set of tasks currently being performed by the computer system determines levels and ranges of event-occurrence rates, so that absolute event-occurrences rates, without additional information, are not reflective of whether or not particular components and subsystems are saturated or bottlenecked. Use of multiple performance counters that monitor different types of events can sometimes provide a better basis for inference, but even in this case, the rates of event occurrence are generally not directly related to bottlenecks and other computational-throughput constraints.

As mentioned above, there are many different types of performance-monitoring tools currently employed by systems analysts, system administrators, computer designers and developers, and users of complex computer systems. As a more detailed example of the types of tools currently available, and of the complexities associated with using these tools, hardware performance counters in multi-threaded, multi-core computer systems are next discussed, below, with reference to FIGS. 14-22.

Figure 14:
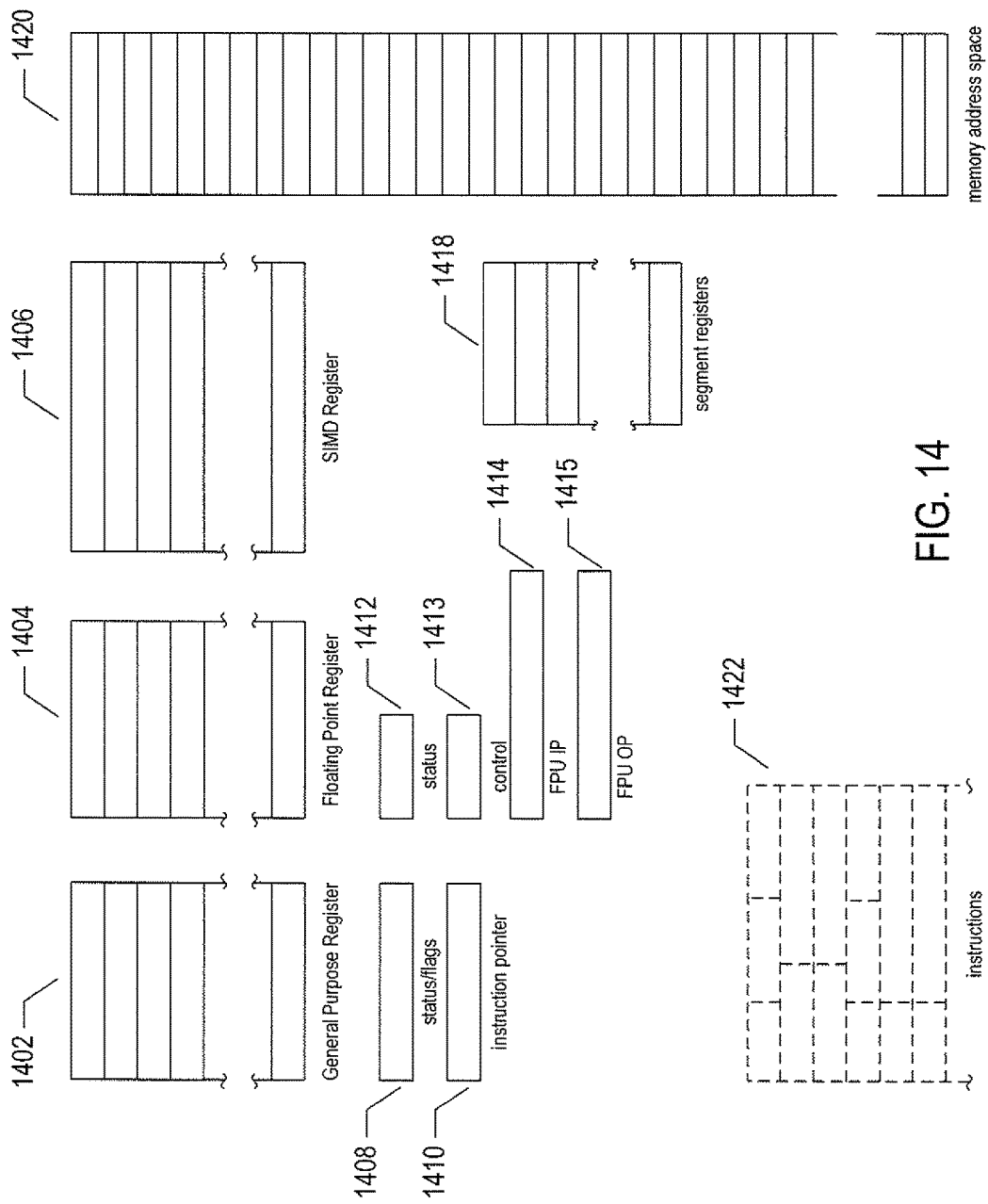
FIG. 14 illustrates an instruction-set architecture ("ISA") provided by a modern processor as the low-level execution environment for binary code and assembler code.

FIG. 14 illustrates an instruction-set architecture ("ISA") provided by a modern processor as the low-level execution environment for binary code and assembler code. The ISA commonly includes a set of general-purpose registers 1402, a set of floating-point registers 1404, a set of single-instruction-multiple-data ("SIMD") registers 1406, a status/flags register 1408, an instruction pointer 1410, special status 1412, control 1413, and instruction-pointer 1414 and operand 1415 registers for floating-point instruction execution, segment registers 1418 for segment-based addressing, a linear virtual-memory address space 1420, and the definitions and specifications of the various types of instructions that can be executed by the processor 1422. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 15:
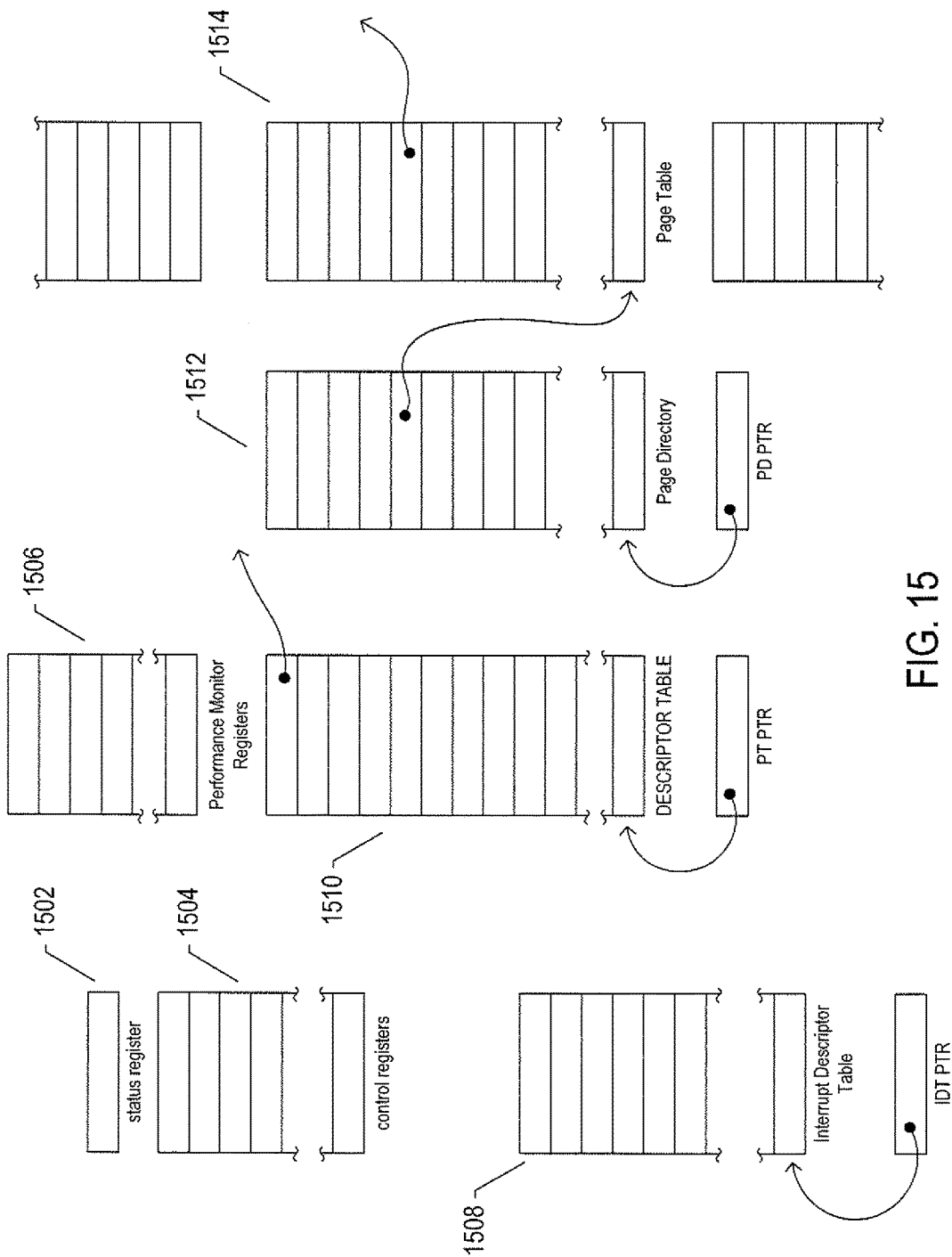
FIG. 15 illustrates an additional abstraction of processor features and resources used by virtual-machine monitors, operating systems, and other privileged control programs.

FIG. 15 illustrates an additional abstraction of processor features and resources used by virtual-machine monitors, operating systems, and other privileged control programs. These processor features, or hardware resources, can generally be accessed only by control programs operating at higher levels than the privilege level at which application programs execute. These system resources include an additional status register 1502, a set of additional control registers 1504, a set of performance-monitoring registers 1506, an interrupt-descriptor table 1508 that stores descriptions of entry points for interrupt handlers, the descriptions including references to memory descriptors stored in a descriptor table 1510. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 1512 that contains entries pointing to page tables, such as page table 1514, each of which, in turn, contains a physical memory address of a virtual-memory page.

Figure 16:
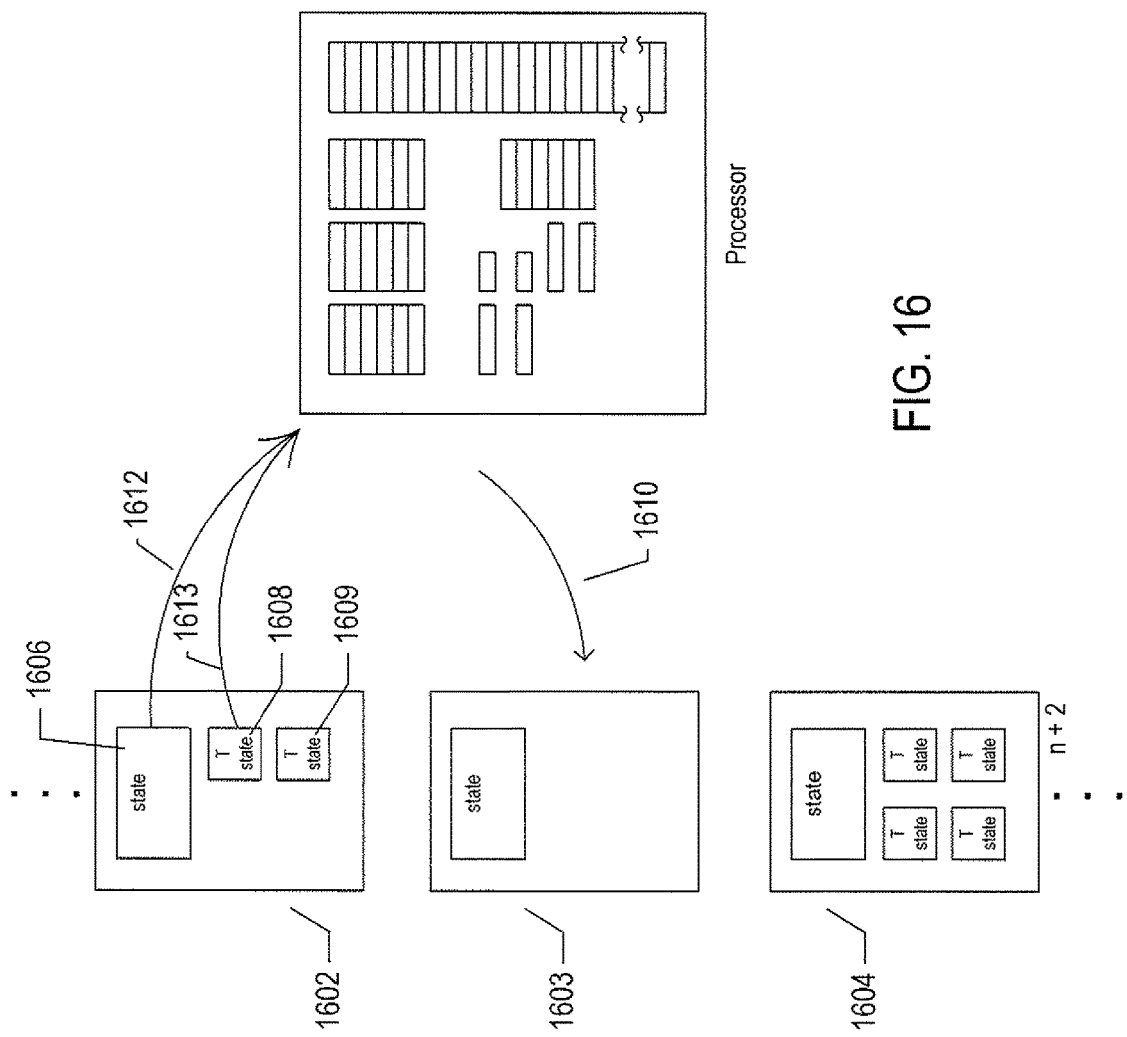
FIG. 16 illustrates a general technique for temporal multiplexing used by many operating systems.

In many modern operating systems, the operating system provides an execution environment for concurrent execution of a large number of processes, each corresponding to an executing application program, on one or a relatively small number of hardware processors by temporal multiplexing of process execution. FIG. 16 illustrates a general technique for temporal multiplexing used by many operating systems. The operating system maintains a linked list of process-context data structures, such as data structure 1602-1604, in memory. Each process-context data structure stores state information for the process, such as state information 1606 in data structure 1602, along with additional state for concurrently executing threads, such as thread states 1608-1609 in data structure 1602. The operating system generally provides blocks of time or blocks of execution cycles to the concurrently executing processes according to a process-execution-scheduling strategy, such as round-robin scheduling or various types of more complex scheduling strategies, many employing pre-emption of currently executing processes. Dormant processes are made executable by a context switch, as indicated in FIG. 16, during which a portion of the architectural state of a currently executing process is stored into an associated process-context data structure for the process, as represented by arrow 1610 in FIG. 16, and the stored portion of the architectural state of a dormant process is loaded into processor registers, as indicated by arrows 1612-1613 in FIG. 16. In general, a process is allowed to execute for some predetermined length of time or until the process is stalled or blocked, waiting for the availability of data or the occurrence of an event. When either the allotted amount of time or number of processor cycles have been used or when the process is stalled, a portion of the architectural state of the process and any concurrent threads executing within the context of the process are stored in the associated process-context data structure, freeing up the hardware resources mapped to the process in order to allow execution of a different process. In the operating-system context, threads are essentially lightweight processes with minimal thread-specific state. In many cases, each thread may have a thread-specific set of registers, but all the threads within a particular process context generally share the virtual-memory address space for the process. Thus, in general, the threads represent different execution instantiations of a particular application corresponding to the process within which the threads execute. One example of a multi-threaded application is a server application in which a new execution thread is launched to handle each incoming request. In general, an operating system may provide for simultaneous execution of as many threads as there are logical processors in the computing system controlled by the operating system. Until recently, the smallest granularity hardware resource for execution of an execution thread was an actual hardware processor. As discussed further below, in certain more recent and currently available processors, the smallest-granularity hardware resource supporting execution of a process or thread is a logical processor that corresponds to a hardware thread within an SMT processor or SMT-processor core.

Figure 17:
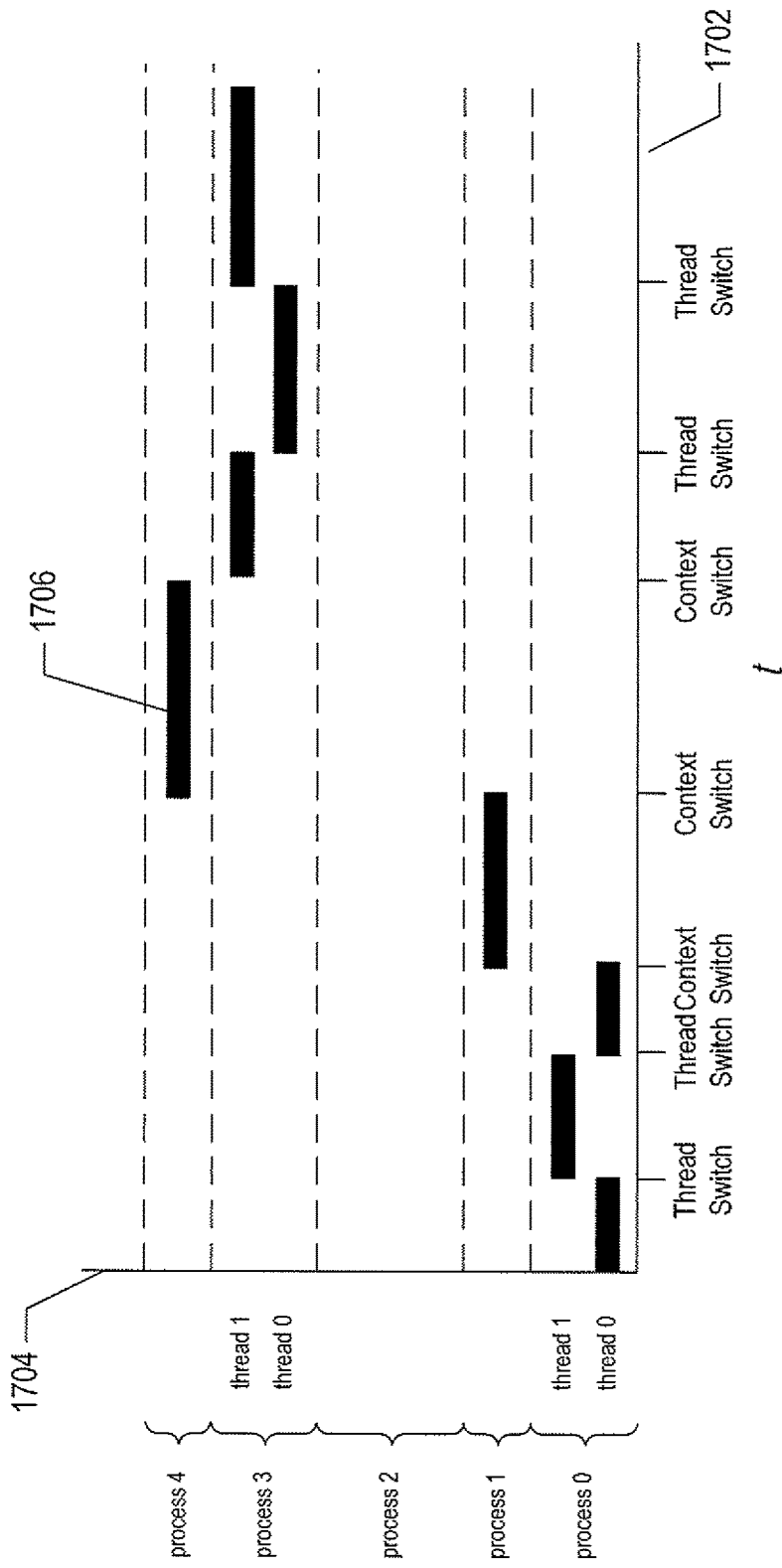
FIG. 17 illustrates temporal multiplexing of process and thread execution by an operating system with respect to a single processor or logical processor.

FIG. 17 illustrates temporal multiplexing of process and thread execution by an operating system with respect to a single processor or logical processor. In FIG. 17, the horizontal axis 1702 represents time and the vertical axis 1704 represents the various processes and threads concurrently executing on the processor or logical processor. The shaded, horizontal bars, such as shaded horizontal bar 1706, represent the period of time during which a particular process or thread executes on the processor or logical processor. As indicated along the horizontal axis, the end of one shaded horizontal bar aligns with the beginning of a different shaded horizontal bar and coincides with either a thread switch or context switch that allows execution to be transferred from one thread or process to another thread or process. The time required for the operating system to carry out a thread switch or context switch is not shown in FIG. 17, and is generally relatively insignificant in comparison to the amount of time devoted to execution of application instructions and system routines unrelated to context switching.

SMT processors, a relatively recent development in hardware architecture, provide for simultaneous execution of multiple hardware execution threads. SMT processors or SMT-processor cores provide for simultaneous hardware-execution threads by duplicating a certain portion of the hardware resources, including certain of the ISA registers, within a processor or processor core, by partitioning other of the hardware resources between hardware-execution threads, and by allowing hardware-execution threads to compete for, and share, other of the hardware resources. Modern processors are highly pipelined, and SMT processors or SMT-processor cores can often achieve much higher overall computational throughput because the various processor resources that would otherwise be idled during execution of the instructions corresponding to one hardware thread can be used by other, simultaneously executing hardware threads. Operating system threads, discussed earlier with reference to FIGS. 16 and 17, and hardware threads are conceptually similar, but differ dramatically in implementation and operational characteristics. As discussed above with reference to FIG. 17, operating-system-provided threads are products of temporal multiplexing by the operating system of hardware resources, and the temporal multiplexing involves operating-system-executed context switches. By contrast, hardware threads actually simultaneously execute within a processor or processor core, without hardware-thread context switches. Complex pipelined architecture of modern processors allows many different instructions to be executed in parallel, and an SMT processor or SMT-processor core allows instructions corresponding to two or more different hardware threads to be simultaneously executed.

Figure 18:
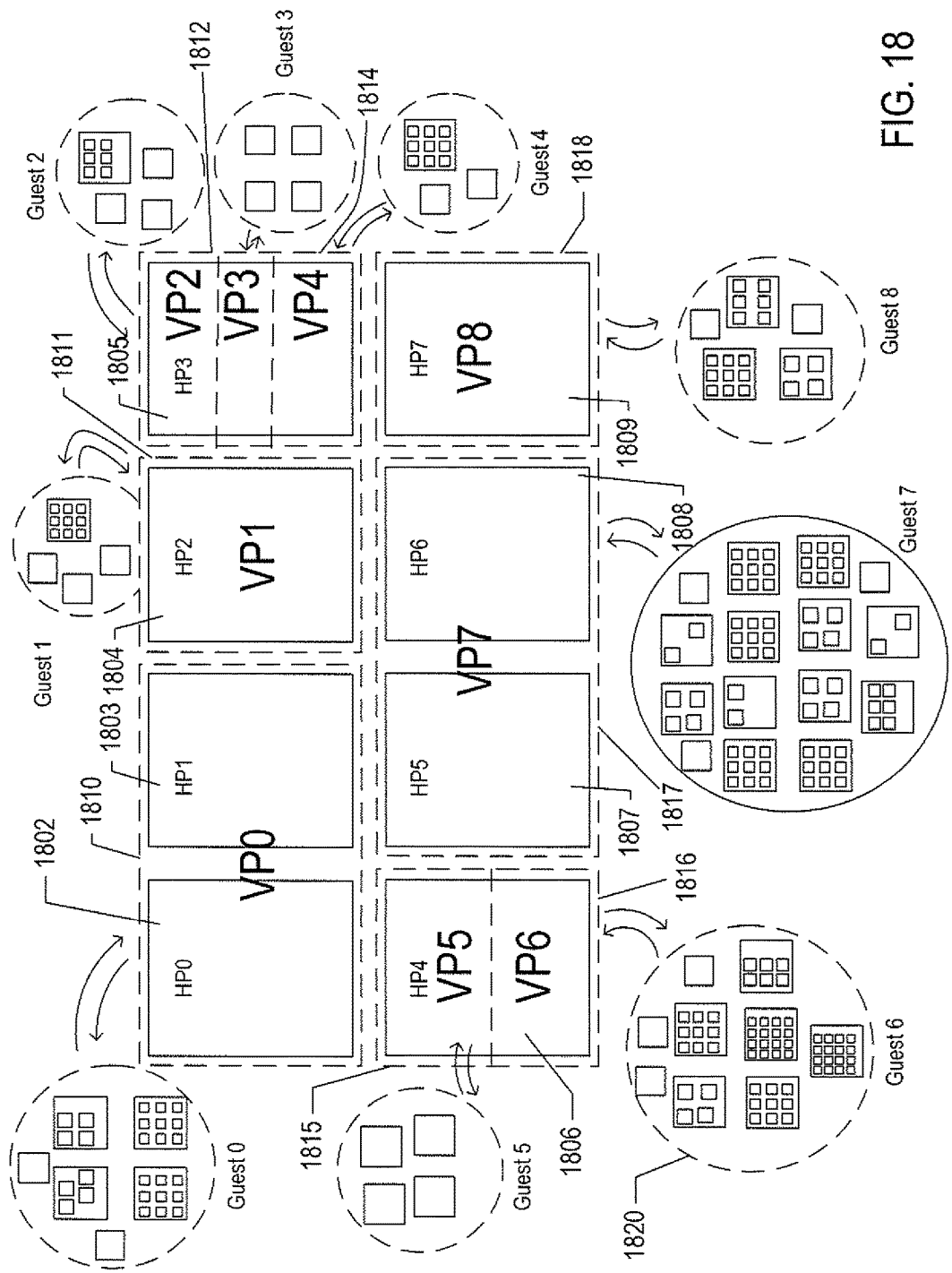
FIG. 18 illustrates an example of a complex execution environment provided by a multi-processor-based computer system in which many different processes and threads are concurrently and simultaneously executed.

FIG. 18 illustrates an example of a complex execution environment provided by a multi-processor-based computer system in which many different processes and threads are concurrently and simultaneously executed. The computer system illustrated in FIG. 18 includes eight SMT processors or processor cores HP0, HP1, . . . , HP7 1802-1809, each illustrated as rectangles with solid-line boundaries. A VMM may create a virtual-processor abstraction, mapping VMM virtual processors to hardware processing resources. In the example shown in FIG. 18, a VMM maps, as one example, virtual processor VP0 1810 to the pair of hardware processors 1802 and 1803, with the virtual processor indicated by a rectangle with dashed-line boundaries enclosing the two hardware processors. Similarly, the VMM maps virtual processor VP1 1811 to hardware processor 1804, virtual processors VP2, VP3, and VP4 1812-1814 to hardware processor 1805, virtual processors VP5 1815 and VP6 1816 to hardware processor 1806, virtual processor VP7 1817 to hardware processors 1807 and 1808, and virtual processor VP8 1818 to hardware processor 1809. In the case of SMT processors, the VMM may map, as one example, a virtual processor to each hardware thread provided by an SMT processor. For example, in the example shown in FIG. 18, virtual processors VP5 and VP6, 1815 and 1816 respectively, may each be mapped to a single hardware thread provided by SMT processor or SMT-processor core 1806. The VMM may execute a VM, including a guest operating system and one or more application programs, on each virtual processor. The guest operating system within each VM may provide an execution environment for the concurrent and/or simultaneous execution of many different processes and/or execution threads. In FIG. 18, the processes and threads executing within process contexts within the execution environment provided by a guest operating system are shown inside dashed circles, such as dashed circle 1820. Thus, a modern computer system may provide multiple, hierarchically ordered execution environments that, in turn, provide for simultaneous and/or concurrent execution of many different processes and execution threads executing within process contexts.

With the introduction of SMT processors and SMT-processor cores, the level of complexity has additionally increased. Monitoring computational throughput provided to each virtual machine in these complex environments is non-trivial, and the performance-monitoring registers and other hardware facilities provided by modern processors are generally inadequate for determining the computational throughputs for VMs mapped to hardware threads. Determination of computational throughputs for VMs managed by VMM is useful in scheduling VM execution and optimizing execution schedules as well as in accounting operations used to charge clients of large computer systems, such as cloud-computing facilities, based on the processor cycles used by the clients or on some type of measured computational throughput, often related to the rate of instruction execution provided to the clients. As further discussed below, in the case that clients are billed based on clock time during which their applications run within a cloud-computing facility, and when their applications experience performance imbalances that result in frequent stalling on exhausted resources with respect to one or VMs of another client simultaneously executing on hardware threads within an SMT processor or SMT-processor core shared by multiple clients, accounting only by clock time or even by instruction throughput may result in less-than-fair billing practices. A more fair accounting procedure would be to bill clients based on productive execution of instructions. However, as discussed further below, current hardware performance-monitoring facilities are inadequate to detect many types of performance imbalance.

Figure 19:
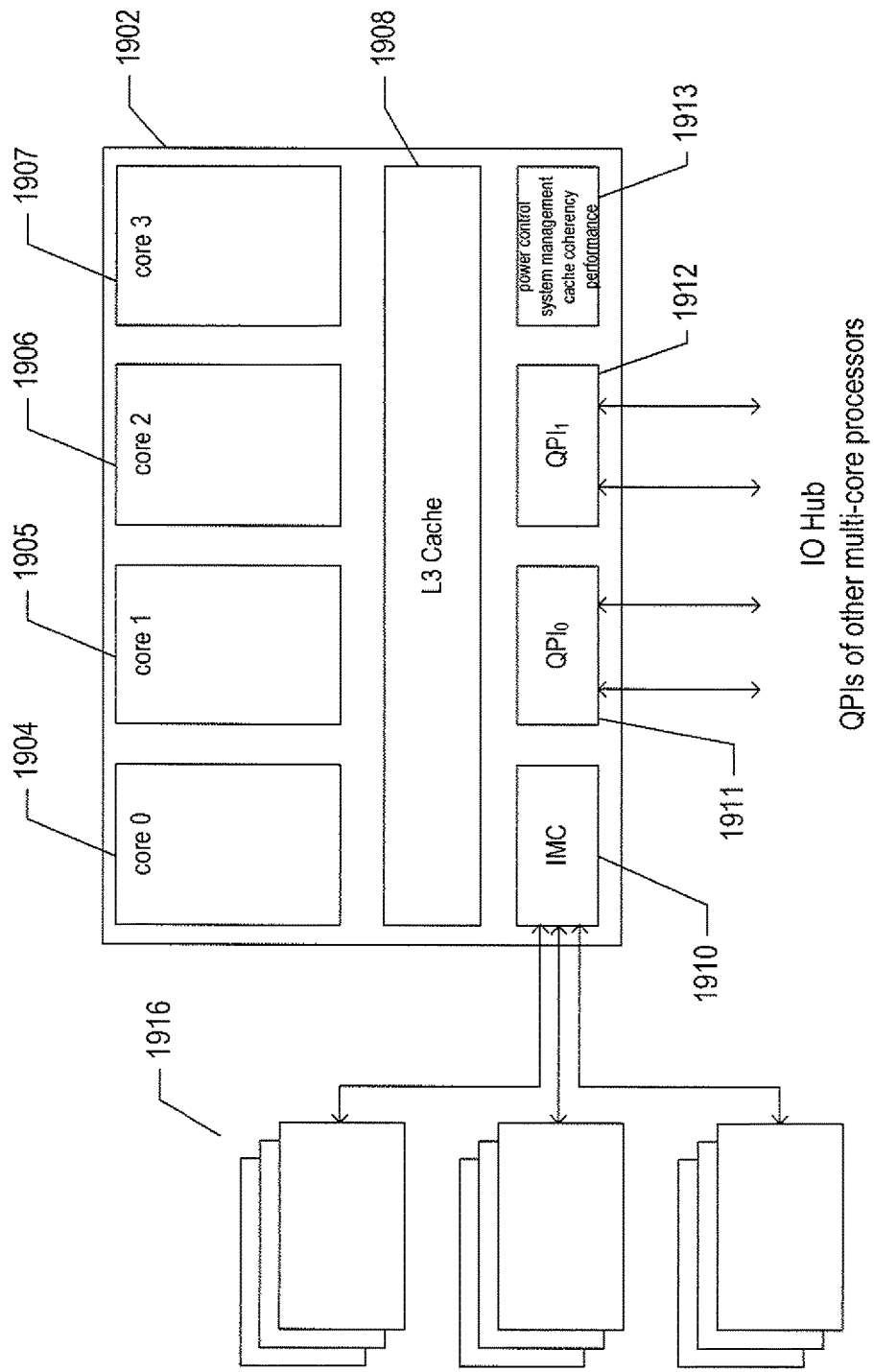
FIG. 19 illustrates an example multi-core processor.

FIG. 19 illustrates an example multi-core processor. The multi-core processor 1902 includes four processor cores 1904-1907, a level-3 cache 1908 shared by the four cores 1904-1907, and additional interconnect and management components 1910-1913 also shared among the four processor cores 1904-1907. Integrated memory controller ("IMC") 1910 manages data transfer between multiple banks of dynamic random access memory ("DRAM") 1916 and the level-3 cache ("L3 cache") 1908. Two interconnect ports 1911 and 1912 provide data transfer between the multi-core processor 1902 and an IO hub and other multi-core processors. A final, shared component 1913 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 1908 and the multi-core processor shown in FIG. 19 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is copied from the L2 cache into the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache.

Figure 20:
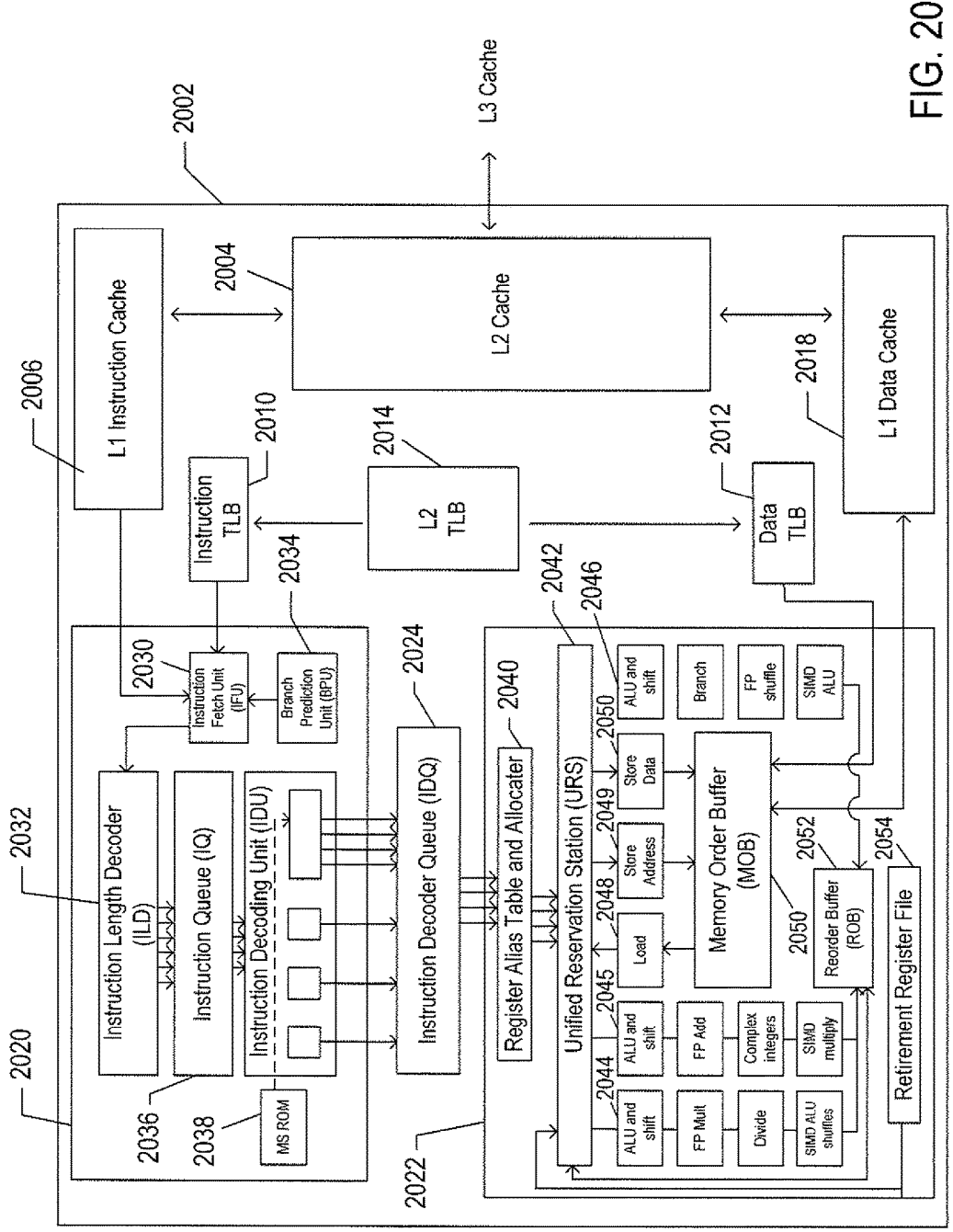
FIG. 20 illustrates the components of an example processor core.

FIG. 20 illustrates the components of an example processor core. As with the descriptions of the ISA and system registers, with reference to FIGS. 14 and 15, and with the description of the multi-core processor, with reference to FIG. 19, the processor core illustrated in FIG. 20 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 2002 illustrated in FIG. 20 includes an L2 cache 2004 connected to an L3 cache (1908 in FIG. 19) shared by other processor cores as well as to an L1 instruction cache 2006 and an L1 data cache 2008. The processor core also includes a first-level instruction translation-lookaside buffer ("TLB") 2010, a first-level data TLB 2012, and a second-level, universal TLB 2014. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 2002 includes a front-end in-order functional block 2020 and a back-end out-of-order-execution engine 2022. The front-end block 2020 reads instructions from the memory hierarchy and decodes the instructions into simpler microinstructions which are stored in the instruction decoder queue ("IDQ") 2024. The microinstructions are read from the IDQ by the execution engine 2022 and executed in various parallel execution pipelines within the execution engine. The front-end functional block 2020 include an instruction fetch unit ("IFU") 2030 that fetches 16 bytes of aligned instruction bytes, on each clock cycle, from the L1 instruction cache 2006 and delivers the 16 bytes of aligned instruction bytes to the instruction length decoder ("ILD") 2032. The IFU may fetch instructions corresponding to a particular branch of code following a branch instruction before the branch instruction is actually executed and, therefore, before it is known with certainty that the particular branch of code will be selected for execution by the branch instruction. Selection of code branches from which to select instructions prior to execution of a controlling branch instruction is made by a branch prediction unit 2034. The ILD 2032 processes the 16 bytes of aligned instruction bytes provided by the instruction fetch unit 2030 on each clock cycle in order to determine lengths of the instructions included in the 16 bytes of instructions and may undertake partial decoding of the individual instructions, providing up to six partially processed instructions per clock cycle to the instruction queue ("IQ") 2036. The instruction decoding unit ("IDU") reads instructions from the IQ and decodes the instructions into microinstructions which the IDU writes to the IDQ 2024. For certain complex instructions, the IDU fetches multiple corresponding microinstructions from the MS ROM 2038.

The back-end out-of-order-execution engine 2022 includes a register alias table and allocator 2040 that allocates execution-engine resources to microinstructions and uses register renaming to allow instructions that use a common register to be executed in parallel. The register alias table and allocator component 2040 then places the microinstructions, following register renaming and resource allocation, into the unified reservation station ("URS") 2042 for dispatching to the initial execution functional units 2044-2046 and 2048-2050 of six parallel execution pipelines. Microinstructions remain in the URS until all source operands have been obtained for the microinstructions. The parallel execution pipelines include three pipelines for execution of logic and arithmetic instructions, with initial functional units 2044-2046, a pipeline for loading operands from memory, with initial functional unit 2048, and two pipeline, initial functional units 2049-2050, for storing addresses and data to memory. A memory-order buffer ("MOB") 2050 facilitates speculative and out-of-order loads and stores and ensures that writes to memory take place in an order corresponding to the original instruction order of a program. A reorder buffer ("ROB") 2052 tracks all microinstructions that are currently being executed in the chains of functional units and, when the microinstructions corresponding to a program instruction have been successfully executed, notifies the retirement register file 2054 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 21:
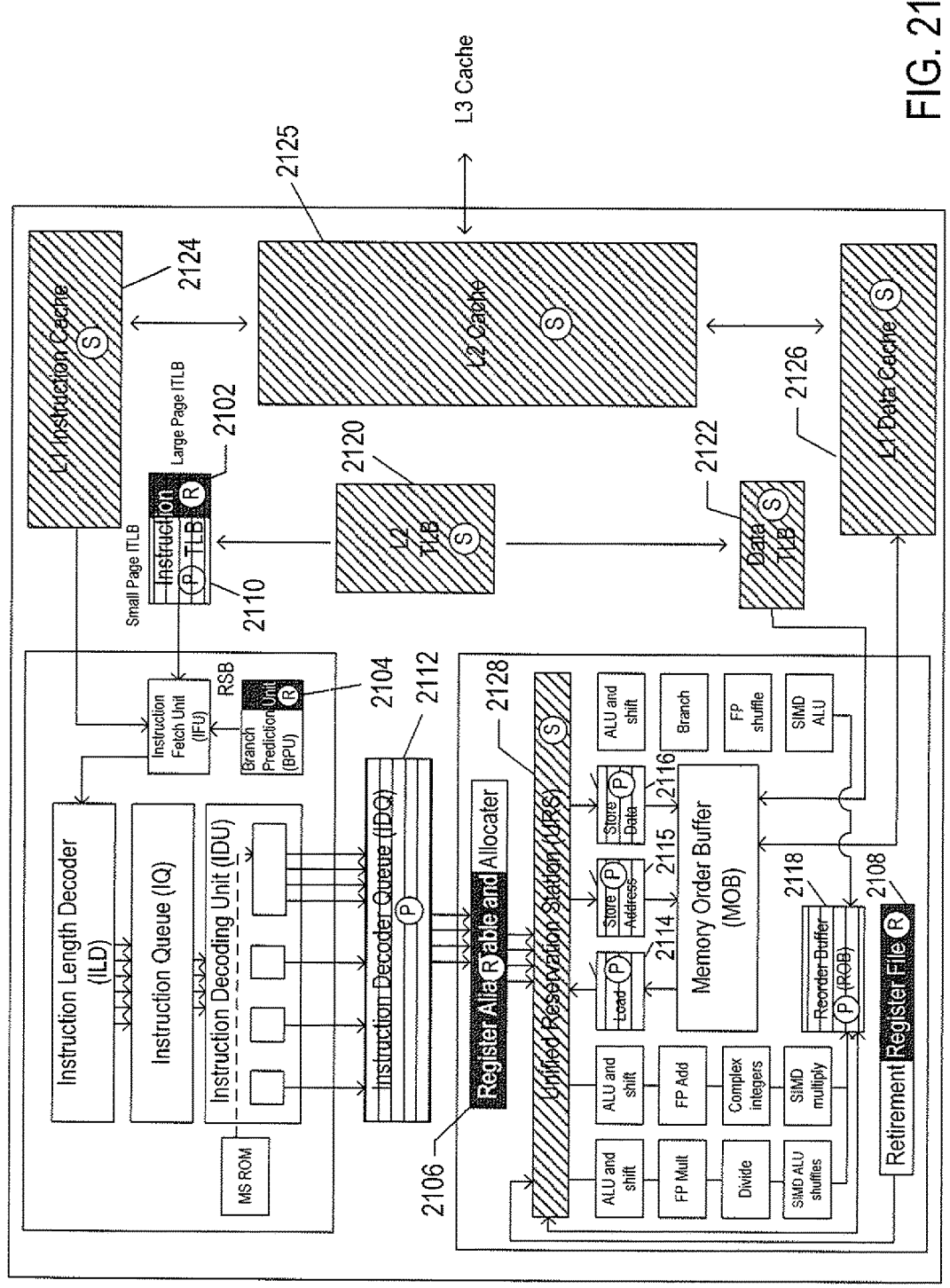
FIG. 21 illustrates, using the illustration conventions employed in FIG. 17, certain of the modifications to the processor core illustrated in FIG. 17 that enable two hardware threads to concurrently execute within the processor core.

FIG. 21 illustrates, using the illustration conventions employed in FIG. 20, certain of the modifications to the processor core illustrated in FIG. 20 that enable two hardware threads to concurrently execute within the processor core. There are four basic approaches employed to prepare hardware components for multi-threading. In a first approach, the hardware components are used identically in an SMT-processor core as they are used in a processor core that does not support simultaneous execution of multiple threads. In FIG. 21, those components that are not altered to support similar threads are shown identically as in FIG. 20. In a second approach, certain of the functional components of the microprocessor may be replicated, each hardware thread exclusively using one replicate. Replicated components are shown in FIG. 21 with shading as well as a circled "R." A portion of the first-level instruction TLB 2102 is replicated, as is the return-stack-buffer portion of the BPU 2104. The register alias table is replicated 2106 and, of course, the architecture state embodied in the register file is replicated 2108, with each hardware thread associated with its own architecture state. Yet another strategy is to partition the particular functional components, allowing a particular hardware thread to access and employ only a portion of the functional component. In FIG. 21, those functional components that are partitioned among hardware threads are indicated by a circled "P" and horizontal cross-hatching. Partitioned components include a portion of the first-level instruction TLB 2110, the IDQ 2112, load and store buffers 2114-2116, and the reorder buffer 2118. The partitioning may be a hard, fixed partitioning in which each of n hardware threads can access up to 1/n of the total functionality provided by the component, or may be a more flexible partitioning in which each hardware thread is guaranteed access to some minimal portion of the resources provided by the functional component, but the portion actually employed at any given point in time may vary depending on the execution states of the hardware threads. Finally, functional components may be shared, with the hardware threads competing for the resources provided by the functional component. Shared components are indicated in FIG. 21 by diagonal cross-hatching and circled "S" symbols. The shared components include the second-level TLB 2120, the data TLB 2122, the L1 and L2 caches 2124-2126, and the URS 2128. In certain cases, a very minimal portion of the resource provided by a shared component may be guaranteed to each hardware thread.

Figure 22:
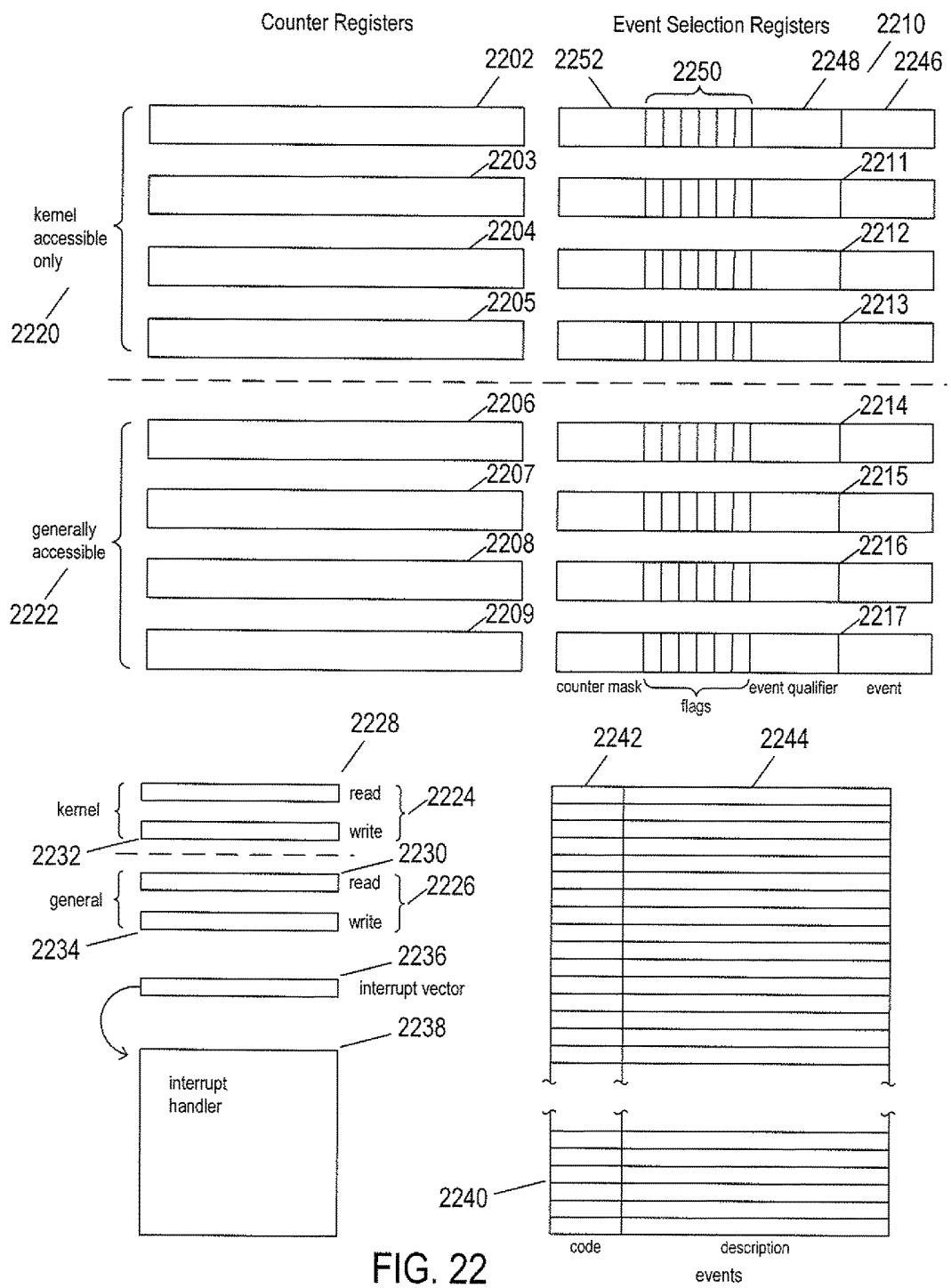
FIG. 22 illustrates a hypothetical PMU interface representative of the types of functionalities provided by a processor PMU.

FIG. 22 illustrates a hypothetical PMU interface representative of the types of functionalities provided by a processor PMU. In this hypothetical PMU interface, two sets of PMU registers are provided: (1) a set of counter registers 2202-2209; and (2) a set of event-selection registers 2210-2217. The PMU counter and event-selection registers 2202-2217 are divided into a set of kernel-accessible-only PMU registers 2220 and a set of generally accessible PMU registers 2222. In addition, the PMU interface includes a pair of privileged PMU-register-access instructions 2224 and a pair of non-privileged PMU-register-access registers 2226. The two register pairs each includes a read-PMU-register instruction 2228 and 2230 and a write-PMU-register instruction 2232 and 2234. The PMU interface also includes one or more interrupt vectors 2236 provided by an operating system or virtualization layer and an associated one or more interrupt handlers 2238 that allow PMU-associated events to interrupt, and be handled by, an operating system or virtualization layer. In addition, the PMU interface defines a set of events, shown in an events table 2240 in FIG. 22, that can be monitored by the PMU. In the hypothetical PMU interface shown in FIG. 22, each event is represented by a row, or entry, in the events table, each entry including a code field 2242 and a description field 2244. The code field includes a numeric event code and the description field includes a short textual description of the processor event that can be monitored by the PMU.

The counter registers 2202-2209 accumulate counts of particular types of events during processor operation. While generally initialized by clearing the counter registers, after which they have the value "0," counter registers may be alternatively initialized to particular numeric values. The counter registers essentially store performance-monitoring data and can be accessed by a PMU-interface read instruction. In a hypothetical PMU interface shown in FIG. 22, the privileged PMU-register-access-register pair 2224 is used to access the privileged counter registers 2202-2205 and event-selection registers 2210-2213 and the non-privileged PMU-register-access-instruction pair 2226 is used to access the non-privileged PMU registers 2206-2209 and 2214-2217.

The event-selection registers, when written by use of a write PMU-register-access instruction, instruct the processor to count particular types of events in the counter register associated with the event-selection register. The event-selection registers include a event field 2246, into which an event code is written in order for events of the type represented by the event code to be counted in the associated counter register. An auxiliary event field 2248 may be used to further quality particular types of events. For example, a code entered into the auxiliary event field may specify counting of logical subsets of events that belong to the event type associated with the code entered into the event field 2246. The event-selection registers additionally contain a set of single-bit flags 2250 that further control performance-monitoring with respect to the associated counter register. For example, an OS flag may select one of two modes for performance monitoring: (1) a first mode in which events that occur when the processor is operating at a highest privilege level are counted; and (2) a second mode in which all events are counted, regardless of the privilege level. Another flag may enable and disable interrupts. Finally, the event-selection registers may include a mask field 2252 that specifies a number of events of the type indicated by the event field 2246 that must occur during a defined period of time for the counter to be incremented. Many other types of operational behaviors may be selected by additional types of flags 2250.

As mentioned above, the PMU interface provided by any particular type of processor and processor-model subtype may differ dramatically from the PMU provided by another type of processor or processor-model subtype. Different PMU interfaces may allow for counting of different types and numbers of events, as one example. As another example, different PMU interfaces may provide a different number of PMU registers and may or may not provide separate banks of privileged and non-privileged PMU registers and privileged and non-privileged PMU-register-access instructions. The PMU interfaces of processors within a single multi-processor computer system may differ in these ways. For more complex, distributed multi-processor systems, many different PMU interfaces may be present within the system. This problem may greatly expand in the case of virtual data centers, in which case there may be thousands of different multi-processor servers that provide a wide variety of different types of PMU interfaces. As a virtual machine moves among different processors, the actual underlying hardware PMUs of the hardware processor or processors on which a virtual machine executes may change.

Having discussed hardware performance counters, complex system architectures, and deficiencies associated with event counters for diagnosing system bottlenecks, the full scale of the complexities and problems associated with performance monitoring in complex systems using currently available monitoring tools can now be summarized, below, with reference to FIGS. 23A-D. FIGS. 23A-D illustrate the complex computational environment encountered in the multi-core, hardware-threaded processor-based computer system discussed above with reference to FIGS. 14-22.

Figure 23A:
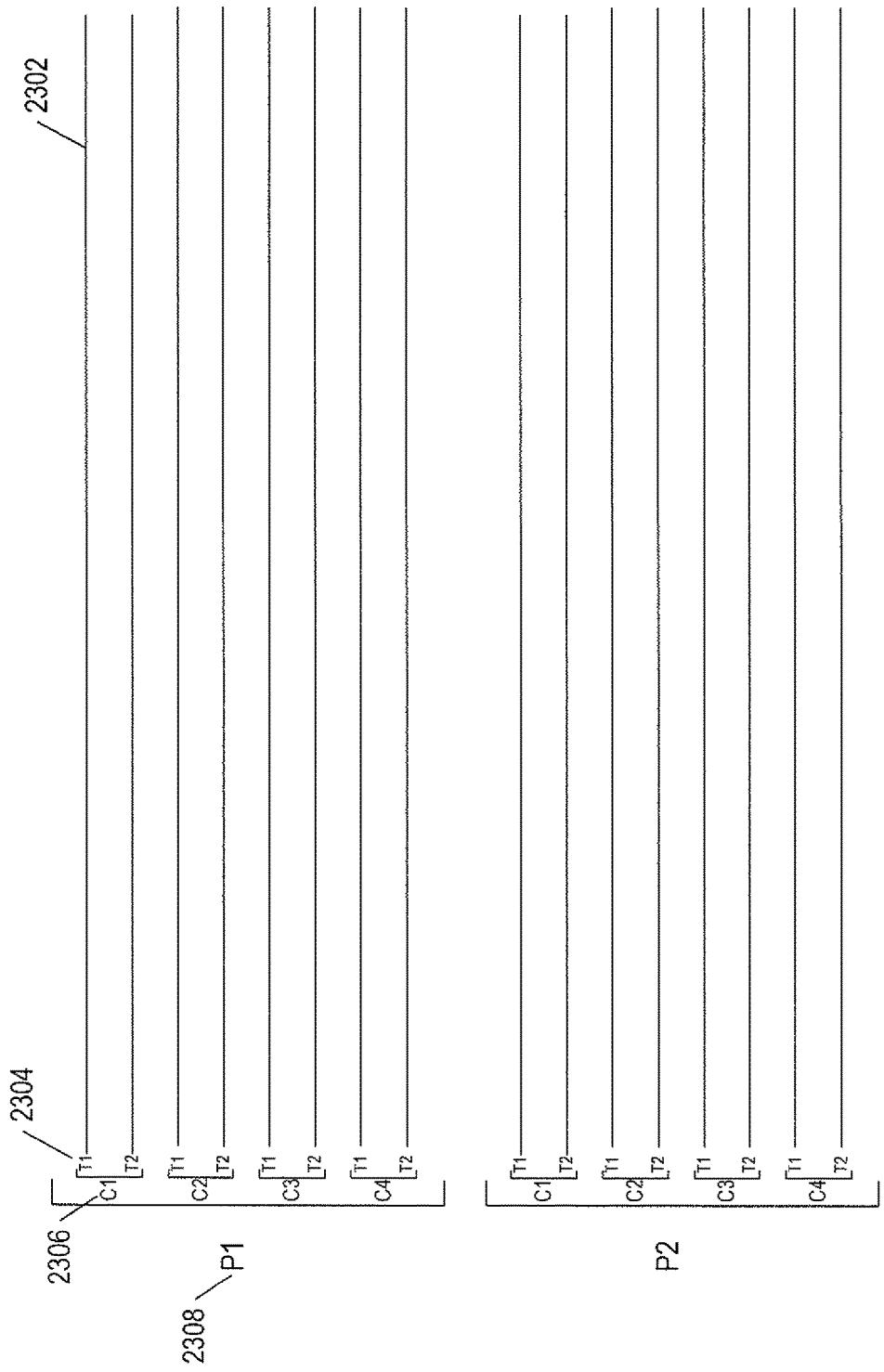
FIGS. 23A-D illustrate the complex computational environment encountered in the multi-core, hardware-threaded processor-based computer system discussed above with reference to FIGS. 14-22.
Figure 23B:
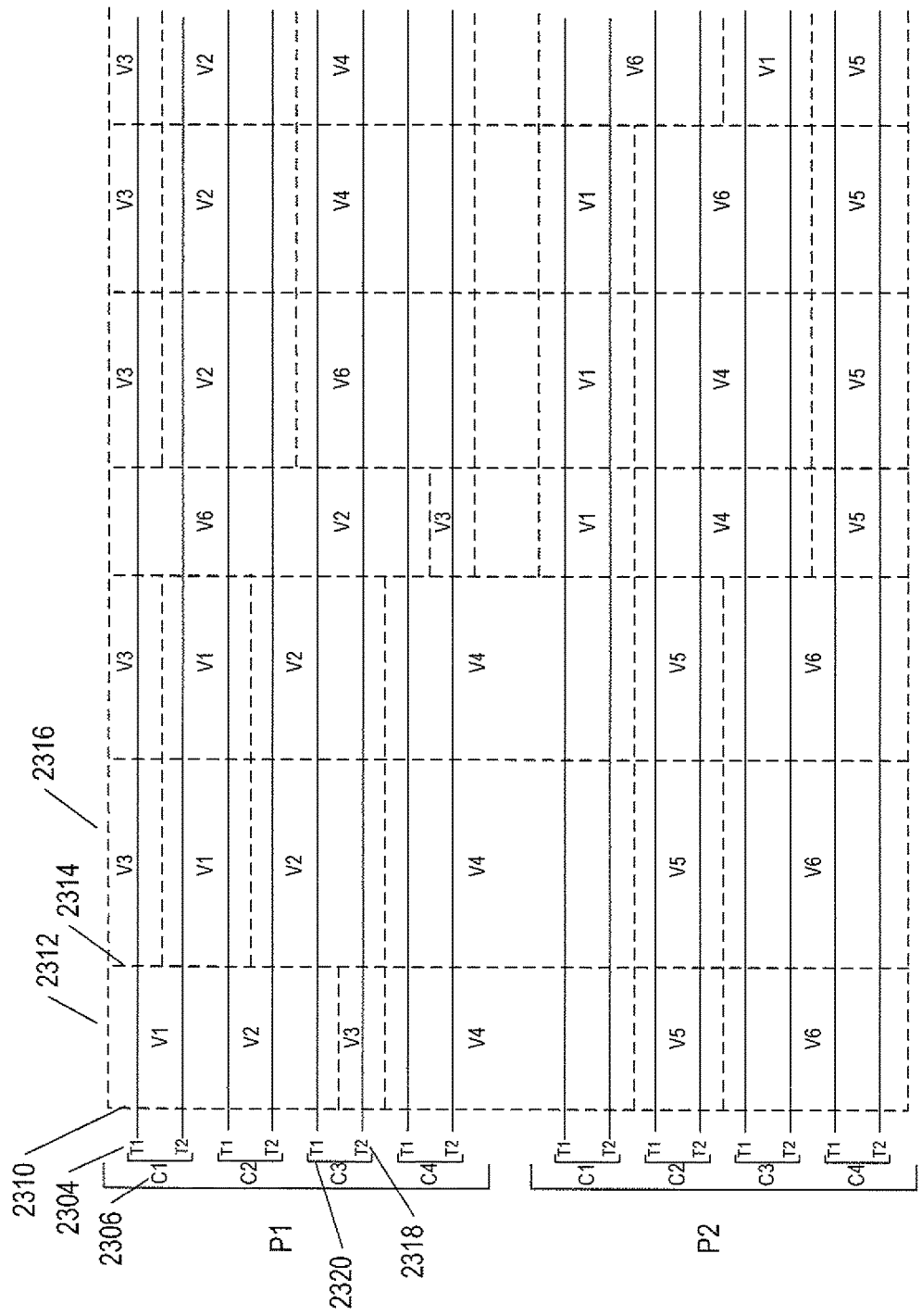
Figure 23C:
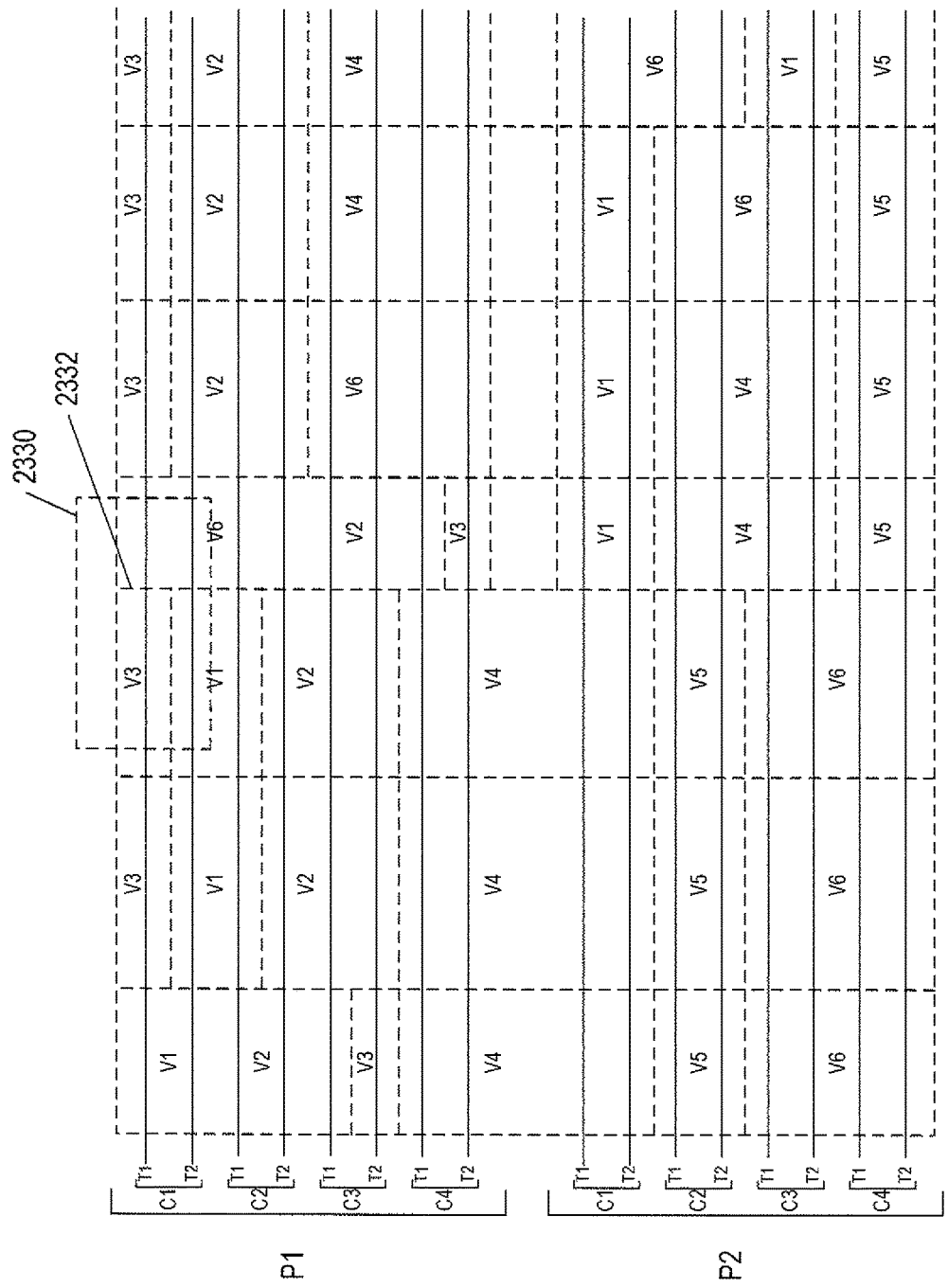
Figure 23D:
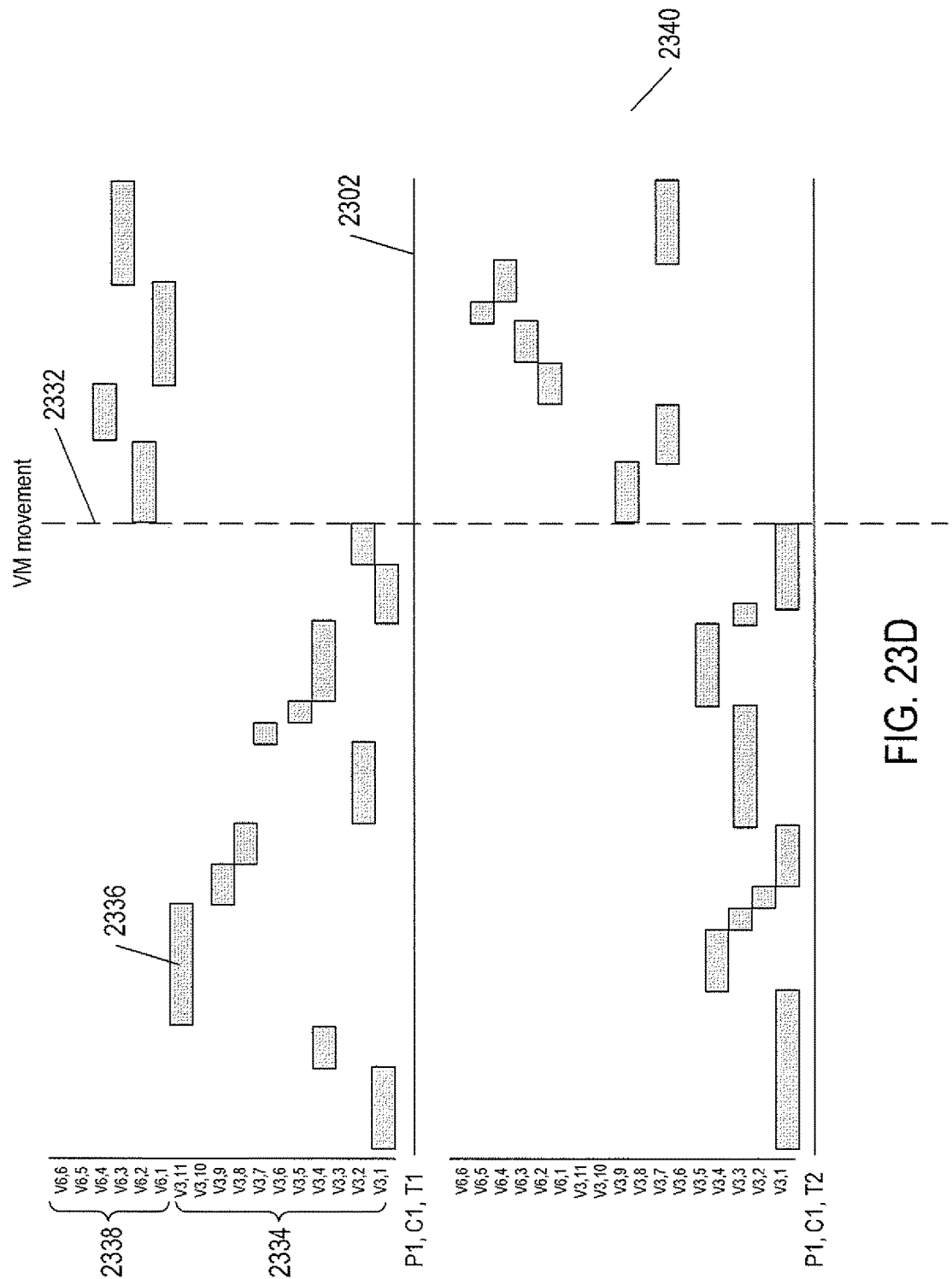

FIG. 23A shows execution timelines associated with each hardware thread within each core of each multi-core processor of a dual-multi-core-processor computer system, similar to the timelines used in FIG. 17, above. In FIG. 23A, for example, horizontal line 2302 is an execution timeline for a first hardware thread T1 2304 supported by a first core C1 2306 within a first multi-core processor P1 2308 of the multi-processor system. Additional execution timelines are shown, in FIG. 23A, associated with each additional hardware thread in the system. FIG. 23B illustrates mapping of hardware threads to virtual machines, using the execution timelines discussed above with reference to FIG. 23A, for a virtualized system such as that shown in FIG. 18. Vertical dashed lines, such as vertical dashed line 2310, are used to show particular time points across the multiple hardware-thread-associated timelines. Each column in FIG. 23B delimited by vertical dashed lines, such as a first column 2312 delimited by the vertical dashed line 2310 and a next vertical dashed line 2314, represent time intervals during which the mapping of virtual machines to hardware threads is fixed, or stable. At the points in time represented by vertical dashed lines separating the columns, such as vertical dashed line 2314 separating column 2312 from column 2316, the virtualization layer within the system may reconsider the virtual-machine mappings and reassign hardware threads to virtual machines. For example, during the period of time represented by column 2316, virtual machine V3, formerly executing on a second hardware thread 2318 of a third core 2320 in the first processor is now assigned to execute on the first hardware thread 2304 of the first core 2306 of the processor. Thus, as shown in FIG. 23B, over time, virtual machines may migrate between hardware threads, cores, and processors. Furthermore, execution of certain virtual machines may end and execution of new virtual machines may be initiated at various points in time along the execution timelines. Of course, each virtual machine may run a different suite of applications, as a result of which a time-averaged load applied by the virtual machine to various subsystems and components of the computer system may frequently vary with virtual-machine migration, execution initiation, and termination. However, this variation in assignment of virtual machines to hardware resources is but one level of variation that occurs in complex computer systems. For example, consider the small portion of the timelines 2330 shown in FIG. 23C. FIG. 23D shows an expanded view of this small portion of the timelines. Vertical dashed line 2332 in FIG. 23D is the same vertical line as vertical dashed line 2332 in FIG. 23C. During the time represented by the portion of the timeline corresponding to the first hardware thread 2302 to the left of the vertical dashed line 2332, many different processes or software threads executed by virtual machine V3 2334 execute in multiplexed fashion on the first hardware thread. The execution time spans of particular processes or software threads are indicated by horizontal bars, such as horizontal bar 2336 representing execution of process or software thread 11 by virtual machine V3. Following the point in time represented by vertical dashed line 2332, various processes and software threads 2338 executed by virtual machine V6 are multiplexed with respect to the first hardware thread. Similar multiplexing of the second hardware thread is shown in the lower portion 2340 of FIG. 23D.

Were a system analyst or system administrator to try to use a hardware performance counter that counts memory accesses in order to discover memory-subsystem bottlenecks in the complex system discussed above with reference to FIGS. 14-23D, the system analyst or system administrator would need to overcome a great many different difficulties and problems. First, the system administrator or system analyst would somehow need to accumulate memory-access counts only for time spans in which the memory subsystem is under a predictable or stable load. Were, by contrast, memory-access counts accumulated for a core over a time span in which different virtual machines or different processes and software threads executed by a particular virtual machine active, then the accumulated memory-access counts would end up smeared, or time-averaged, across potentially many different types of loads and system-resource usage patterns. However, in general, hardware performance counters are core-specific, rather than hardware-thread specific, so in the case that very different loads are applied to two different hardware threads within a single core, bottlenecks may be intermittently introduced by interactions between different processes or threads executing on the different hardware threads or the accumulated counts for the core may not reflect constraints introduced by a thread or process executing on one of the multiple hardware threads within the core. In this case, the granularity of the hardware performance counters does not extend to the lowest level of hardware-resource scheduling granularity. Of course, an overriding problem is that, as discussed above with reference to FIGS. 11A-13B, the hardware performance counters generally cannot be used, alone, to detect bottleneck conditions. Of course, large distributed computer systems, discussed above, have complexities of much greater magnitudes than a discrete multi-processor computer system, and entail exponentially greater difficulties in using traditional performance-monitoring tools to identify and diagnose operational anomalies, including bottlenecks. For all of these reasons, system analysts, system administrators, and other wishing to diagnose unbalanced resource utilization, performance constraints, bottlenecks, and other performance problems and anomalies in complex systems to not currently have access to proper, precise, and easily used tools and facilities for identifying the diagnosis the problems and anomalous system behaviors.

Methods and Systems to Which the Current Document is Directed

The current document is directed to load response performance counters, a new type of performance-monitoring tool that addresses the above-discussed problems and deficiencies with hardware performance counters, software performance counters, and higher-level benchmarking tests. Like hardware performance counters, LRPCs are designed to accumulate data, over time, from which various types of rates can be computed. Like hardware performance counters, LRPCs are designed to accumulate data at relatively low levels within a complex system orthogonally to, and without interfering with, the computational tasks carried out by the computer system during a monitoring period. As one example, LRPCs can be employed to monitor various subsystems and components of a complex system while benchmark tests or other types of tests based on application suites are run within the computer system. Unlike hardware performance counters and software performance counters, LRPCs are implemented to apply specific computational loads to specific components and subsystems within a complex system, rather than simply accumulating counts of various types of events. LRPCs thus have characteristics of hardware performance counters and other low-level existing tools, but also have characteristics of higher-level testing software, designed to apply computational loads to complex systems. However, LRPCs provide capabilities and facilities for monitoring specific components and subsystems within a complex computer system at selected granularities that are not currently provided by existing performance-monitoring tools, whether hardware performance counters and software performance counters or higher-level benchmark tests and tests based on execution of various types of applications.

Figure 24A:
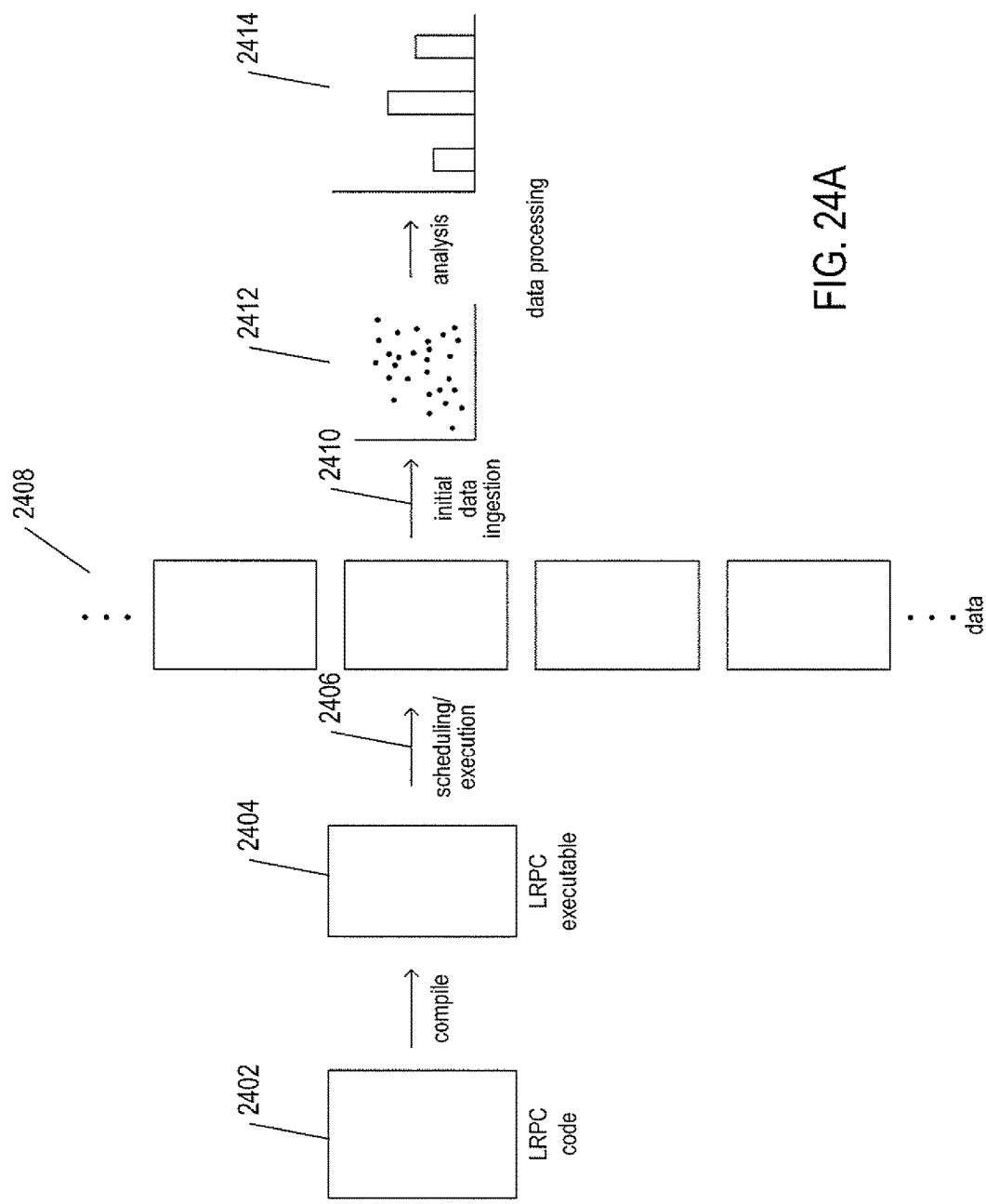
FIGS. 24A-B illustrate characteristics of LRPCs.
Figure 24B:
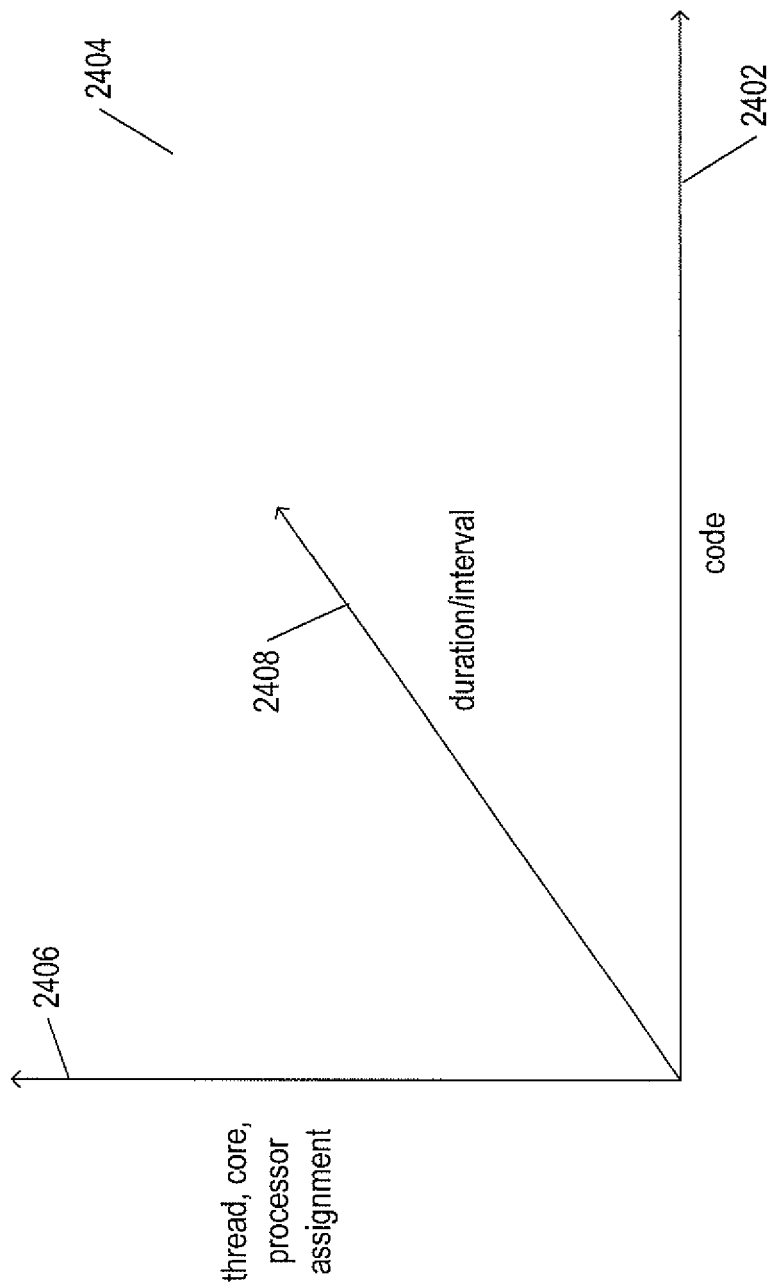

FIGS. 24A-B illustrate characteristics of LRPCs. FIG. 24A illustrates the basic design and operational characteristics of LRPCs. An LRPC is based on a generally small set of computer instructions 2402, referred to as the "LRPC code." In alternative implementations, LRPC code may be firmware instructions or hardware logic. In the case that the LRPC code comprises computer instructions, the LRPC code is compiled, assembled, or otherwise used to generate a corresponding LRPC executable 2404. The LRPC operates by scheduling periodic execution of the LRPC executable, as represented by arrow 2406 in FIG. 24A. Periodic execution of the LRPC executable generates data 2408 that is generally stored in computer memory. Following execution of the LRPC executable, or at periodic intervals during execution of the LRPC executable, the data is ingested, as represented by arrow 2410 in FIG. 24A, initially processed, as represented by data plot 2412 in FIG. 24A, and then analyzed to produce results, represented in FIG. 24A by histogram 2414. Various different types of data may be accumulated during execution of the LRPC executable, as a result of which many different types of data-processing and processed-data analytical techniques may be employed in order to produce performance-monitoring results from the data generated by execution of the LRPC executable.

FIG. 24B illustrates various parameters with respect to which an LRPC may be designed and executed. These various parameters contribute to the specificity and granularity of the measurements made by the LRPC. A first parameter, associated with a first dimension 2402 of a parameter space 2404 shown in FIG. 24B, corresponds to the LRPC code. As further discussed below, with specific examples, an LRPC designer has a relatively broad range of possible LRPC-code implementations from which to choose in order to target the LRPC to particular subsystems and components within a complex computational system. The LRPC code is generally a relatively short routine or set of routines that periodically execute within the complex computational system in order to apply a known computational load on particular components and subsystems. However, more complex code, or even calls to procedures within software systems, may be employed, as needed, by the LRPC designer. A second dimension, represented by vertical axis 2406 in FIG. 24B, of the parameter space for LRPCs is associated with thread, core, processor, or other computational-resource assignment. An LRPC may be deployed to one or more particular computational resources for execution, in order to specifically target the computational resources. As one example, an LRPC may be assigned to execute on a single hardware thread within a multi-core processor. However, specific assignment is not necessary. In other cases, LRPC execution may be scheduled across multiple computational resources by a virtualization layer, operating system, or a combination of a virtualization layer and operating system. In distributed systems, an LRPC may be assigned to specific discrete computational systems or may be scheduled for execution across multiple systems via a distributed-operating-system scheduler. An LRPC executable may include multiple executables, each of which is scheduled for execution on a different hardware resource or set of hardware resources. As one example, an LRPC directed to monitoring network throughput may execute on two different, discrete, differently geographically located computer systems in order to monitor the bandwidth, latency, or other characteristics of the network that connects the two computer systems. A third dimension, associated with axis 2408 in FIG. 24B, involves the characteristics of execution scheduling of the LRPC, including the overall duration of LRPC execution as well as the interval or intervals that define the period or periods between LRPC execution over a monitoring time span. In many cases, an LRPC may be periodically executed at intervals ranging from hundreds of milliseconds to several seconds. However, depending on the nature of the LRPC code and the particular computational resource or resources monitored by the LRPC, the execution interval may be shorter or longer. Thus, LRPCs inhabit a parameter space 2404 that provides a wide range of specificity, granularity, and temporal characteristics to facilitate monitoring of a wide range of different types of components and subsystems within a complex computational systems.

Figure 25A:
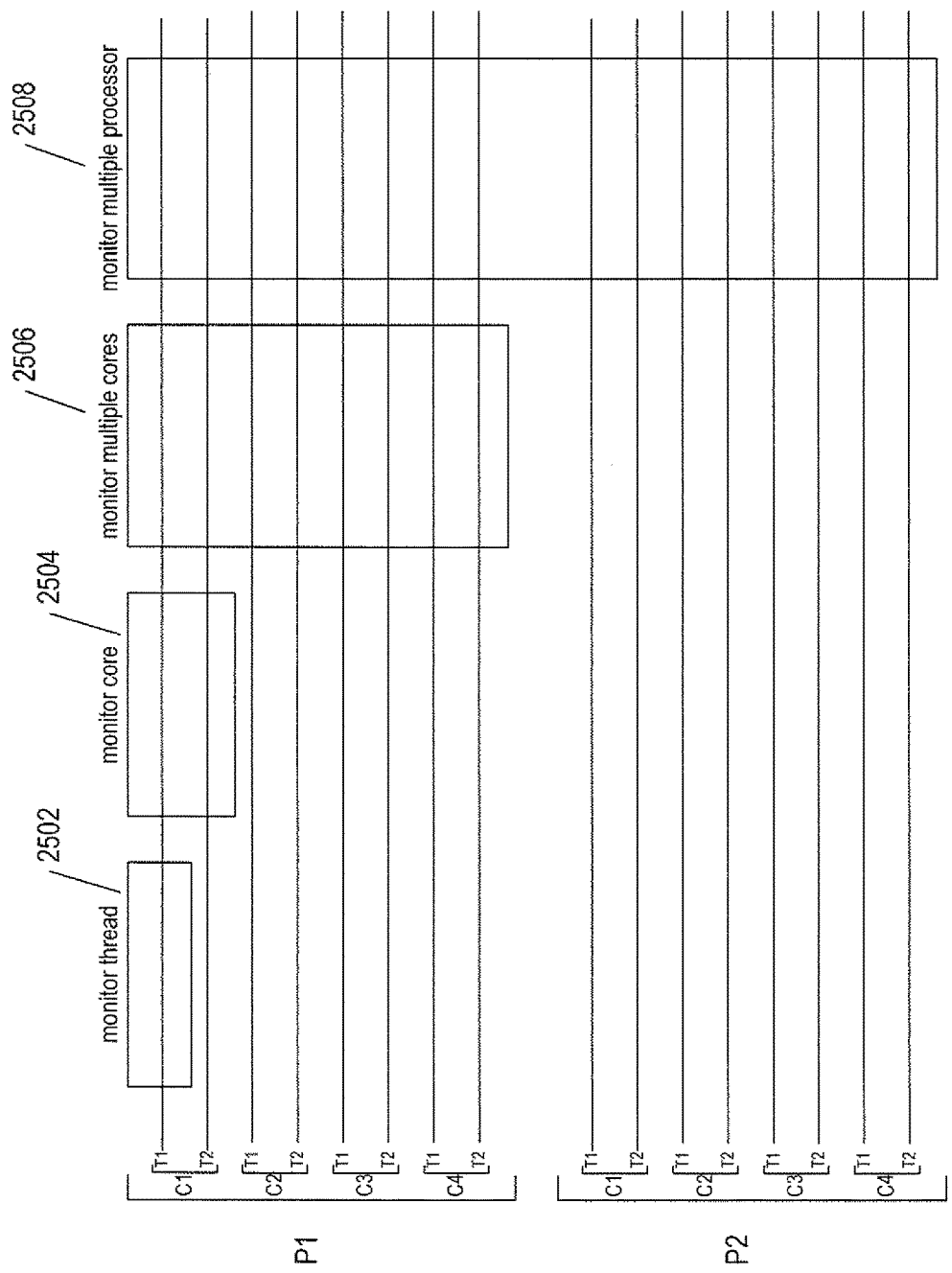
FIGS. 25A-C illustrate aspects of the flexibility in LRPC targeting of subsystems and components of complex computer systems.
Figure 25B:
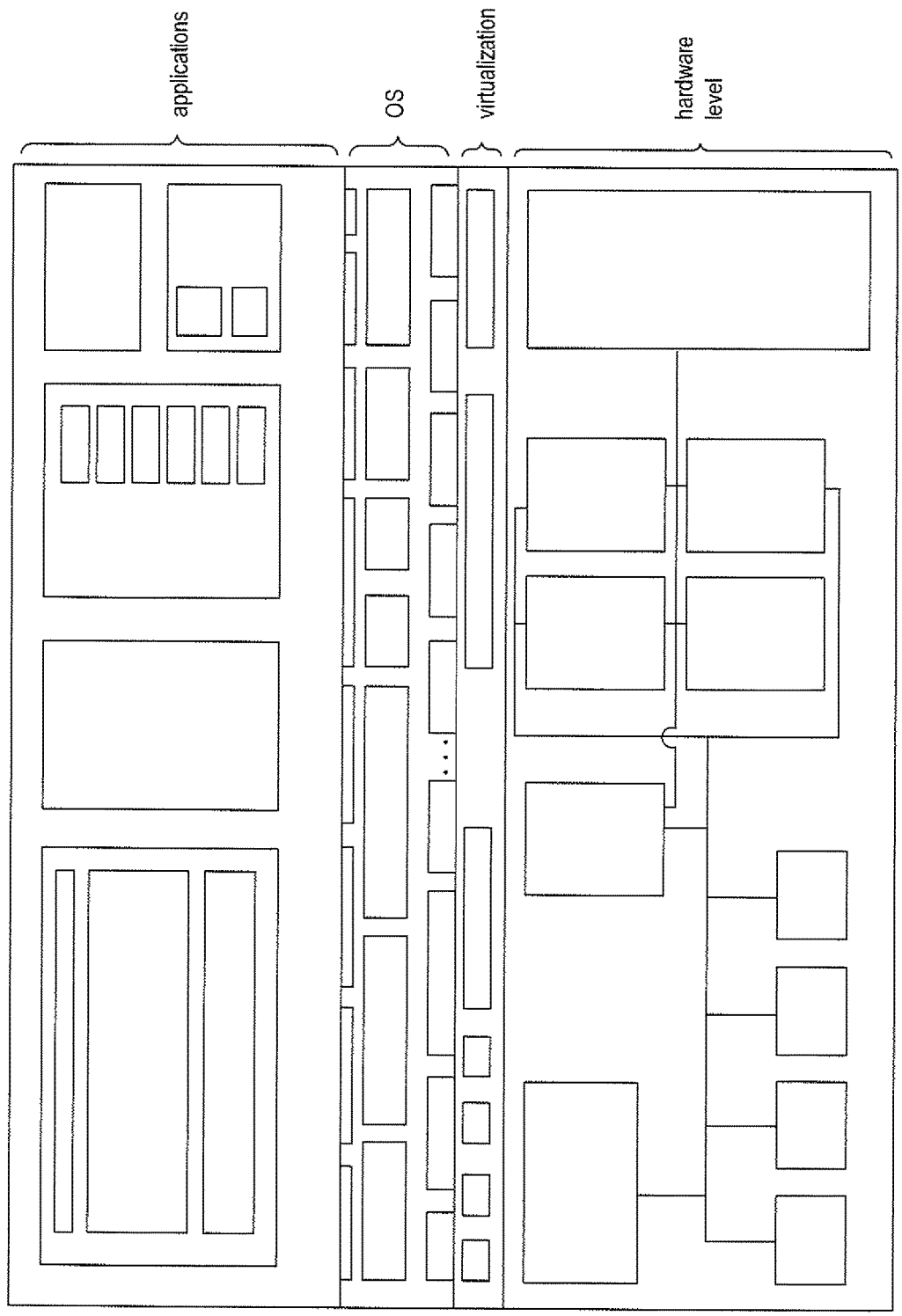
Figure 25C:
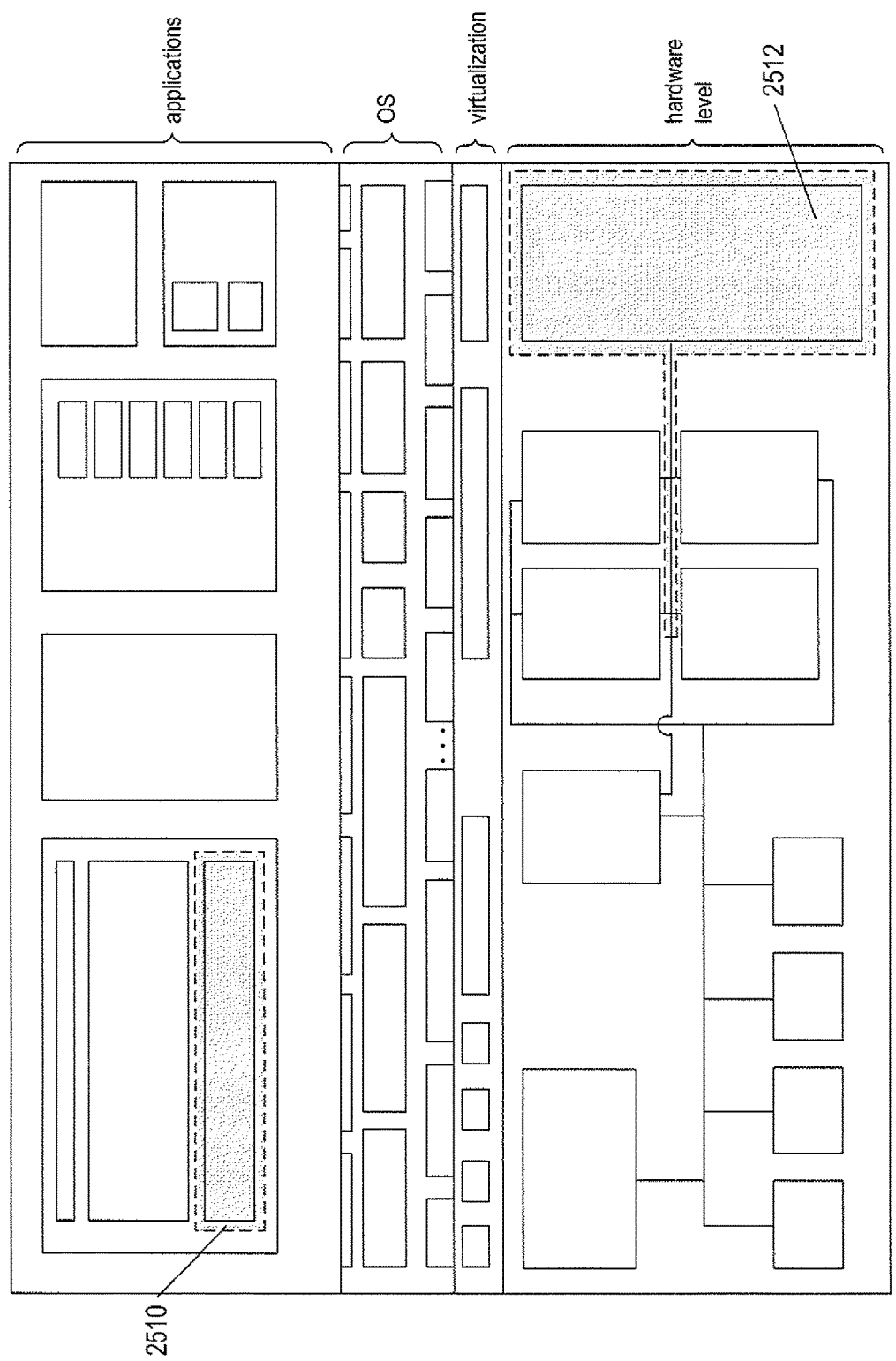

FIGS. 25A-C illustrate aspects of the flexibility in LRPC targeting of subsystems and components of complex computer systems. FIG. 25A again uses the execution timeline illustration conventions used in FIGS. 23A-D. As shown in FIG. 25A, an LRPC can be designed to monitor a particular hardware thread 2502, a particular core within a multi-core processor 2504, multiple cores within a multi-core processor 2506, or multiple processors within a multi-processor system 2508. This range of potential targeting of an LRPC would be difficult or impossible to achieve using traditional hardware performance counters or benchmark tests. FIG. 25B shows a block diagram that illustrates the many different components and levels within a virtualized computer system, similar to the diagrams shown in FIGS. 5A-B, above. As shown in FIG. 25C, a designer of an LRPC may select particular, specific components, shown shaded and enclosed within dashed lines in FIG. 25C, for monitoring by LRPCs. For example, an LRPC may be designed to apply a computational load to a particular subsystem within a complex application program 2510 or may be designed to apply a specific computational load to a specific hardware component, such as system RAM memory and the memory bus connecting system memory to one or more processors 2512. Again, the flexibility in target selection for LRPCs greatly exceeds that provided by hardware performance counters or various types of benchmark testing. The flexibly in LRPC deployment and targeting increases greatly in complex distributed systems, where LRPCs can be designed to monitor performance of multi-computer subsystems down to individual components in particular computer systems.

FIGS. 26A-28 provide examples of LRPC-code implementations. FIG. 26A shows an LRPC-code implementation for an LRPC directed to monitoring the memory subsystem of a computer system. The LRPC code, once compiled into an executable, is invoked by a higher-level monitoring routine, which sets the global variable "KeepRunning" to FALSE in order to terminate LRPC-executable execution. At periodic intervals during execution, the LRPC executable sends indications of the elapsed time consumed for each traversal of a locally stored array via the global variable "memTestTime," in a final line 2602 of the memory-array traversal code 2604 within an iterative loop 2606. The elapsed time is computed using a stopwatch feature that is initialized, within the iterative loop, on line 2608 and read on line 2610. In the traversal of the local array, each element of the array is read, a value is computed from the element along with another element read from the array, and the computed value is stored back to the element of the array in the for-loop 2612 within the iterative loop 2606. The interval between array traversals is set by an argument 2614 provided to a thread-sleep call.

FIG. 26B shows a plot of elapsed run times received by the monitoring process from the LRPC, the LRPC code of which is shown in FIG. 26A. In the plot 2620 shown in FIG. 26B, the height of the histogram-like vertical lines, such as vertical line 2622, is proportional to the elapsed time returned by the LRPC when the LRPC executes at a time indicated by the position of the vertical line along the horizontal time axis 2624. As can be seen in FIG. 26B, many of the elapsed-time values are relatively small, with a few very large elapsed times interspersed within the collected elapsed-time values. FIG. 26C shows a plot of the elapsed-time values when the elapsed-time values have been ordered, in ascending order by magnitude. The curve 2626 in FIG. 20C is shown as a continuous curve, although this continuous curve is an approximated smoothing of the discrete elapsed-time values ordered in ascending order by magnitude. The curve has four distinct regions, labeled in FIG. 26C with circled region numbers, such as the circled region number 2628 corresponding to a first plateau 2630 of the curve. A K-means clustering of the elapsed-time values identifies four elapsed-time-value clusters in the original data, with the average elapsed time values for each cluster shown in table 2632 and set in plot 2634 of the ordered, ascending elapsed-time-value magnitudes.

The data shown in FIG. 26C can be explained by considering the hierarchical levels of caching within the computer system in which the LRPC executes. When the computer system is idle or when the tasks executing within the computer system have relatively small demands for memory accesses, the local array accessed by the LRPC executable fits largely within the primary data cache, so that access times are relatively fast. The elapsed-time values for the lightly loaded subsystem correspond to the first cluster shown in Table 2632 and the first plateau 2630 of the elapsed-time-value curve 2626. As the memory subsystem becomes more intensely accessed, due to the tasks executing on the computer system, memory accesses by the LRPC executable end up generally involving accesses to the secondary cache. These access times, represented by plateau 2636 in the elapsed-time-value curve 2626, are approximately twice those of the access times involving only the primary cache. When the memory subsystem becomes further loaded, due to the nature of the tasks executing on the computer system, memory accesses to the local array by the LRPC executable involve accesses to main memory, represented by the third plateau 2638 in the elapsed-time-value curve 2626. Under extreme memory-subsystem loading, the response times for execution of the LRPC code increase to much higher levels, represented by a final portion 2640 of the elapsed-time-value curve 2626, reflecting a bottleneck involving the memory bus and memory subsystem. Thus, the LRPC that includes the LRPC code shown in FIG. 26A can be used to determine precisely the current level of memory-subsystem loading within the computer system and can be used to detect a memory-subsystem bottleneck, based on the current elapsed-time value returned by the LRPC to the monitoring routine. The elapsed time for execution of one iteration of the iterative loop 2606 within the LRPC code is reflective of the current load on the memory subsystem, regardless of what programs, routines, and other tasks are being executed by the computer system. The frequency at which the iterative loop iterates, controlled by the value passed to a thread-sleep routine determines the temporal granularity at which the load on the memory subsystem of the computer system is monitored. In one example use of the memory-subsystem LRPC, execution of the LRPC executable consumed less than three percent of the total computational bandwidth of the computer system, while monitoring the memory-subsystem load at one-half second intervals. The memory-subsystem LRPC thus accumulates data periodically, as does a hardware performance counter, but directly measures the load on the memory subsystem rather than simply accumulating numbers of memory accesses or other event counts. Like a hardware performance counter, the memory-subsystem LRPC accumulates data orthogonally to whatever tasks are being executed by the computer system, unlike a benchmark test or other type of test software which is run in order to test a computational system. Thus, LRPCs, like hardware performance counters, can be used to monitor system performance during actual system operation, rather than during execution of specialized benchmark tests.

FIG. 27 shows the LRPC code for an LRPC directed to monitoring performance of a mass-storage device or subsystem. The LRPC code shown in FIG. 27 is similar to the LRPC code shown in FIG. 26, except that the inner for-loop 2702 reads and writes mass-storage-device blocks rather than reading and writing memory values in a local memory array. When the elapsed-time data generated by the disk-subsystem LRPC is accumulated and analyzed, as discussed above with reference to FIGS. 26B-C, a multi-plateau elapsed-time curve is again obtained, reflecting the hierarchical levels of caching for the disk subsystem, including system-memory caching, disk controller caching, and caching within the actual mass-storage device.

FIG. 28 shows LRPC code for an LRPC that monitors load on a network interface controller within a computer system. In this LRPC code, the LRPC, at periodic intervals, accesses the NIC device to download text lines from a local web server within the computer system. In this fashion, the LRPC measures response times for a well-known load applied to the NIC controller, which measures the load on the networking subsystem of the computer system. When the response-time data collected from the network LRPC is analyzed, it does not show multiple plateaus, as in the case of the memory-subsystem LRPC and disk-subsystem LRPC, but instead reveals a continuously increasing response-type curve.

In all three cases of the LRPCs, the LRPC code for which are shown in FIGS. 26A, 27, and 28, initial data collection within a system can be used to obtain response curves for the LRPCs, from which various elapsed-time values can be determined as thresholds indicative of various different types of constraints and bottlenecks associated with the subsystems targeted by the LRPCs. As one example, a response-time value greater than the average elapsed time for the third cluster, shown in Table 2632 of FIG. 26C, may be used as a threshold value that, when exceeded, indicates that the memory subsystem is a current bottleneck for computational throughput of the computer system. Alternatively, the elapsed-time values shown in Table 2632 can be used as four different thresholds for determining the level of memory-subsystem saturation.

Figure 29:
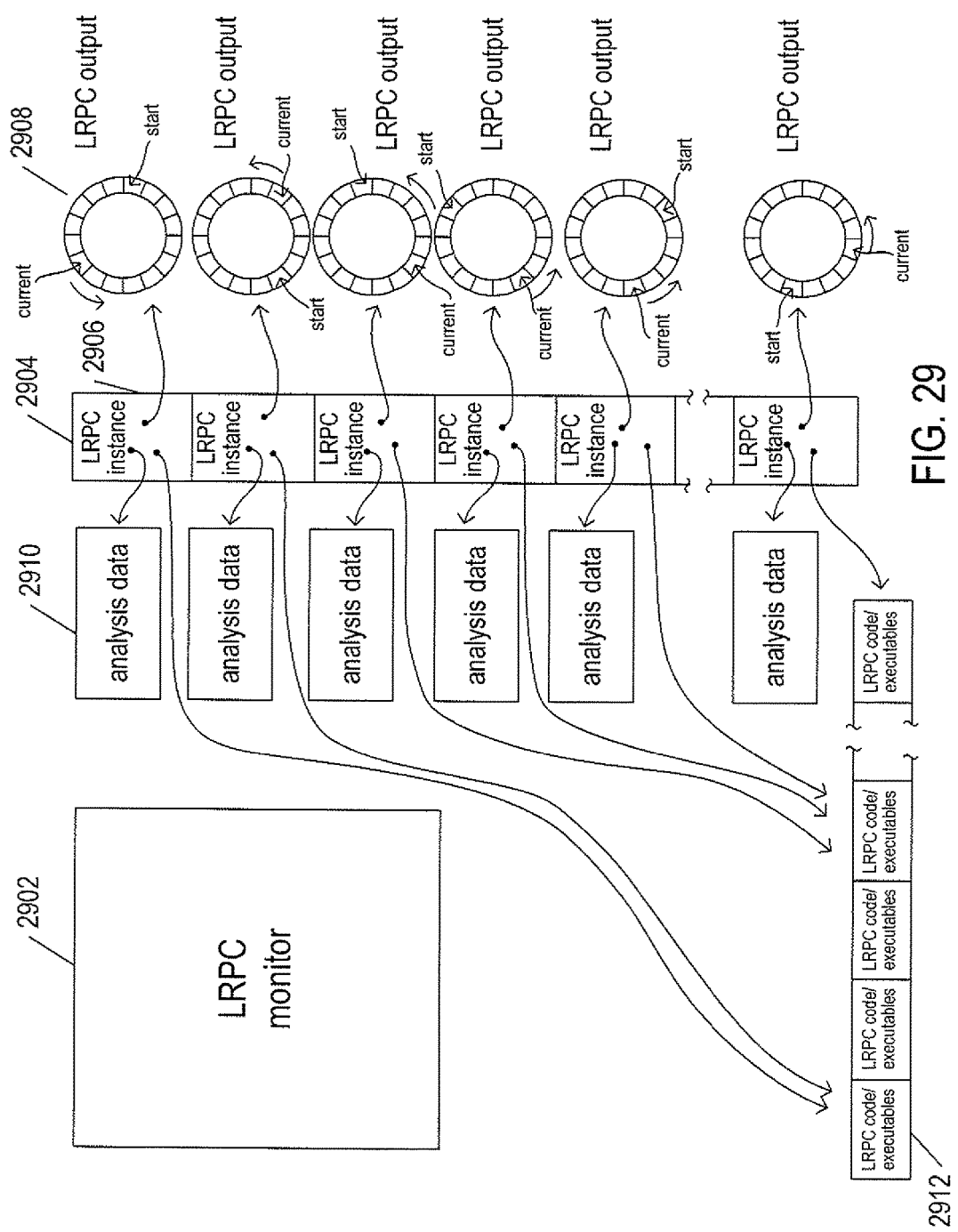
FIGS. 29-31K illustrate a performance monitoring subsystem within a complex computer system based on the above-discussed LRPCs.

FIGS. 29-31K illustrate a performance monitoring subsystem within a complex computer system based on the above-discussed LRPCs. FIG. 29 illustrates components of the monitoring subsystem. These components include an LRPC monitor 2902 that launches, terminates, and collects data from executing LRPCs and provides monitoring results to various computational entities that access the monitoring subsystem to obtain performance-monitoring data and results. The LRPC monitor creates, maintains, and uses stored data and executables. This stored data includes an array, list, or other collection of LRPC-instance data structures 2904. Each LRPC-instance data structure represents a currently available LRPC that can be used to monitor subsystems and components within the complex computer system that includes the monitoring subsystem. Each LRPC-instance data structure includes references, an LRPC output queue, analysis-data, and LRPC code/executables data structure. For example, the LRPC-instance data structure 2906 references LRPC output queue 2908, analysis-data data structure 2910, and the LRPC code/executables data structure 2912. The LRPC output queue 2908 is a circular LRPC-data-output buffer that collects elapsed-time data output by execution of an LRPC executable corresponding to the LRPC associated with the LRPC-instance data structure 2906. The analysis-data data structure 2910 includes elapsed-time thresholds and other data that is used to interpret elapsed times generated by the LRPC. The LRPC code/executables data structure 2912 includes the LRPC code for the LRPC represented by the LRPC-instance data structure 2906, an executable generated from the LRPC code, and additional information used for deploying LRPC executables within the computational system.

Figure 30:
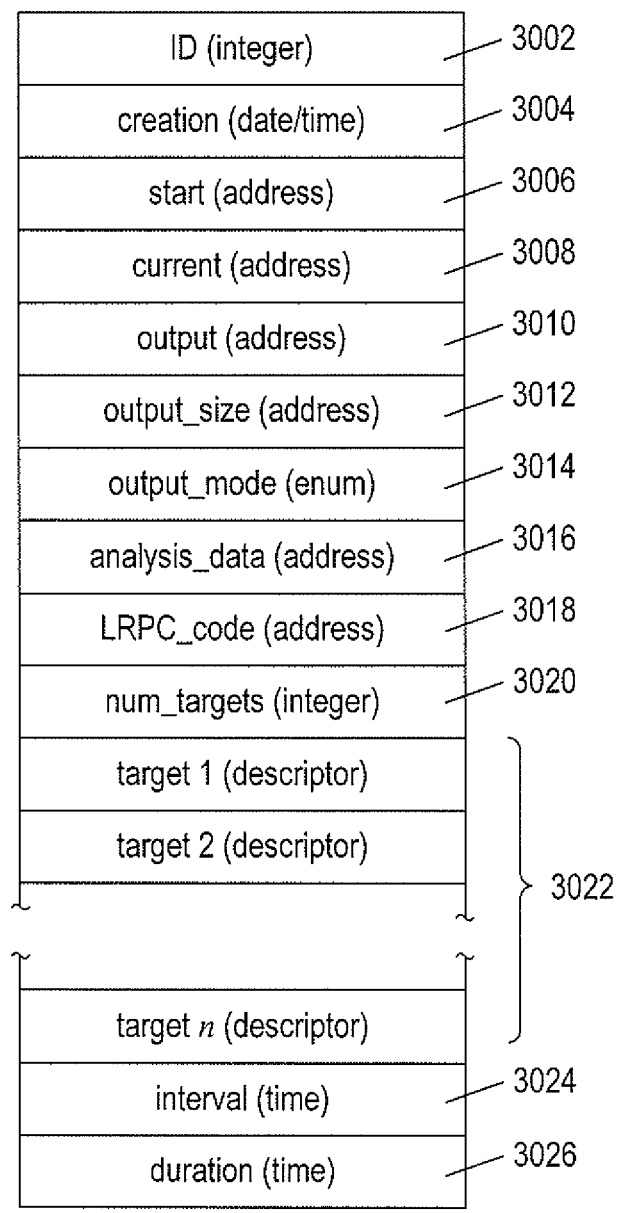

FIG. 30 shows a portion of the LRPC-instance data structure. The data structure includes a field that stores a unique identifier, or ID, for the LRPC 3002, a creation date and time for the LRPC 3004, start and current pointers 3006 and 3008 into the circular output queue for the LRPC, the memory address of which is stored in the field output 3010, an indication of the size of the circular output queue, stored in the field output_size 3012, an indication of the output mode for the LRPC, stored in the field output_mode 3014, a reference to the analysis-data data structure associated with the LRPC 3016, a reference to the LRPC code/executable data structures associated with the LRPC 3018, a number of deployment targets within the computational system for deploying LRPC executables 3020, and descriptors to facilitate deployment of LRPC executables in each of the target components of the computational system 3022, an indication of the interval, or period, for LRPC execution 3024, and an indication of the total time for execution of the LRPC 3026.

Figure 31A:
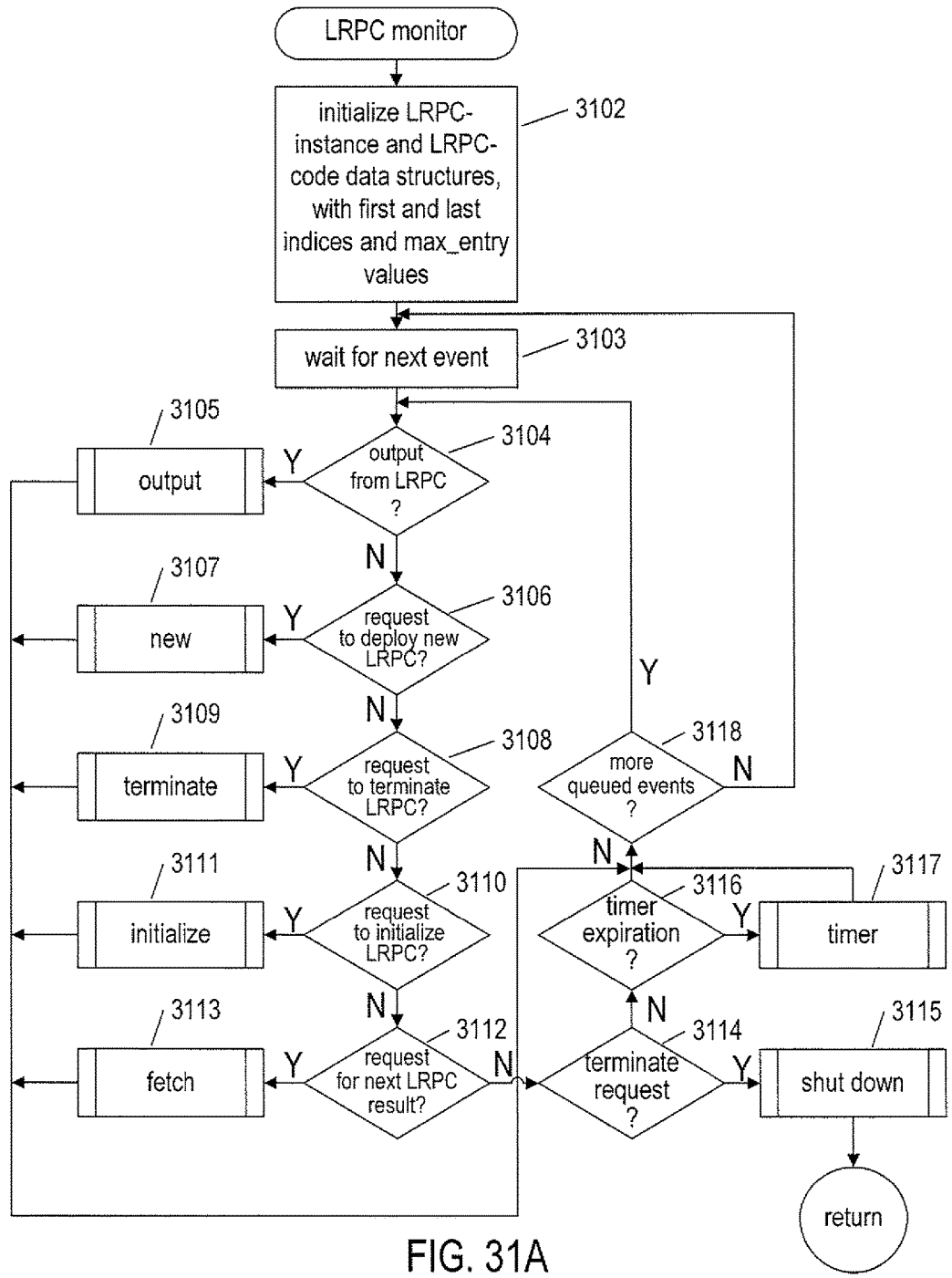

FIGS. 31A-K provide control-flow diagrams that illustrate operation of the LRPC monitor (2902 in FIG. 29). FIG. 31A provides a control-flow diagram for an event-handling loop that continuously executes in order to implement the LRPC monitor. In step 3102, the LRPC-instance and LRPC-code/executables data structures are initialized. Then, in step 3103, the LRPC monitor waits for a next event to occur. When a next event occurs, a series of conditional steps, such as conditional step 3104, are executed to determine the nature of the most recently occurring event. When the event is recognized, a suitable handler is called to handle the event. For example, in step 3104, the LRPC monitor event loop determines whether the event is an output event from an LRPC and, if so, calls an output handler 3106 to handle the event. In step 3106, the event-handler loop determines whether the event is a request to deploy a new LRPC and, if so, a new LRPC handler is called in step 3107. In step 3108, the event-handler loop determines whether the event is a request to terminate an LRPC, and, if so, a terminate handler is called in step 3109. In step 3110, the event-handler loop deter mines whether the event is a request to initialize an LRPC and, if so, an initialization handler is called in step 3111. In step 3112, the event handler loop determines whether the event is a request for a next LRPC result and, if so, a fetch handler is called in step 3113. In step 3114, an event handler determines whether the event is a terminate request, in which case a shutdown handler is called in step 3115. In step 3116, the event handler determines whether a timer expiration has occurred and, if so, calls a timer handler in step 3117. When there are more events that have been queued while a current event was handled, as determined in step 3118, then control returns to step 3104. Otherwise, control returns to step 3103 where the event handler waits for a next event to occur.

Figure 31B:
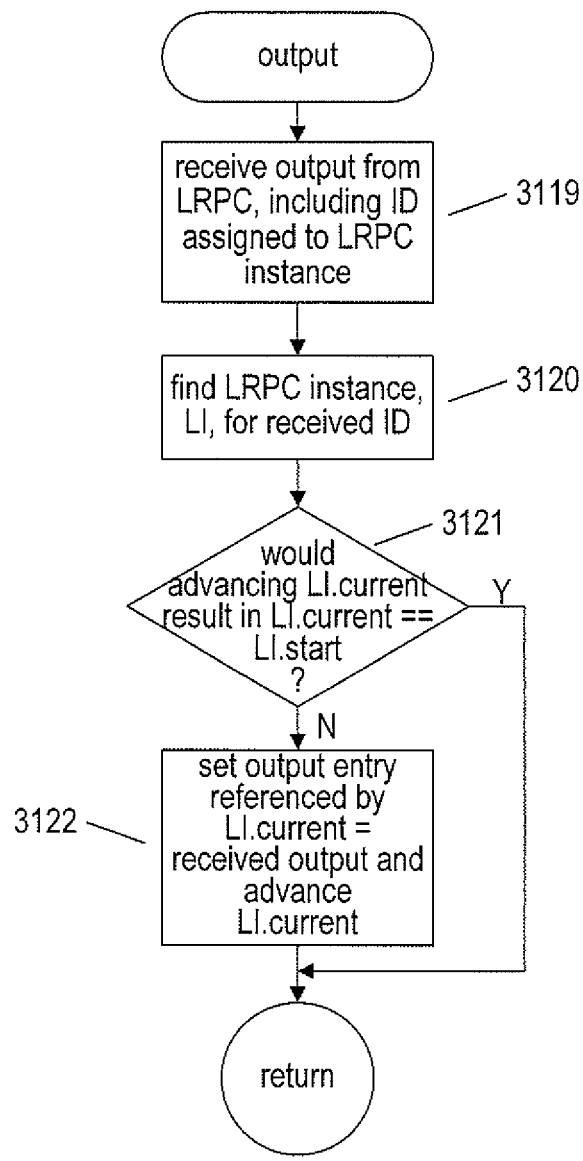

FIG. 31B provides a control-flow diagram for the handler routine called in step 3105 of FIG. 31A. This handler handles an output event generated by a currently executing LRPC. In step 3119, the handler routine receives output from an LRPC, the output including the ID assigned to the LRPC and included in the LRPC-instance data structure associated with the LRPC. In step 3120, the handler routine locates the LRPC-instance data structure that contains the received ID. Using the LRPC-instance data structure, the handler routine determines whether the LRPC output queue associated with the LRPC is full, in step 3121. When the output buffer is full, the output routine returns. Otherwise, the output generated by the LRPC is queued to the LRPC output buffer and the current pointer to the next empty entry in the LRPC output buffer is advanced, in step 3122. Of course, the nature of the output from an LRPC may vary in size and content with the LRPC implementation, and the entries in the LRPC circular output vary accordingly. In alternative implementations, depending on the value of the output_mode field in the associated LRPC-instance data structure, new output overwrites the oldest output in the circular buffer when the circular buffer is full.

Figure 31C:
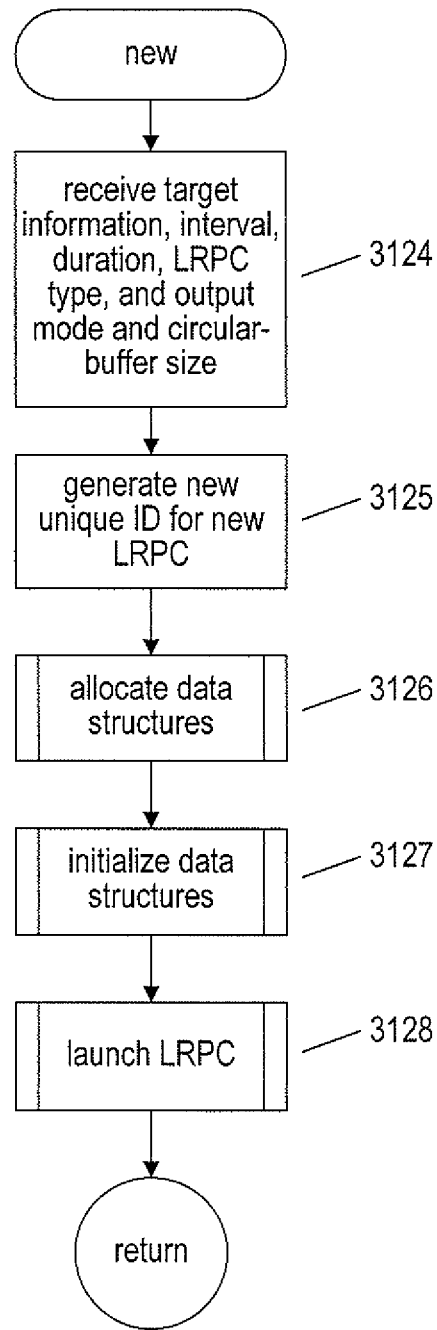

FIG. 31C provides a control-flow diagram for the handler called in step 3107 of FIG. 31A. This handler is called when a computational entity requests that the LRPC monitor deploy a new LRPC for monitoring the computational system that includes the LRPC monitor. In step 3124, the handler receives target information, an interval, a duration, an LRPC type, an output mode, and a circular buffer size included as arguments to the call that specify the LRPC to deploy. In step 3125, the handler generates a new unique identifier for the new LRPC. In step 3126, the handler allocates data structures for the new LRPC and, in step 3127, initializes those data structures using the received arguments. Finally, in step 3128, the handler launches the new LRPC.

Figure 31D:
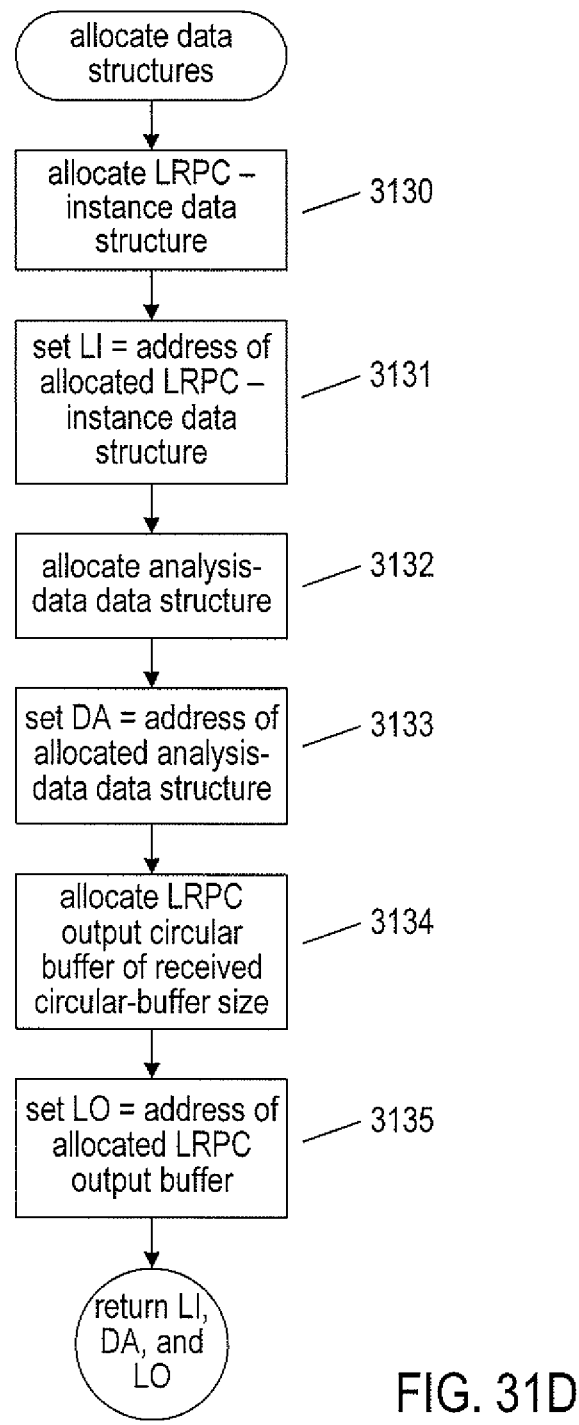

FIG. 31D provides a control-flow diagram for the data-structures-allocation routine called in step 3126 of FIG. 31C. In step 3130, an LRPC-instance data structure is allocated for the new LRPC. Allocation may involve allocating a new LRPC-instance data structure from memory and adding the data structure to the list or collection of LRPC-instance data structures or may involve using a free LRPC-instance data structure already included in the array, list, or collection. In step 3131, the local reference variable LI is set to the address of the newly allocated LRPC-instance data structure. In step 3132, an analysis-data data structure is allocated and, in step 3133, the local reference variable DA is set to the address of this new allocated analysis-data data structure. In step 3134, a new LRPC-output circular buffer is allocated with a size equal to the received circular-buffer size and, in step 3135, the local variable LO is set to reference the newly allocated LRPC-output circular buffer.

Figure 31E:
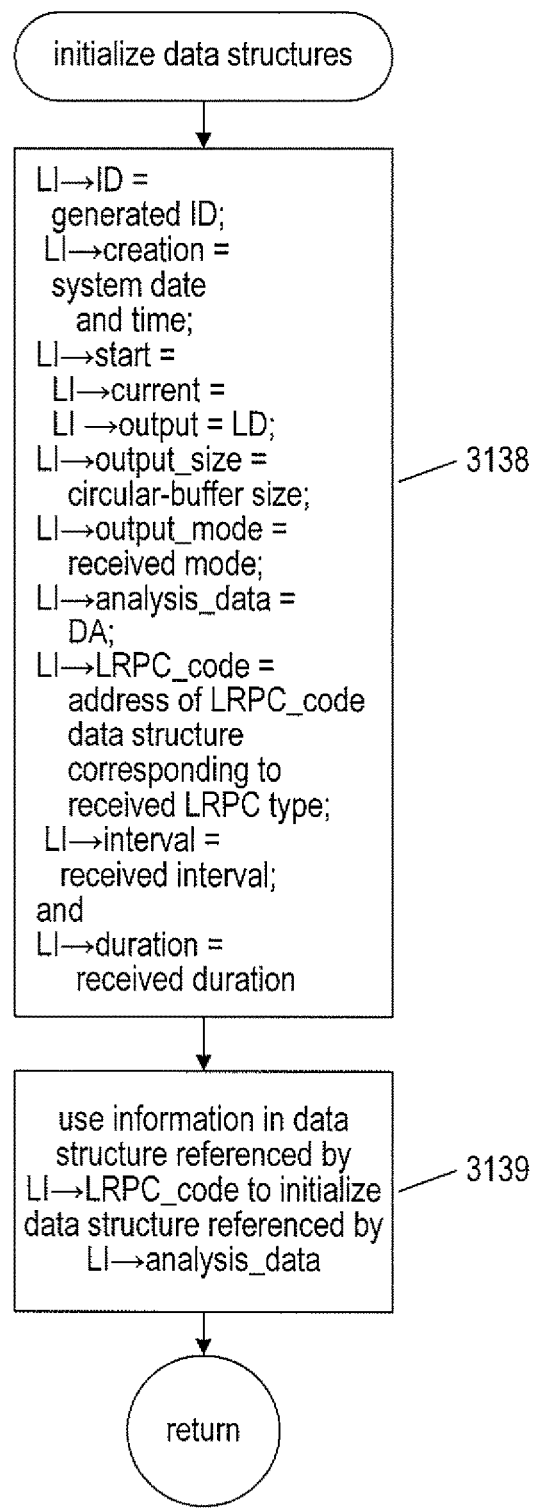

FIG. 31E provides a control-flow diagram for the data-structures-initialization routine called in step 3127 of FIG. 31C. In step 3138, the various fields in the newly allocated LRPC-instance data structure are set to values specified in arguments received in step 3124 of FIG. 31C or to reference variables initialized in the data-structures-allocation routine discussed above with reference to FIG. 31D. In step 3139, the data-analysis data structure is initialized using information specific to the LRPC that is contained in the LRPC-code/executables data structure referenced by the LRPC_code field of the LRPC-instance data structure. The information included in the data-analysis data structure may include thresholds and interpretations for response times, as discussed above, and/or other information that is used to analyze response times or other data output by the LRPC.

Figure 31F:
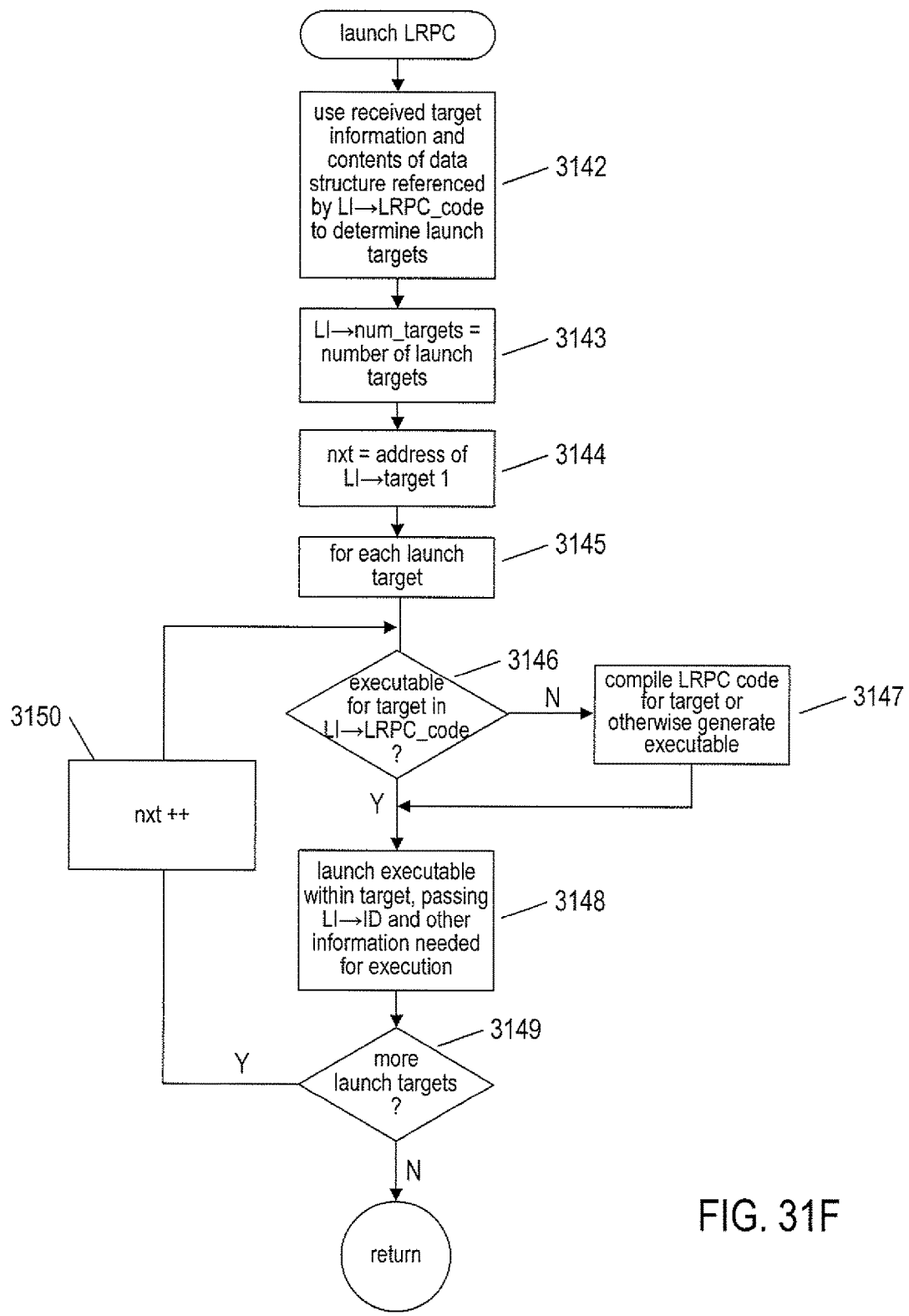

FIG. 31F provides a control-flow diagram for the LRPC launching routine called in step 3128 of FIG. 31C. In step 3142, the routine receives target information provided as arguments in step 3124 of FIG. 31C and accesses the contents of the LRPC-code/executables data structure associated with the LRPC to determine the deployment targets within the computer system within which to deploy the executables corresponding to the LRPC. The number of targets is determined in step 3143 and the local variable nxt is set to the address of the first target descriptor within the LRPC-instance data structure in step 3144. In the for-loop of steps 3145-3150, the routine checks that executable code is available for each deployment target and, when executable code is not available, generates the executable code, after which the executable code is launched within the deployment target. Of course, the information needed to launch each executable may vary with the different types of deployment targets and LRPCs.

Figure 31G:
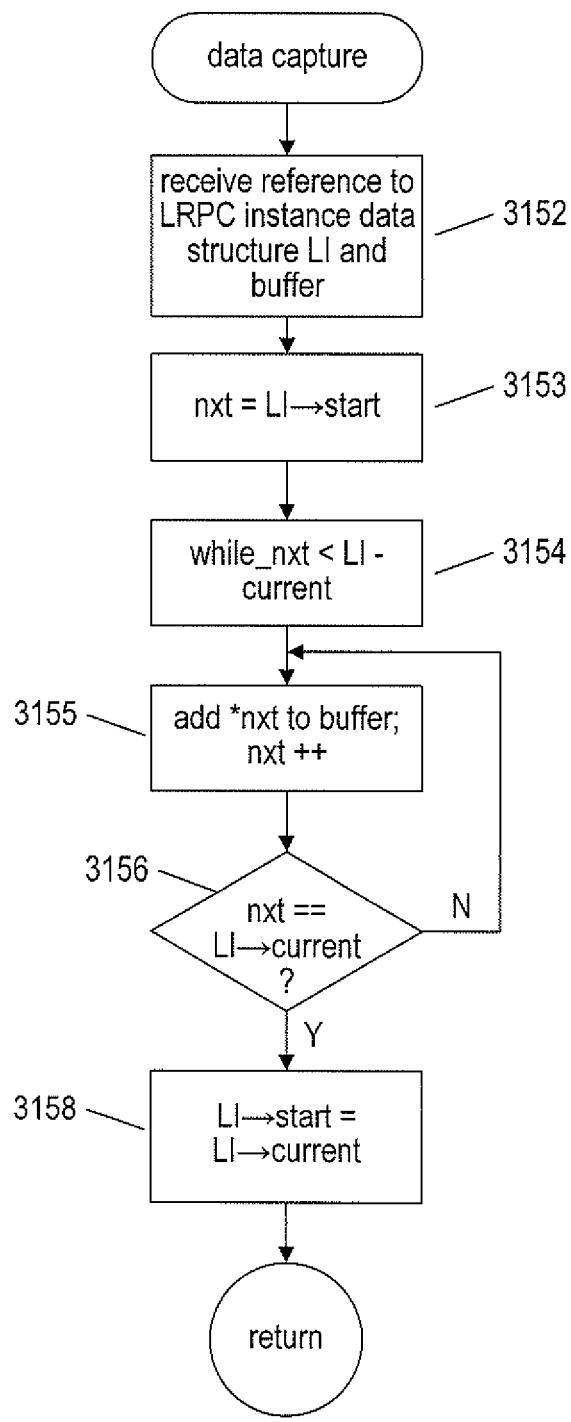

FIG. 31G provides a control-flow diagram for a routine "data capture," used in subsequent routines. In step 3152, the routine receives a reference to an LRPC-instance data structure, LI, and a reference to a memory buffer. In step 3153, the local variable nxt is set to reference a first next entry in the LRPC output buffer. Then, in the while-loop of steps 3154-3156, the entries in the LRPC circular output buffer between the entry referenced by LI→start and the entry prior to the entry referenced by LI→current are copied from the output buffer to the memory buffer. In step 3158, the start pointer for the LRPC output buffer is set to equal the value stored in the current pointer, in order to prepare to receive additional output data from the LRPC. Thus, the routine "data capture" copies available and unprocessed LRPC output data from the LRPC output buffer to a memory buffer for processing.

Figure 31H:
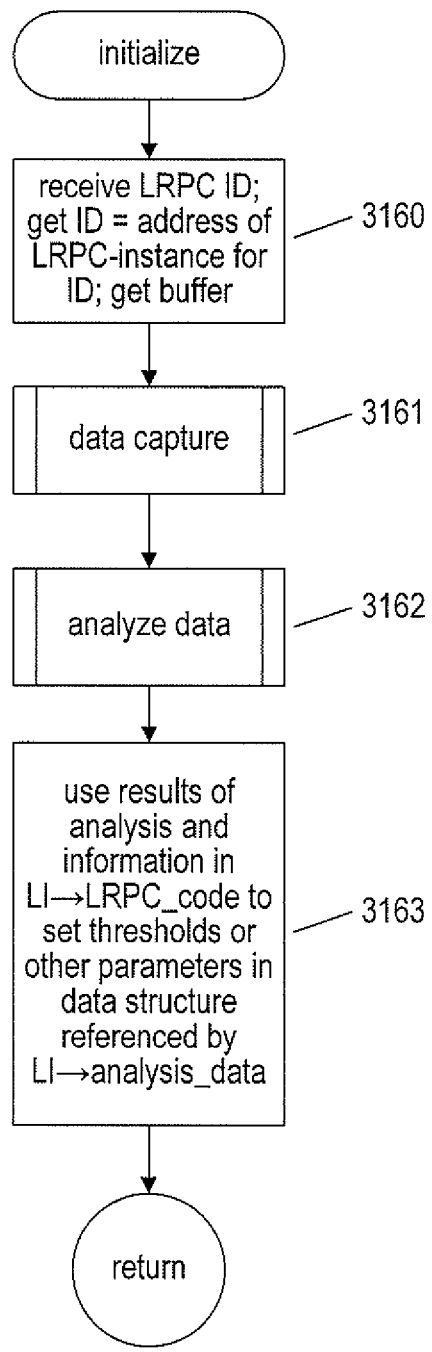

FIG. 31H provides a control-flow diagram for the handler routine called in step 3111 of FIG. 31A. This routine initializes an LRPC in response to an initialization request from a computational entity that wishes to use the LRPC to monitor performance. The initialization generally occurs after the LRPC has been deployed, in response to the computational entity's request to deploy a new LRPC, and has output data for an initial period of time. In step 3160, the routine receives an identifier for the LRPC and uses the identifier to find the LRPC-instance data structure associated with the LRPC. In addition, a memory buffer is obtained to store data output by the LRPC. In step 3161, the routine "data capture" is called to move output data from the LRPC-associated circular data buffer to the memory buffer allocated in step 3160. In step 3162, a data analysis routine is called in order to analyze the initial data and prepare the LRPC for monitoring-data generation. The data analysis is driven by rules, instructions, and/or other information contained in the LRPC-code/executables data structure referenced from the LRPC-instance data structure associated with the LRPC. In general, many different types of data analysis may be executed for different types of LRPCs. In the case of the memory-subsystem LRPC discussed above with reference to FIGS. 26A-B, the data analysis may involve a K-means cluster analysis in order to determine the average elapsed times for each of the various different levels of memory-subsystem loading, as discussed above, in order to set corresponding elapsed-time thresholds for generating indications of the degree to which the memory subsystem is loaded. Other types of LRPCs may require other types of initial data analysis. In step 3163, the results of the data analysis are used to initialize the analysis-data data structure associated with the LRPC.

Figure 31I:
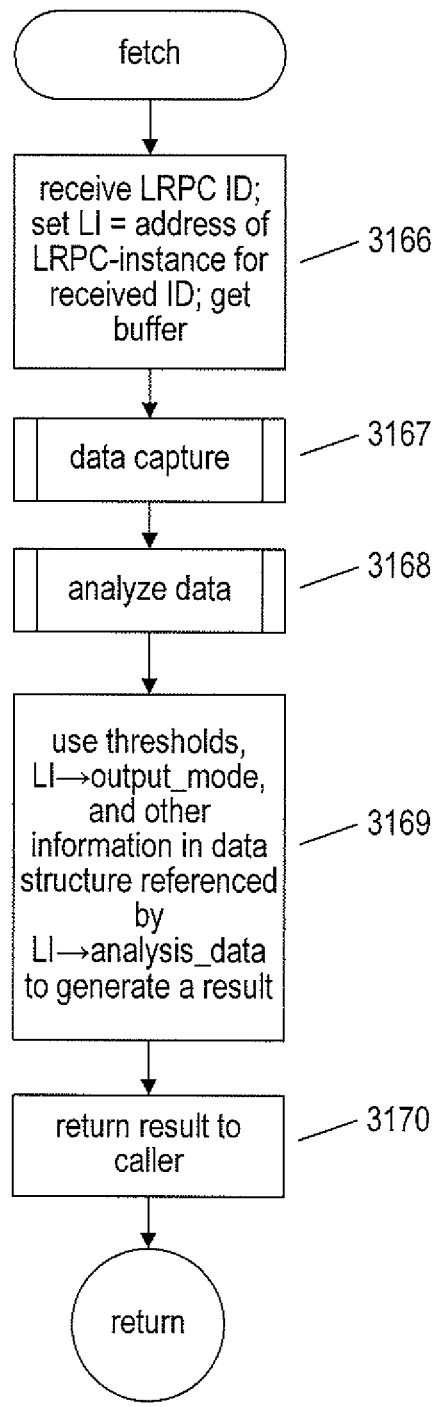

FIG. 31I provides a control-flow diagram for the handler called in step 3113 of FIG. 31A. This handler returns monitoring data to a requesting computational entity. In step 3166, the routine receives an identifier for an LRPC and uses the identifier to set a reference variable LI to reference the LRPC-instance data structure associated with the LRPC identifier. In addition, a memory buffer is allocated. Next, in step 3167, the routine "data capture" is used to copy output data from the LRPC into the memory buffer. In step 3168, the copied data is analyzed in order to prepare to generate monitoring data based on the obtained data. In step 3169, the data processed in step 3168 is used, along with thresholds obtained from the analysis-data data structure, the output-mode indication obtained from the output_mode field of the LRPC-instance data structure, and other information available to the routine to generate a monitoring result. In step 3170, the result is returned to the caller. Many different types of results may be generated and returned, depending on the type of LRPC and the amount of data collected. For example, the memory-subsystem LRPC previously discussed with reference to FIGS. 26A-B may return a list of response-time values in ascending magnitude order, similar to the data used to general the plot shown in FIG. 26B, or may return an indication of the average saturation of the memory subsystem during the most recent data-collection interval. Many other types of results may be alternatively generated, with the type of results at least, in part, indicated by the value stored in the output-mode field of the LRPC-instance data structure.

Figure 31J:
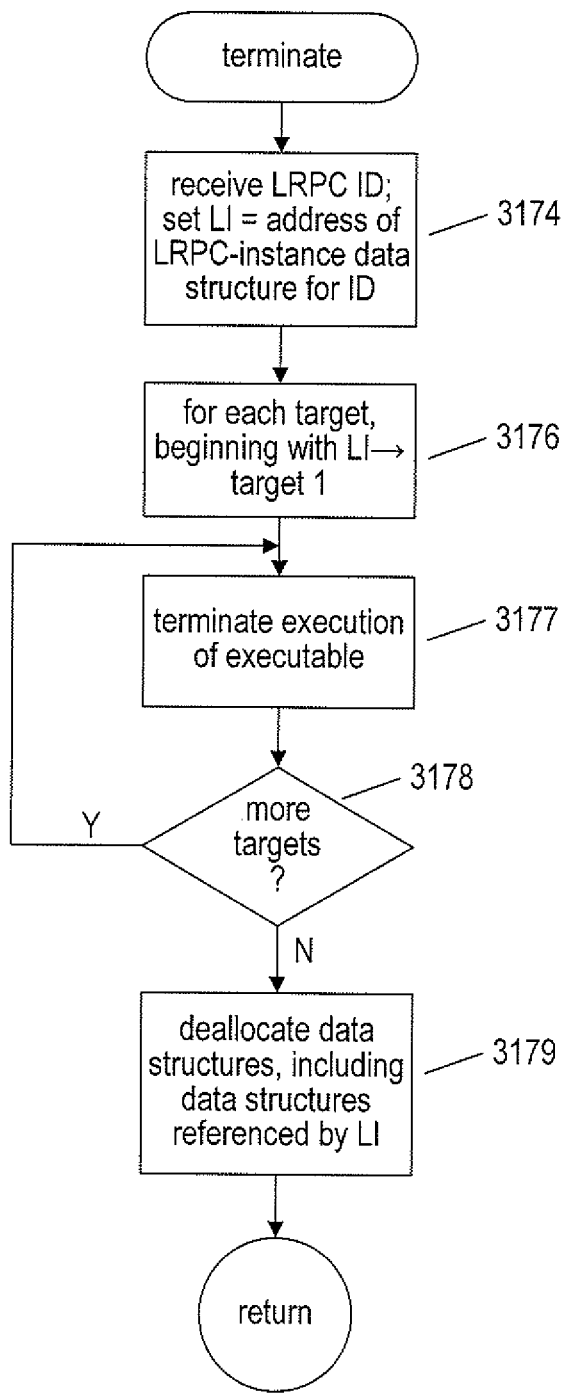

FIG. 31J provides a control-flow diagram for the handler called in step 3115 of FIG. 31A. In step 3174, the handler receives an identifier for an LRPC and uses the identifier the corresponding LRPC-instance data structure. In the for-loop of steps 3176-3178, the routine terminates execution of each deployed executable. Finally, in step 3179, the routine deallocates data structures allocated for the LRPC when the LRPC is initially deployed.

Figure 31K:
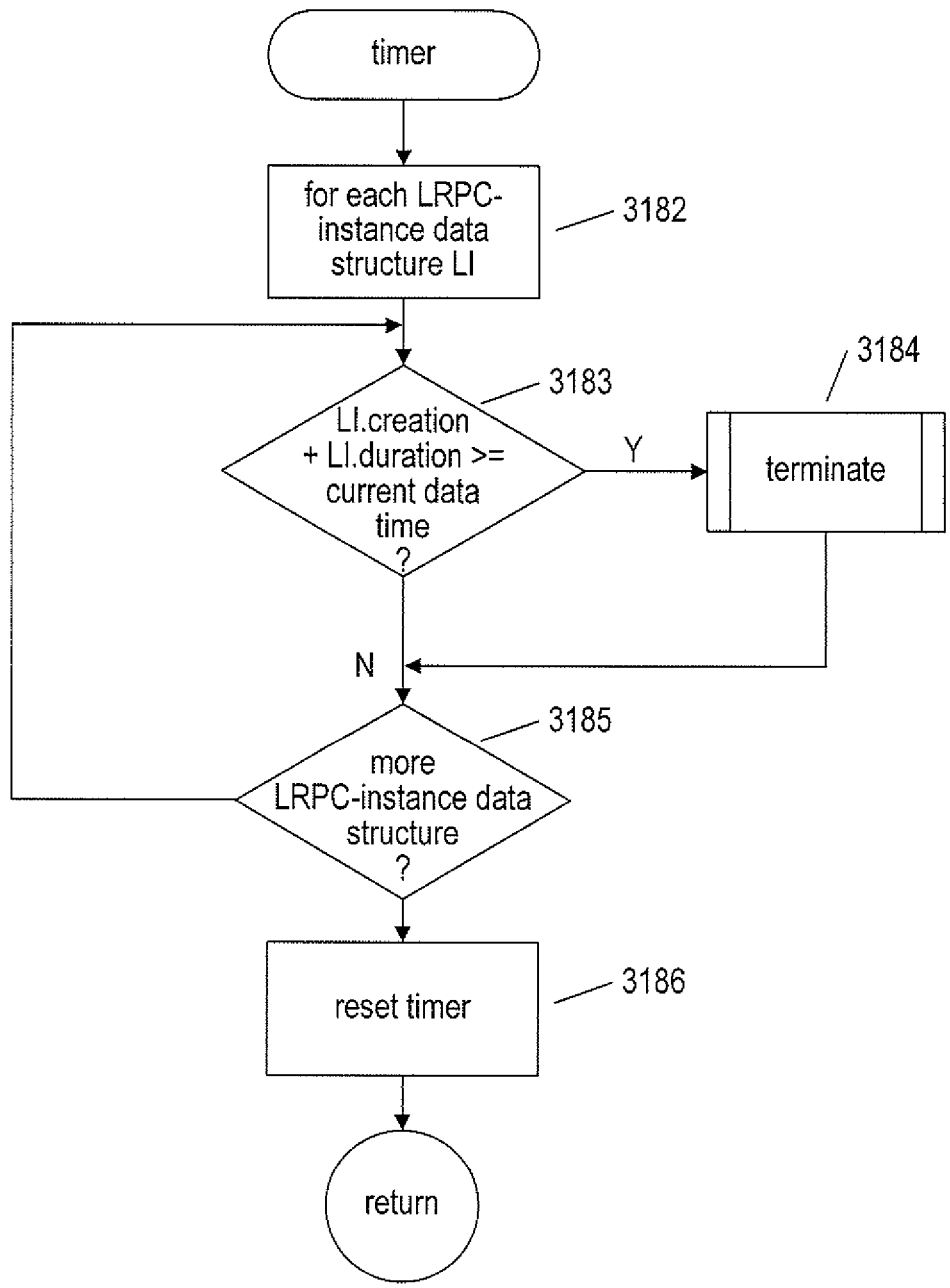

FIG. 31K provides a control-flow diagram for the timer-expiration handler routine called in step 3117 of FIG. 31A. In the for-loop of steps 3182-3185, the routine considers each active LRPC-instance data structure to terminate those LRPCs associated with the LRPC-instance data structures that have already executed for the initially specified execution duration. Then, in step 3186, the timer is reset.

Although the present invention has been described in terms of particular embodiments, it is not intended that the invention be limited to these embodiments. Modifications within the spirit of the invention will be apparent to those skilled in the art. For example, any of many different design and development parameters may be altered to generate alternative implementations of LRPCs, including choice of hardware, operating systems, virtualization layers, control structures, data structures, modular organization, programming language, and other such design and development parameters. As discussed above, a variety of different executables and number of executables may be designed and prepared for different types of LRPCs. An LRPC-based monitoring system may employ multiple LRPCs to output response times that are collected and analyzed in order to generate monitoring information for consumption by various different types of computational entities and, in certain cases, human analysts and administrators. The wide variety of different types of monitoring subsystems based on LRPCs can be implemented by varying any of many different implementation and design parameters. In general, LRPCs are parameterized with respect to data-output intervals, execution intervals, run-time durations, and other aspects and characteristics so that LRPCs can be deployed for highly specific and precise monitoring tasks. Because LRPCs can be implemented in many different ways, they can be designed to precisely monitor the loading or saturation on any of a wide variety of different components and subsystems within many different types of computer systems, from personal computers and mobile processor-controlled devices to enormous virtual data centers distributed over thousands of computers in many different geographical locations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A load response performance counter that monitors task-execution response times within a computer system, the load response performance counter comprising:
   one or more executable tasks that apply a known computational load on a component or subsystem within the computer system;
   a periodic-task-execution mechanism that initiates execution of one or more of the one or more tasks at predetermined times;
   a timer that determines an elapsed time for execution of one or more of the one or more tasks initiated at predetermined times; and
   an elapsed-time reporter that reports the elapsed times to a monitoring subsystem.

2. The load response performance counter of claim 1 wherein the one or more executable tasks includes a task that accesses data-units in a region of memory address space for reading and writing in order to apply a computational load on a memory subsystem within the computer system.

3. The load response performance counter of claim 1 wherein the one or more executable tasks includes a task that accesses blocks or sectors in a mass-storage subsystem for reading and writing in order to apply a computational load on the mass-storage subsystem within the computer system.

4. The load response performance counter of claim 1 wherein the one or more executable tasks includes a task that accesses information provided by a web server through a network interface controller in order to apply a computational load on a networking subsystem within the computer system.

5. The load response performance counter of claim 1 wherein the periodic-task-execution mechanism comprises a control loop that includes, in each iteration of the control loop:
   a call to an execution-suspension facility; and
   one of the one or more executable tasks.

6. The load response performance counter of claim 1 wherein the timer is reset prior to each periodic task execution and read following the periodic task execution in order to generate an elapsed execution time that is reported by the elapsed-time reporter to the monitoring subsystem.

7. A monitoring subsystem that operates within a computer system to monitor components and/or subsystems within the computer system by deploying and receiving elapsed execution times from multiple load response performance counters, each load response performance counter comprising:
   one or more executable tasks that apply a known computational load on a component or subsystem within the computer system;
   a periodic-task-execution mechanism that initiates execution of one or more of the one or more tasks at predetermined times;
   a timer that determines an elapsed time for execution of one or more of the one or more tasks initiated at predetermined times; and
   an elapsed-time reporter that reports the elapsed times to the monitoring subsystem.

8. The monitoring subsystem of claim 7 wherein elapsed execution times received from the load response performance counter during an initial period of task execution following deployment of the load response performance counter are analyzed by the monitoring subsystem to generate thresholds and other analysis results that are subsequently used to generate monitoring results.

9. The monitoring subsystem of claim 8 wherein the elapsed execution times are analyzed by one or more of:
   clustering, including K-means clustering;
   ordering of the elapsed execution times; and
   averaging all or subsets of the elapsed execution times.

10. The monitoring subsystem of claim 8 wherein elapsed execution times received from a load response performance counter following the initial period of task execution are analyzed using the generated thresholds and other analysis results to generate an indication of the current computational load on the component or subsystem on which the load response performance counter periodically applies a known computational load.

11. The monitoring subsystem of claim 10 wherein the elapsed execution times received from the load response performance counter following the initial period of task execution are analyzed by one or more of:
   clustering, including K-means clustering;
   ordering of the elapsed execution times;
   averaging all or subsets of the elapsed execution times; and
   comparison of computed values to the generated thresholds.

12. The monitoring subsystem of claim 7 wherein, when the monitoring subsystem deploys a load response performance counter within the computer system, the monitoring subsystem:
   initializes a period of task execution for the load response performance counter; and
   selects an execution engine within the computer system for execution of each of the one or more execution tasks associated with the load response performance counter.

13. The monitoring subsystem of claim 7 wherein the computer system is one of:
   a personal computer;
   a server;
   a mobile processor-controlled device;
   a data center;
   a virtualized data center; and
   a distributed computer system; and
   a geographically dispersed distributed computer system.

14. The monitoring subsystem of claim 7 wherein the component or subsystem to which a load response performance counter applies a known computational load is selected from among:
   a memory subsystem;
   a hardware thread within a multi-threaded processor;
   multiple hardware threads within a multi-threaded processor;
   a core within a multi-core processor;
   multiple cores within a multi-core processor;
   a processor within a multi-processor computer;
   multiple processors within a multi-processor computer;
   a mass-storage subsystem;
   a subsystem controller;
   a network controller;
   a network;
   a graphics processor;
   one or more computer systems within a distributed computer systems;

a virtual network within a virtualized data center;
a virtual mass-storage subsystem within a data center; and
one or more virtual severs within a virtualized data center.

15. A method for monitoring the saturation or computational load on a component or subsystem within a computer system, the method comprising:
deploying a load response performance counter that applies a known computational load to the component or subsystem;
receiving elapsed time outputs from the load response performance counter during an initial period of time;
analyzing the elapsed time outputs to generate thresholds and/or other analysis data; and
using the generated thresholds and/or other analysis data to generate monitoring data from elapsed time outputs received from the load response performance counter following the initial period of time.

16. The method of claim 15 wherein the load response performance counter comprises:
one or more executable tasks that apply the known computational load on the component or subsystem within the computer system;
a periodic-task-execution mechanism that initiates execution of one or more of the one or more tasks at predetermined times;
a timer that determines an elapsed time for execution of one or more of the one or more tasks initiated at predetermined times; and
an elapsed-time reporter that reports the elapsed times to a monitoring subsystem.

17. The method of claim 16 wherein the one or more executable tasks includes a task that accesses data-units in a region of memory address space for reading and writing in order to apply a computational load on a memory subsystem within the computer system.

18. The method of claim 16 wherein the one or more executable tasks includes a task that accesses blocks or sectors in a mass-storage subsystem for reading and writing in order to apply a computational load on the mass-storage subsystem within the computer system.

19. The method of claim 16 wherein the one or more executable tasks includes a task that accesses information provided by a web server through a network interface controller in order to apply a computational load on a networking subsystem within the computer system.

20. Computer instructions that, when executed within a computer system having a memory and one or more processors, control the computer system to monitor the saturation or computational load on a component or subsystem within the computer system by:
deploying a load response performance counter that applies a known computational load to the component or subsystem;
receiving elapsed time outputs from the load response performance counter during an initial period of time;
analyzing the elapsed time outputs to generate thresholds and/or other analysis data; and
using the generated thresholds and/or other analysis data to generate monitoring data from elapsed time outputs received from the load response performance counter following the initial period of time.

* * * * *